United States Patent
Kramer et al.

(10) Patent No.: US 12,136,295 B2
(45) Date of Patent: *Nov. 5, 2024

(54) VEHICULAR DRIVER MONITORING SYSTEM

(71) Applicant: MAGNA ELECTRONICS INC., Auburn Hills, MI (US)

(72) Inventors: Mark E. Kramer, Zeeland, MI (US); Niall R. Lynam, Holland, MI (US); David P. O'Connell, Ada, MI (US); Vernon R. Nise, Caledonia, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,858

(22) Filed: Oct. 23, 2023

(65) Prior Publication Data

US 2024/0046706 A1 Feb. 8, 2024

Related U.S. Application Data

(63) Continuation of application No. 18/155,146, filed on Jan. 17, 2023, now Pat. No. 11,798,319, which is a
(Continued)

(51) Int. Cl.
*G06V 40/20* (2022.01)
*B60K 35/00* (2024.01)
(Continued)

(52) U.S. Cl.
CPC .............. *G06V 40/28* (2022.01); *B60K 35/00* (2013.01); *B60K 35/10* (2024.01); *B60R 1/12* (2013.01);
(Continued)

(58) Field of Classification Search
CPC ...... G06V 40/28; G06V 20/58; G06V 20/588; G06V 20/59; G06V 20/597; B60K 35/00;
(Continued)

(56) References Cited

U.S. PATENT DOCUMENTS 4,056,696 A 11/1977 Meyerle et al.
4,862,594 A 9/1989 Schierbeek et al.
(Continued)

FOREIGN PATENT DOCUMENTS

CN 201042943 Y 4/2008

OTHER PUBLICATIONS

Tsimhoni, Omer, Michael J. Flannagan, and Takako Minoda. "Pedestrian Detection With Night Vision Systems Enhanced by Automatic Warnings." (2005).) https://deepblue.lib.umich.edu/bitstream/handle/2027.42/57 448/99231.pdf? sequence=1 &isAllowed=y - (Year: 2005).
(Continued)

*Primary Examiner* — Cao H Nguyen
(74) *Attorney, Agent, or Firm* — HONIGMAN LLP

(57) ABSTRACT

A vehicular driver monitoring system includes an interior prismatic rearview mirror assembly and a camera disposed at the interior prismatic rearview mirror assembly behind and viewing through a prismatic mirror reflective element into the interior cabin of the vehicle. Supplemental sources of near infrared illumination are disposed at the mirror assembly that are operable to emit near infrared light to illuminate at least the driver-side front seating area within the interior cabin of the vehicle. Presence of the camera behind the prismatic mirror reflective element is not readily apparent to an occupant of the vehicle. The camera at least (a) views the driver-side front seating area of the vehicle and (b) views a passenger-side front seating area of the vehicle. The driver of the equipped vehicle is monitored via pro-
(Continued)

cessing at the processor of image data captured by the camera.

51 Claims, 57 Drawing Sheets

Related U.S. Application Data continuation of application No. 17/663,227, filed on May 13, 2022, now Pat. No. 11,562,599, which is a continuation of application No. 17/445,631, filed on Aug. 23, 2021, now Pat. No. 11,348,374, which is a continuation of application No. 16/564,334, filed on Sep. 9, 2019, now Pat. No. 11,100,315, which is a continuation of application No. 15/494,647, filed on Apr. 24, 2017, now Pat. No. 10,410,049, which is a continuation of application No. 15/131,594, filed on Apr. 18, 2016, now Pat. No. 9,632,590, which is a continuation of application No. 14/556,340, filed on Dec. 1, 2014, now Pat. No. 9,317,742, which is a continuation of application No. 13/097,576, filed on Apr. 29, 2011, now Pat. No. 8,904,308, which is a continuation of application No. 11/861,904, filed on Sep. 26, 2007, now Pat. No. 7,937,667.

(60) Provisional application No. 60/896,134, filed on Mar. 21, 2007, provisional application No. 60/902,280, filed on Feb. 20, 2007, provisional application No. 60/901,514, filed on Feb. 13, 2007, provisional application No. 60/900,282, filed on Feb. 8, 2007, provisional application No. 60/879,619, filed on Jan. 10, 2007, provisional application No. 60/850,700, filed on Oct. 10, 2006, provisional application No. 60/847,502, filed on Sep. 27, 2006.

(51) Int. Cl.

| | | |
|---|---|---|
| *B60K 35/10* | (2024.01) | |
| *B60K 35/22* | (2024.01) | |
| *B60K 35/28* | (2024.01) | |
| *B60K 35/60* | (2024.01) | |
| *B60K 35/81* | (2024.01) | |
| *B60R 1/12* | (2006.01) | |
| *B60R 11/00* | (2006.01) | |
| *B60R 11/02* | (2006.01) | |
| *G01C 21/26* | (2006.01) | |
| *G01C 21/36* | (2006.01) | |
| *G06F 3/01* | (2006.01) | |
| *G06F 3/0482* | (2013.01) | |
| *G06F 3/04842* | (2022.01) | |
| *G06F 3/16* | (2006.01) | |
| *G06V 20/56* | (2022.01) | |
| *G06V 20/58* | (2022.01) | |
| *G06V 20/59* | (2022.01) | |
| *H04M 1/60* | (2006.01) | |
| *H04N 7/18* | (2006.01) | |
| *H04N 23/63* | (2023.01) | |

(52) U.S. Cl.
CPC .......... *B60R 11/02* (2013.01); *B60R 11/0235* (2013.01); *B60R 11/0241* (2013.01); *G01C 21/265* (2013.01); *G01C 21/3611* (2013.01); *G01C 21/3614* (2013.01); *G01C 21/3644* (2013.01); *G01C 21/3664* (2013.01); *G01C 21/3688* (2013.01); *G06F 3/01* (2013.01); *G06F 3/017* (2013.01); *G06F 3/16* (2013.01); *G06V 20/58* (2022.01); *G06V 20/588* (2022.01); *G06V 20/59* (2022.01); *G06V 20/597* (2022.01); *H04M 1/6091* (2013.01); *H04N 7/183* (2013.01); *H04N 23/63* (2023.01); *B60K 35/22* (2024.01); *B60K 35/28* (2024.01); *B60K 35/60* (2024.01); *B60K 35/81* (2024.01); *B60K 2360/126* (2024.01); *B60K 2360/135* (2024.01); *B60K 2360/143* (2024.01); *B60K 2360/1438* (2024.01); *B60K 2360/146* (2024.01); *B60K 2360/1526* (2024.01); *B60K 2360/173* (2024.01); *B60K 2360/21* (2024.01); *B60K 2360/777* (2024.01); *B60R 2001/1253* (2013.01); *B60R 2001/1284* (2013.01); *B60R 2011/0026* (2013.01); *B60R 2011/0033* (2013.01); *B60R 2011/0063* (2013.01); *B60R 2011/0075* (2013.01); *B60R 2011/0085* (2013.01); *B60R 2300/105* (2013.01); *B60R 2300/207* (2013.01); *B60R 2300/303* (2013.01); *B60R 2300/802* (2013.01); *B60R 2300/806* (2013.01); *B60R 2300/8093* (2013.01); *G01C 21/362* (2013.01); *G01C 21/3629* (2013.01); *G01C 21/3632* (2013.01); *G01C 21/367* (2013.01); *G01C 21/3682* (2013.01); *G06F 3/0482* (2013.01); *G06F 3/04842* (2013.01)

(58) Field of Classification Search
CPC .............. B60K 37/06; B60K 2370/126; B60K 2370/135; B60K 2370/143; B60K 2370/1438; B60K 2370/146; B60R 1/12; B60R 11/02; B60R 11/0235; B60R 11/0241; G01C 21/265; G01C 21/3611; G01C 21/3614; G01C 21/3644; G01C 21/3664; G01C 21/3688; G06F 3/017; G06F 3/16; H04M 1/6091; H04N 5/23293; H04N 7/183
See application file for complete search history.

(56) References Cited

U.S. PATENT DOCUMENTS

| | | |
|---|---|---|
| 4,930,742 A | 6/1990 | Schofield et al. |
| 4,937,945 A | 7/1990 | Schofield et al. |
| 5,131,154 A | 7/1992 | Schierbeek et al. |
| 5,239,586 A | 8/1993 | Marui |
| 5,255,442 A | 10/1993 | Schierbeek et al. |
| 5,432,496 A | 7/1995 | Lin |
| 5,632,092 A | 5/1997 | Blank et al. |
| 5,798,688 A | 8/1998 | Schofield |
| 5,877,897 A | 3/1999 | Schofield et al. |
| 5,924,212 A | 7/1999 | Domanski |
| 5,940,503 A | 8/1999 | Palett et al. |
| 5,971,552 A | 10/1999 | O'Farrell et al. |
| 6,026,162 A | 2/2000 | Palett et al. |
| 6,082,881 A | 7/2000 | Hicks |
| 6,175,300 B1 | 1/2001 | Kendrick |
| 6,227,689 B1 | 5/2001 | Miller |
| 6,243,003 B1 | 6/2001 | DeLine et al. |
| 6,278,377 B1 | 8/2001 | DeLine et al. |
| 6,329,925 B1 | 12/2001 | Skiver et al. |
| 6,420,975 B1 | 7/2002 | DeLine et al. |
| 6,428,172 B1 | 8/2002 | Hutzel et al. |
| 6,477,464 B2 | 11/2002 | McCarthy et al. |
| 6,648,477 B2 | 11/2003 | Hutzel et al. |
| 6,678,614 B2 | 1/2004 | McCarthy et al. |
| 6,690,268 B2 | 2/2004 | Schofield et al. |
| 6,766,233 B2 | 7/2004 | Odinak et al. |
| 6,824,281 B2 | 11/2004 | Schofield et al. |
| 6,902,284 B2 | 6/2005 | Hutzel et al. |
| 6,946,978 B2 | 9/2005 | Schofield |
| 7,004,593 B2 | 2/2006 | Weller et al. |
| 7,012,727 B2 | 3/2006 | Hutzel et al. |

(56) References Cited

U.S. PATENT DOCUMENTS

| | | |
|---|---|---|
| 7,167,796 B2 | 1/2007 | Taylor et al. |
| 7,188,963 B2 | 3/2007 | Schofield et al. |
| 7,253,723 B2 | 8/2007 | Lindahl et al. |
| 7,289,037 B2 | 10/2007 | Uken et al. |
| 7,306,276 B2 | 12/2007 | Berberich et al. |
| 7,308,341 B2 | 12/2007 | Schofield et al. |
| 7,329,013 B2 | 2/2008 | Blank et al. |
| 7,370,983 B2 | 5/2008 | DeWind et al. |
| 7,526,103 B2 | 4/2009 | Schofield et al. |
| 7,657,052 B2 | 2/2010 | Larson et al. |
| 7,881,496 B2 | 2/2011 | Camilleri et al. |
| 7,937,667 B2 | 5/2011 | Kramer et al. |
| 8,904,308 B2 | 12/2014 | Kramer et al. |
| 9,317,742 B2 | 4/2016 | Kramer et al. |
| 9,632,590 B2 | 4/2017 | Kramer et al. |
| 10,410,049 B2 | 9/2019 | Kramer et al. |
| 11,100,315 B2 | 8/2021 | Kramer et al. |
| 11,348,374 B2 | 5/2022 | Kramer et al. |
| 11,562,599 B2 | 1/2023 | Kramer et al. |
| 11,798,319 B2 | 10/2023 | Kramer et al. |
| 2006/0050018 A1* | 3/2006 | Hutzel ................ B60R 1/12 345/60 |
| 2006/0061008 A1 | 3/2006 | Karner et al. |
| 2006/0227066 A1* | 10/2006 | Hu ................ G06F 3/04883 345/7 |

OTHER PUBLICATIONS

Dagan E, Mano 0, Stein GP, Shashua A. "Forward collision warning with a single camera"; IEEE Intelligent Vehicles Symposium, Jun. 1-6, 2004) (Year: 2004).

Stein GP, Mano 0, Shashua A. Vision-based ACC with a single camera: bounds on range and range rate accuracy. InIEEE IV2003 Intelligent Vehicles Symposium. Proceedings . IEEE (Year: 2003).

\* cited by examiner

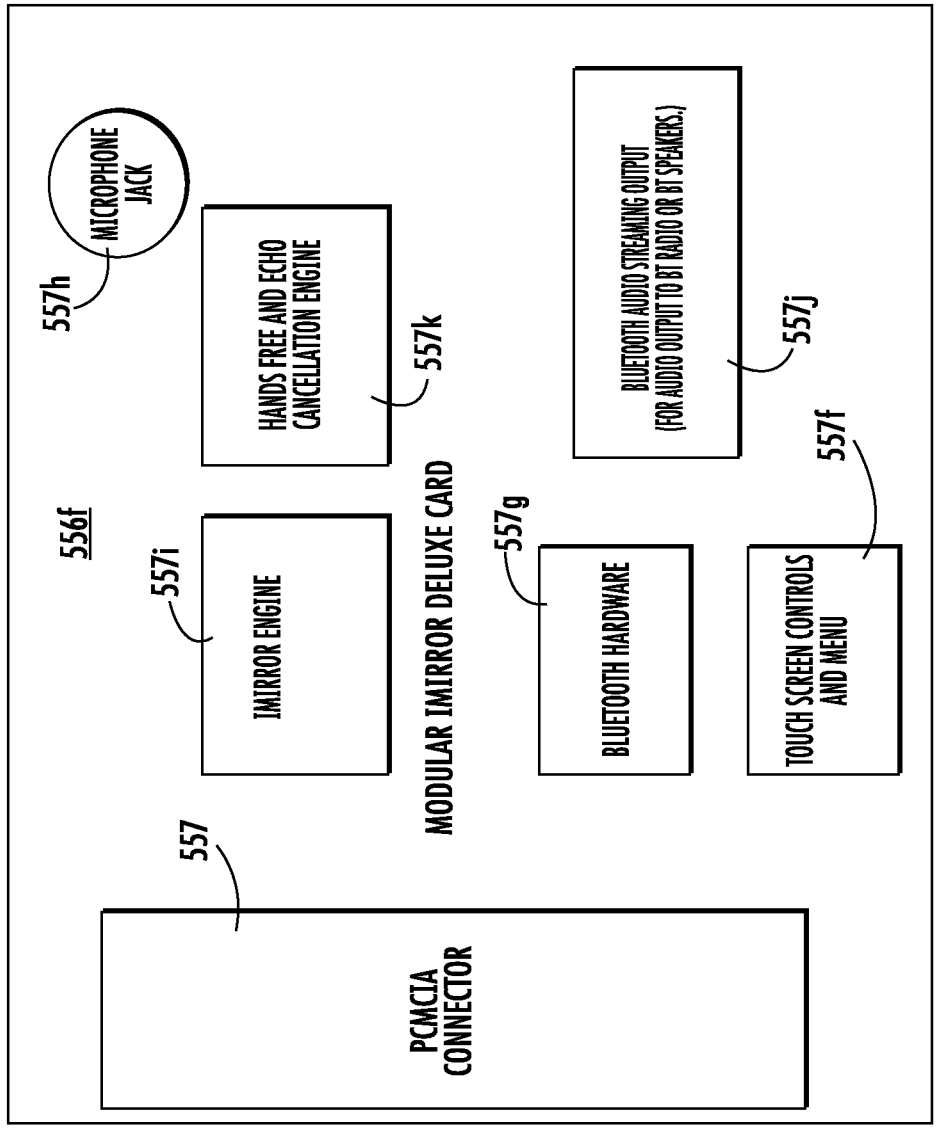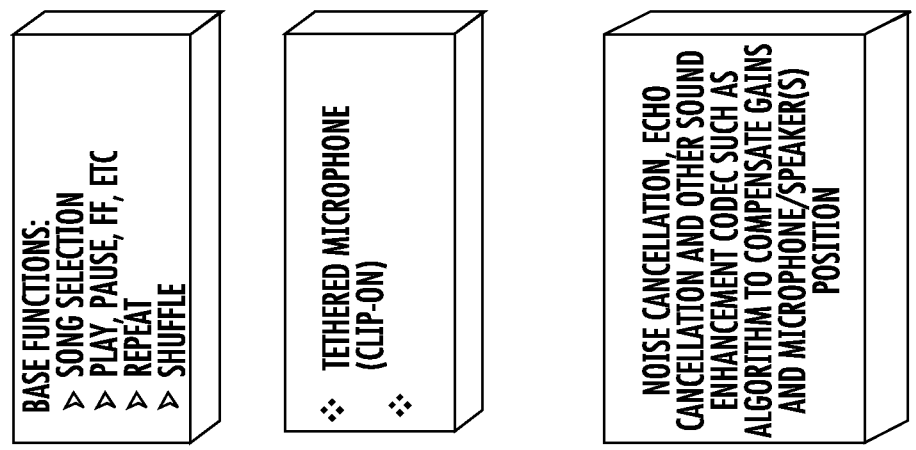
FIG. 13F

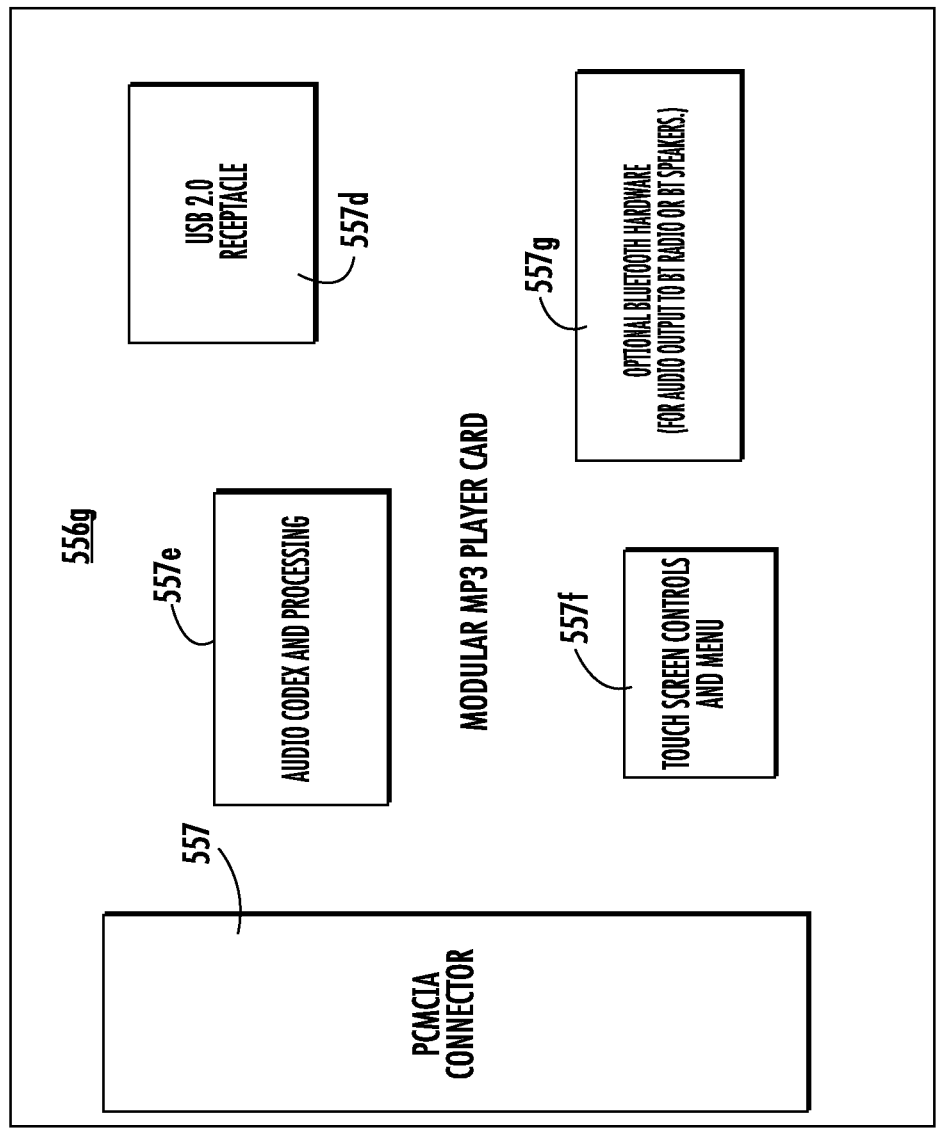
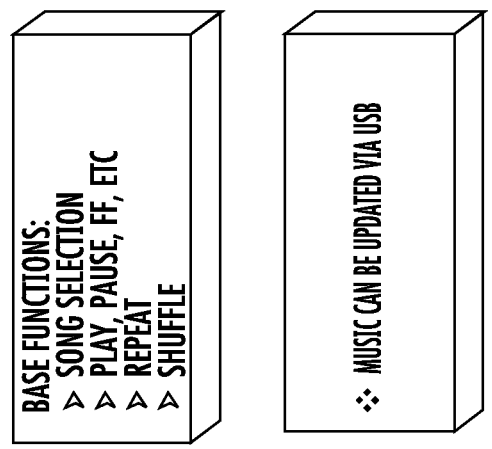
FIG. 13G

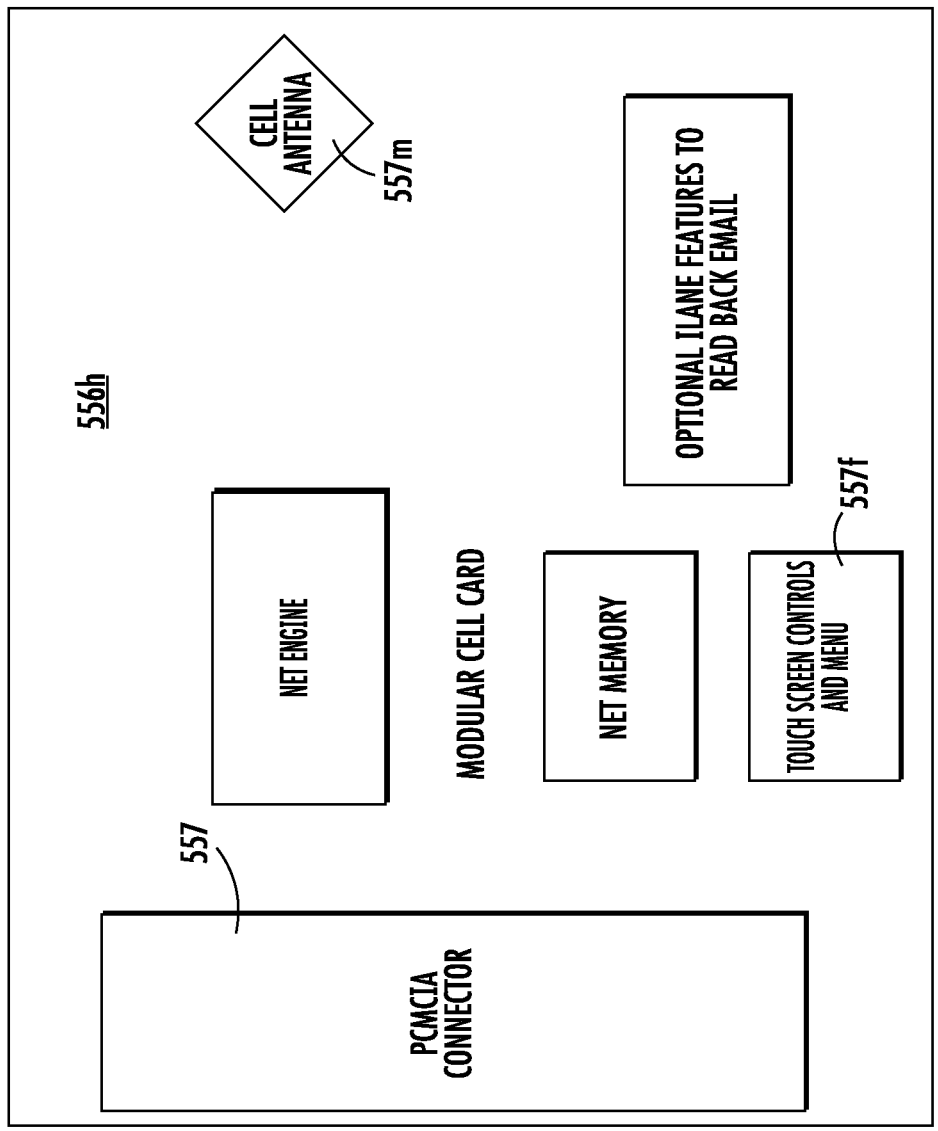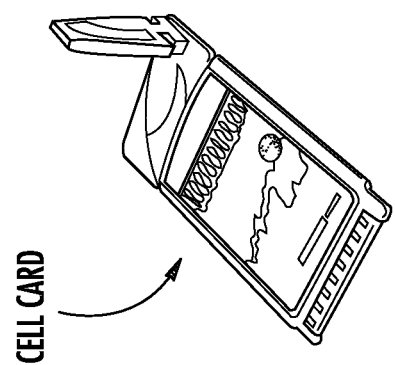
FIG. 13H

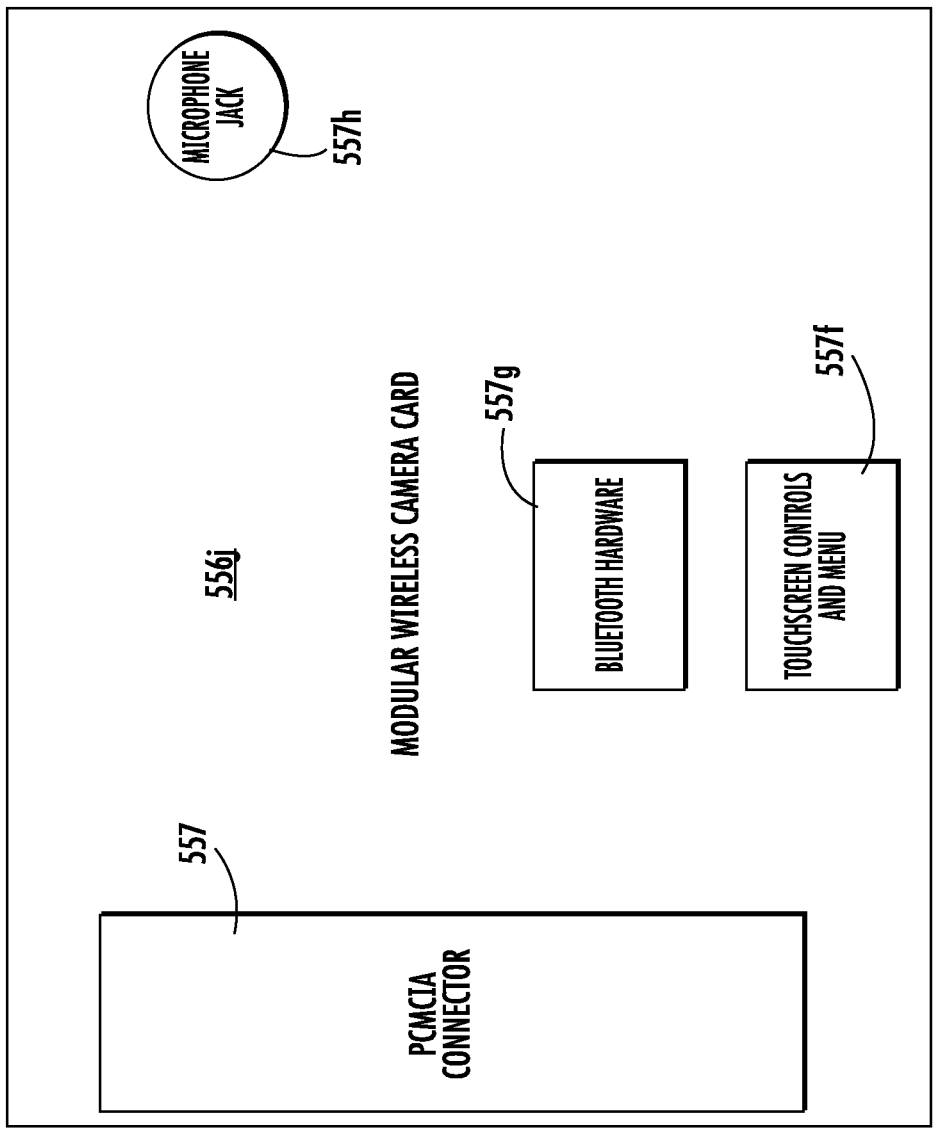
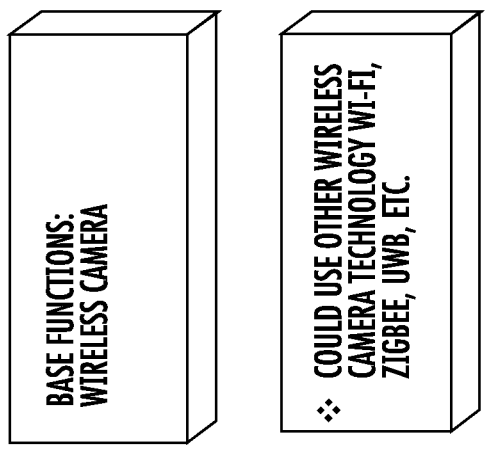
FIG. 13J

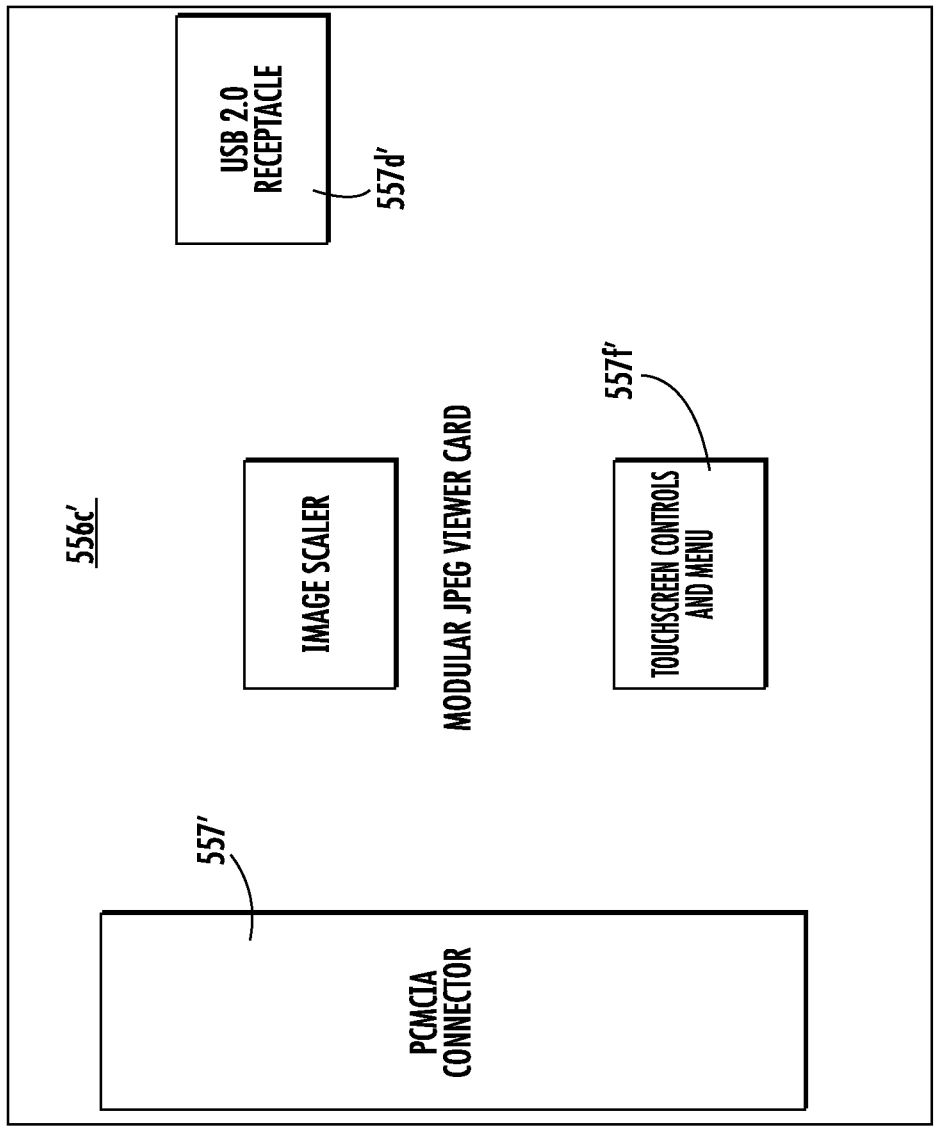
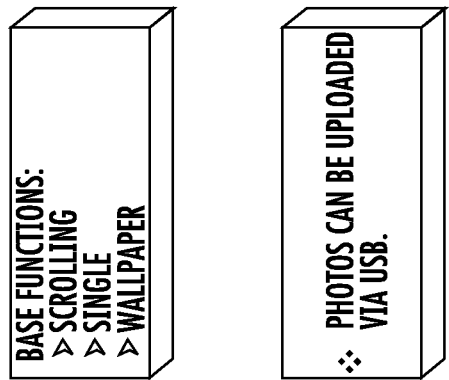
FIG. 14C

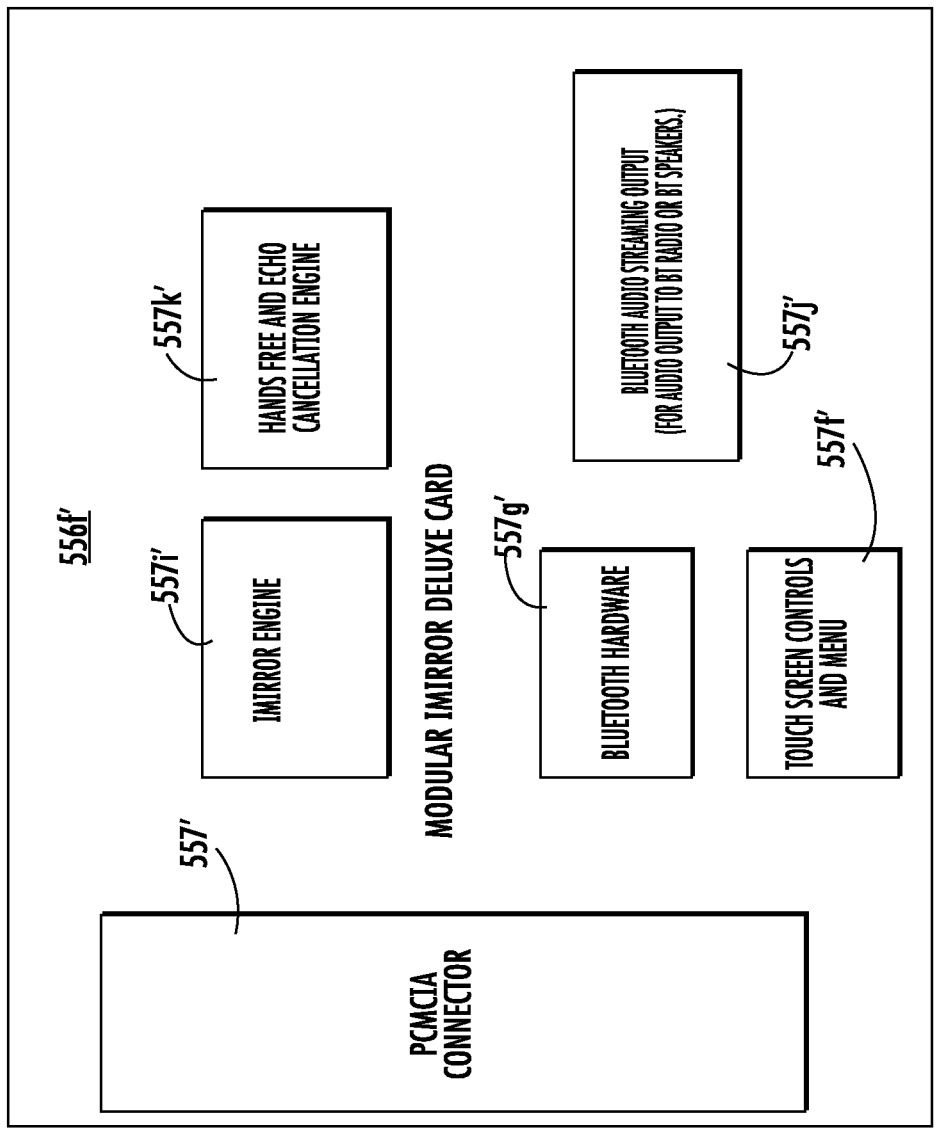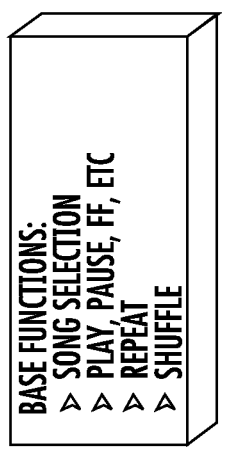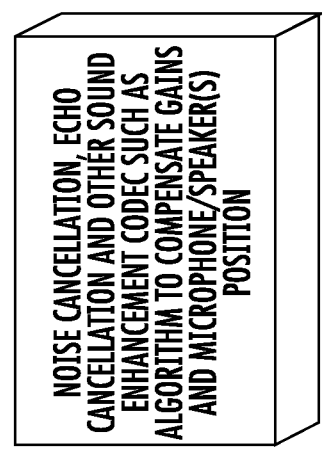
FIG. 14F

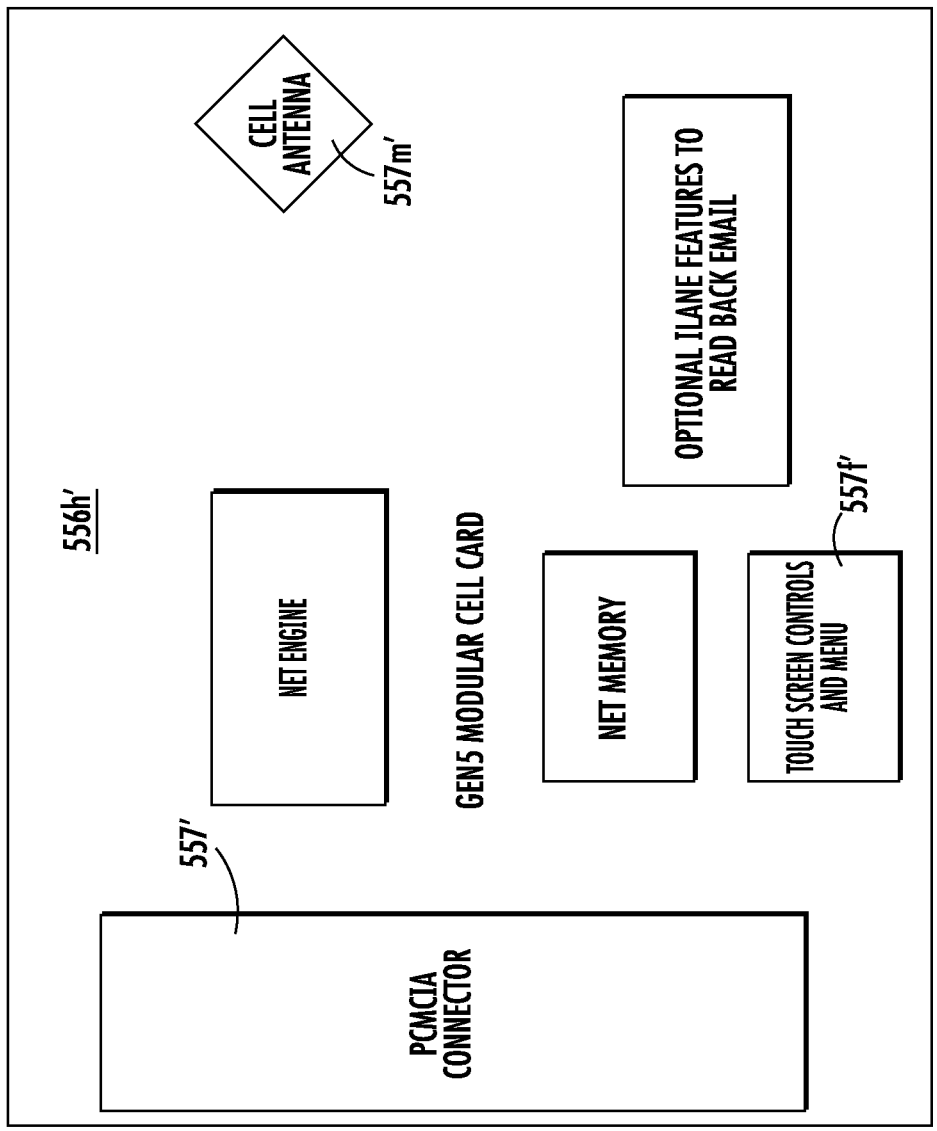
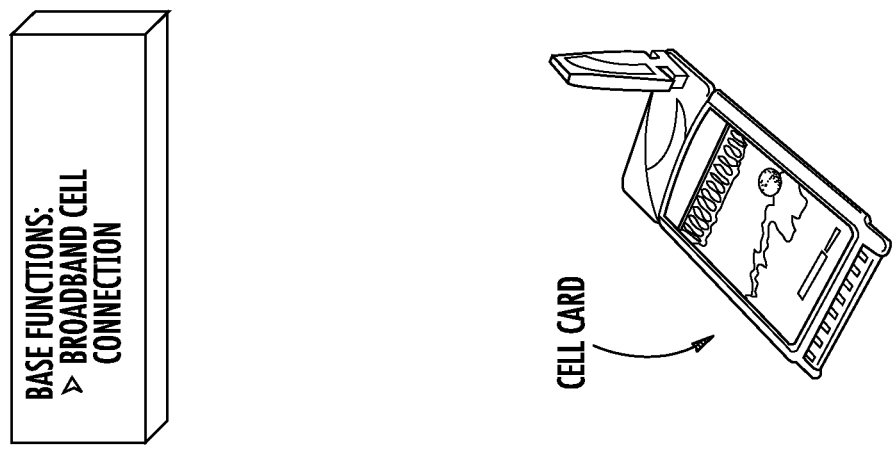
FIG. 14H

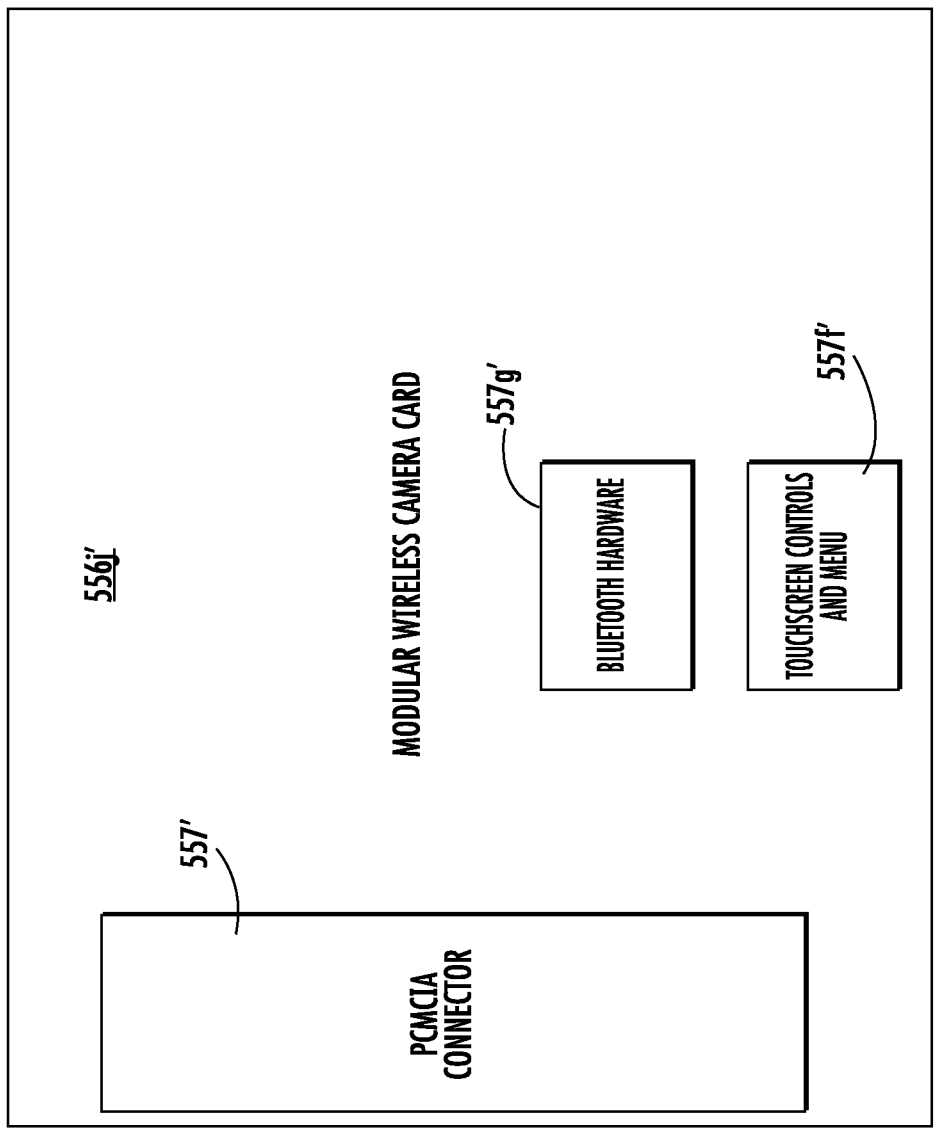
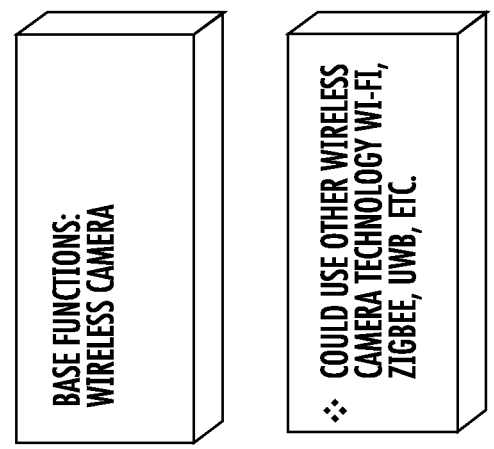
FIG. 14J

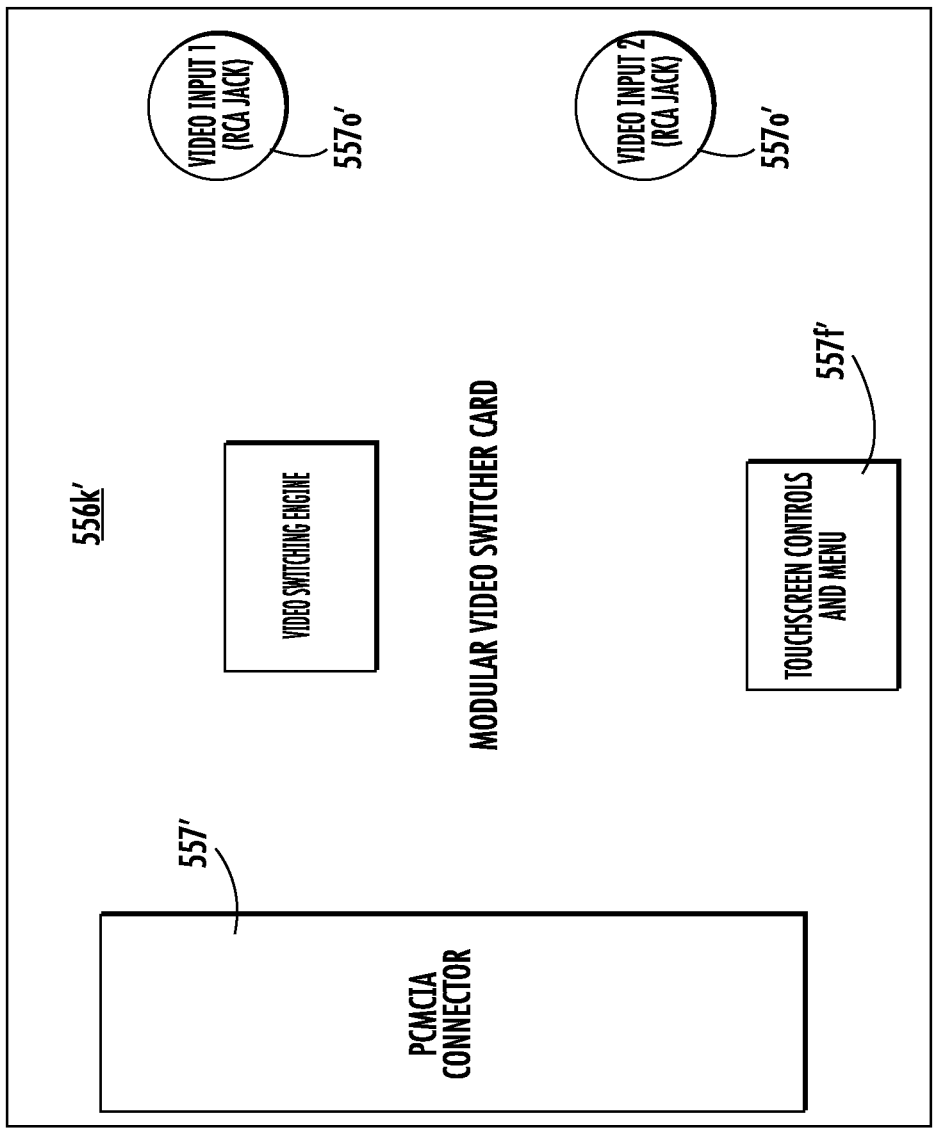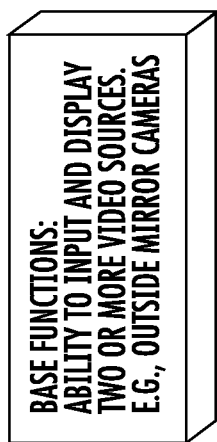
FIG. 14K

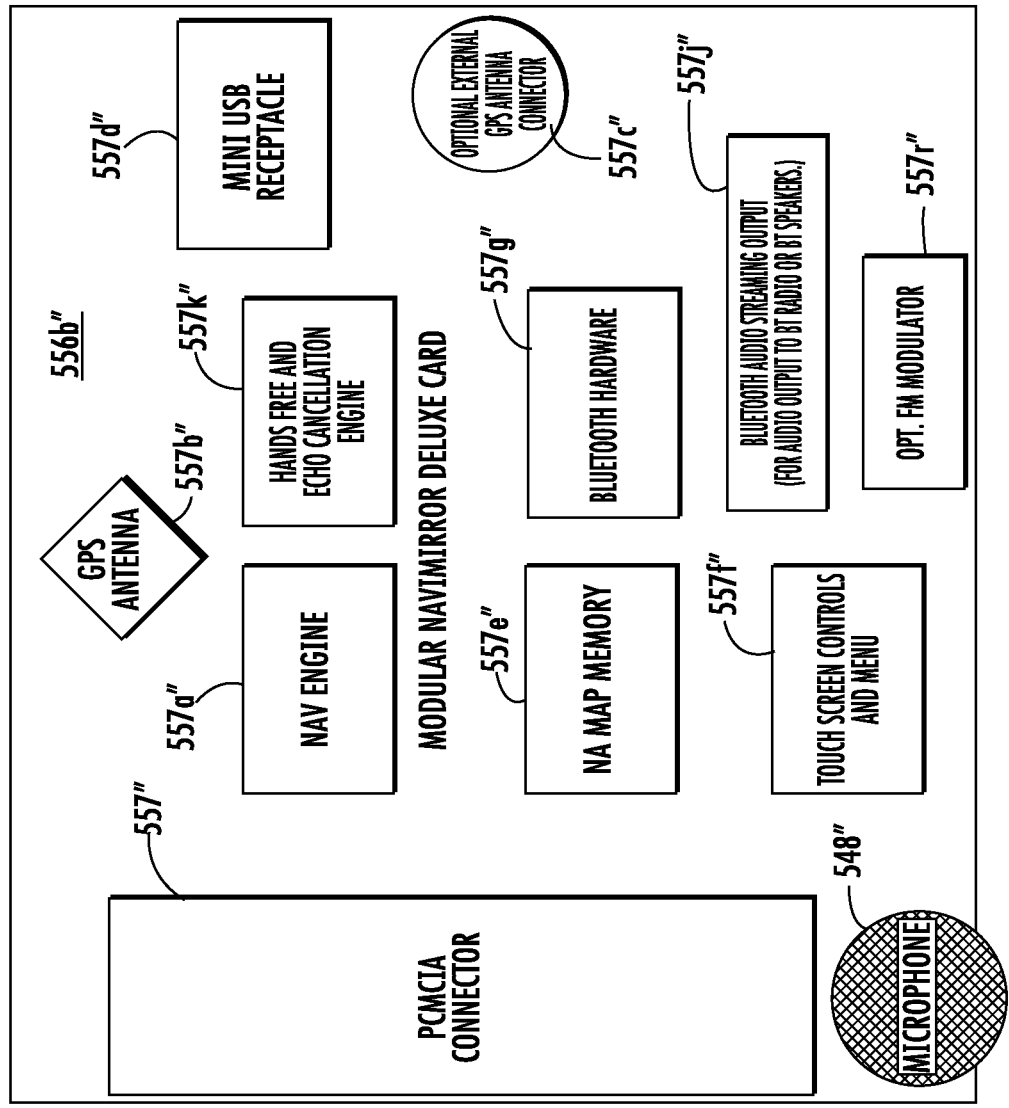
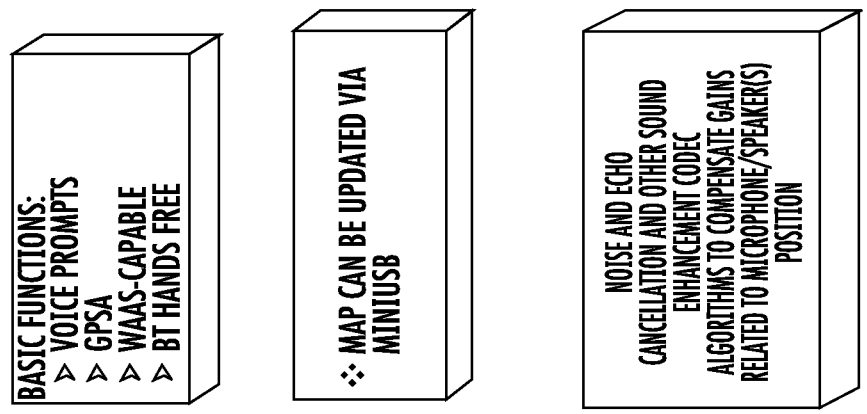
FIG. 15B

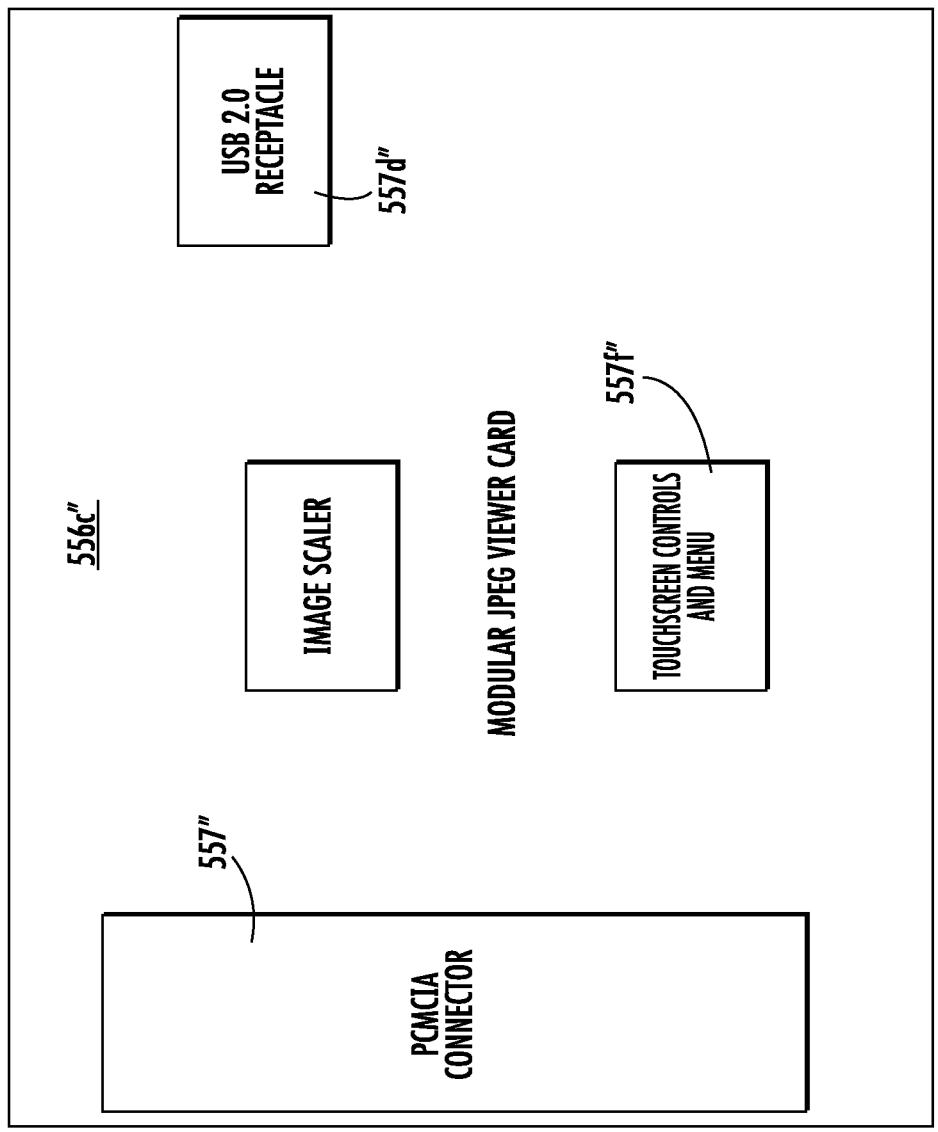
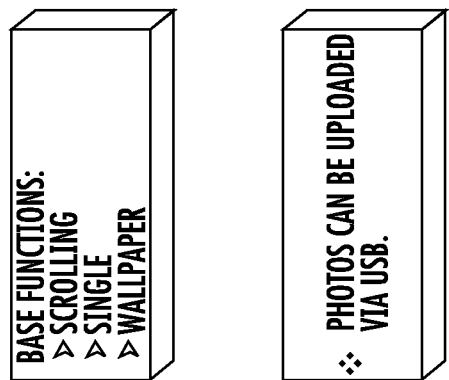
FIG. 15C

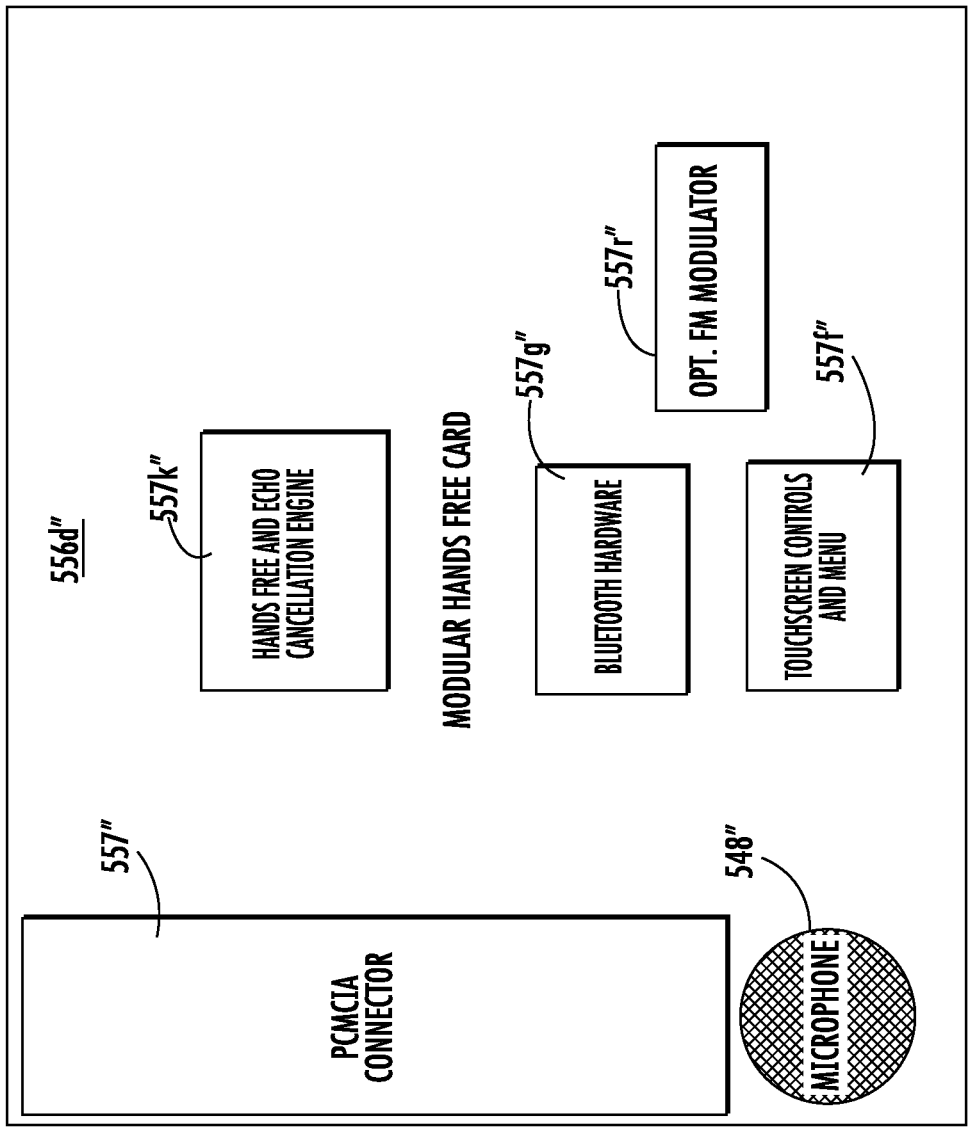
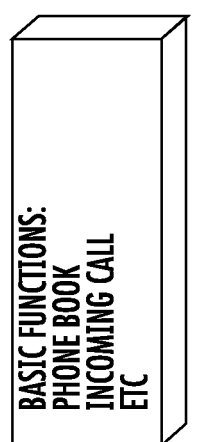
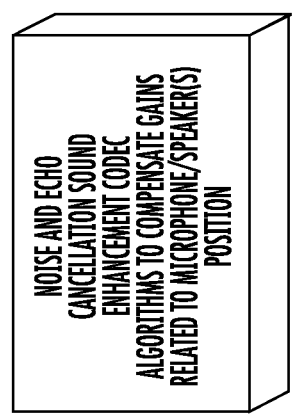
FIG. 15D

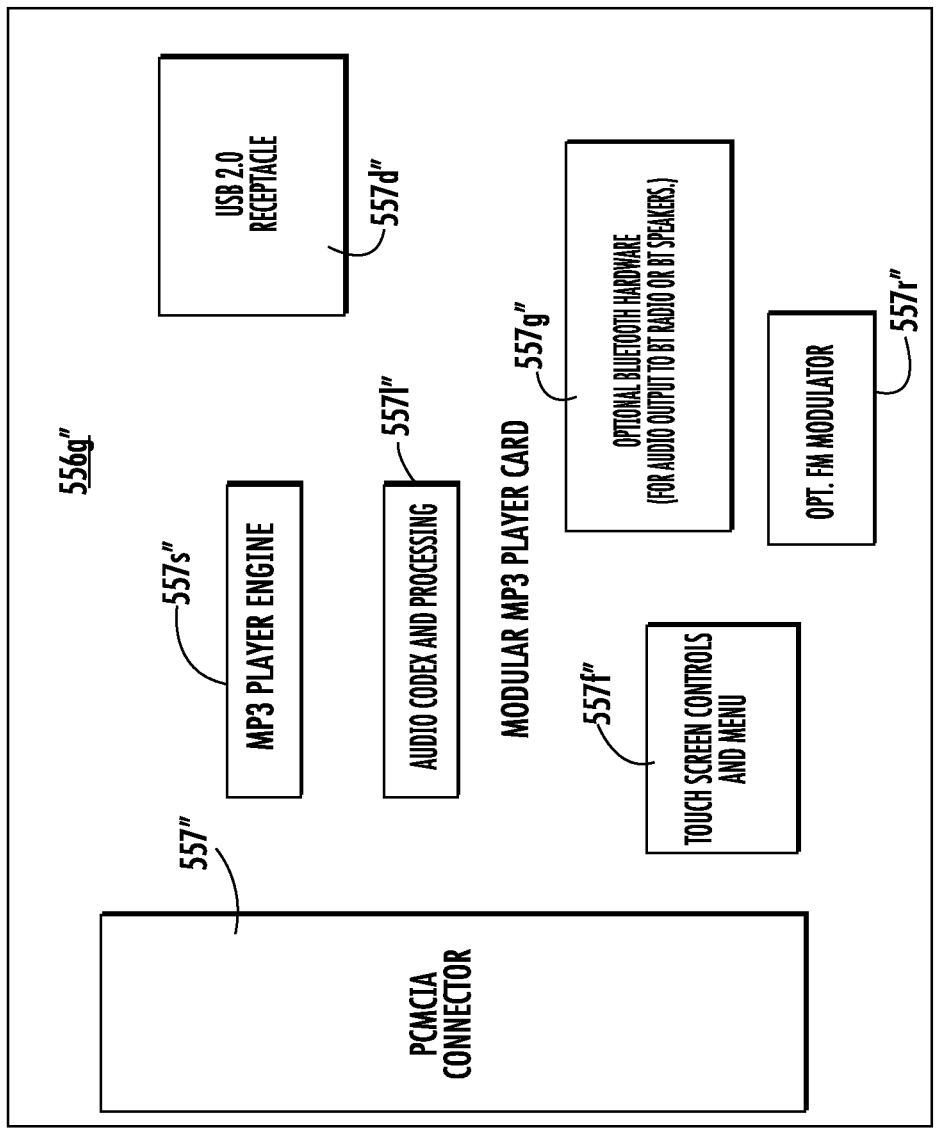
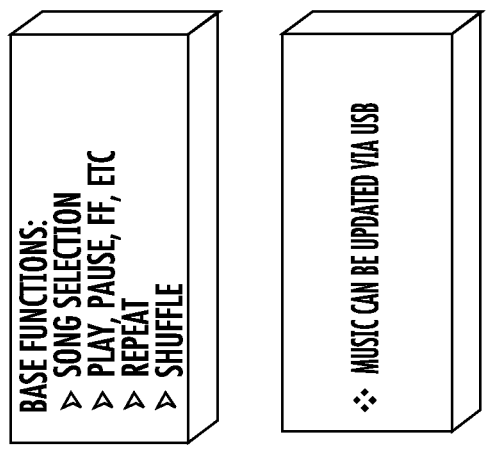
FIG. 15G

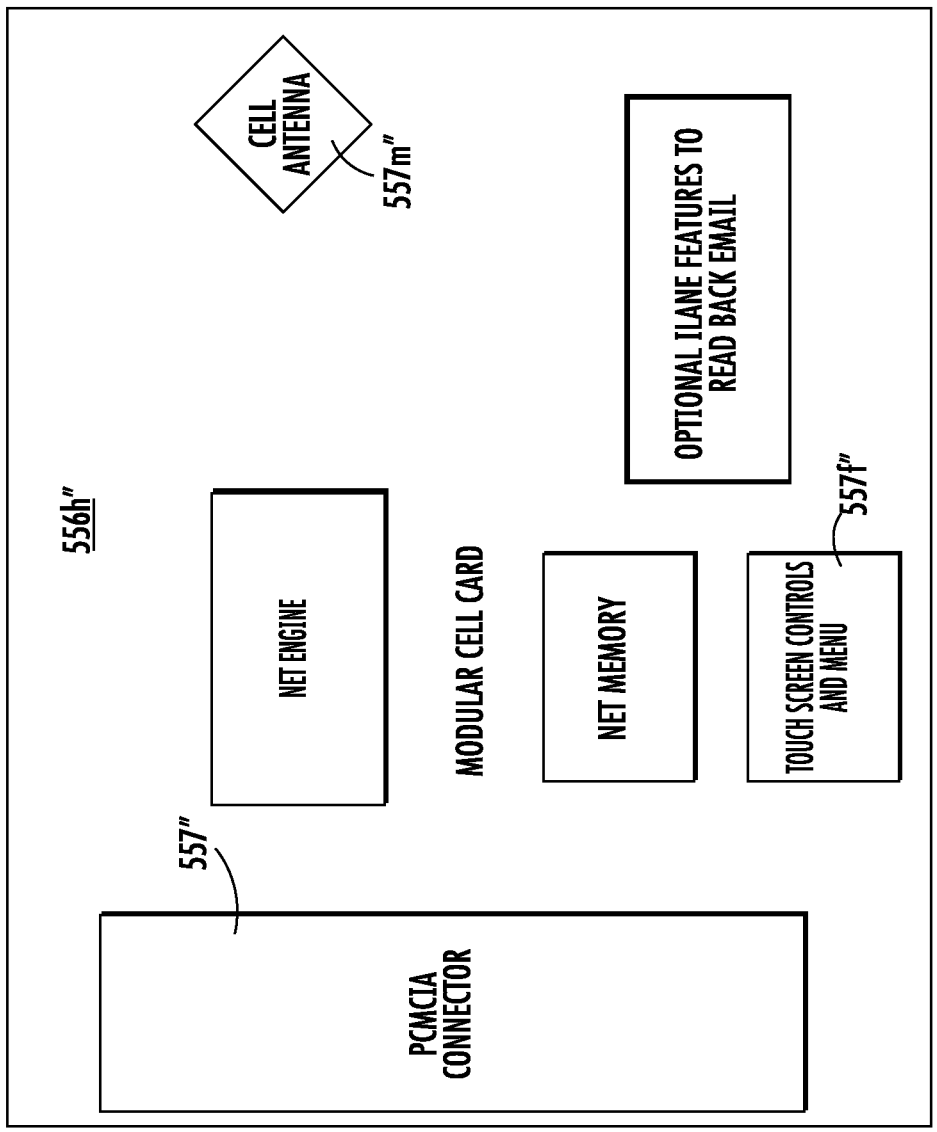
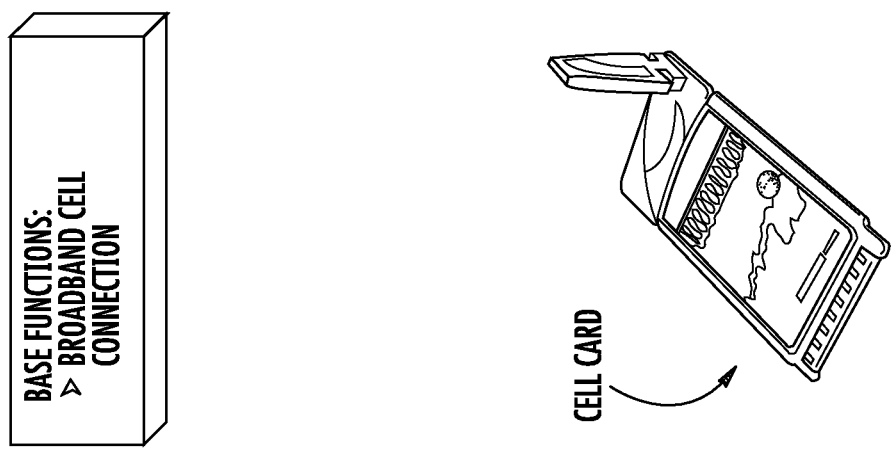
FIG. 15H

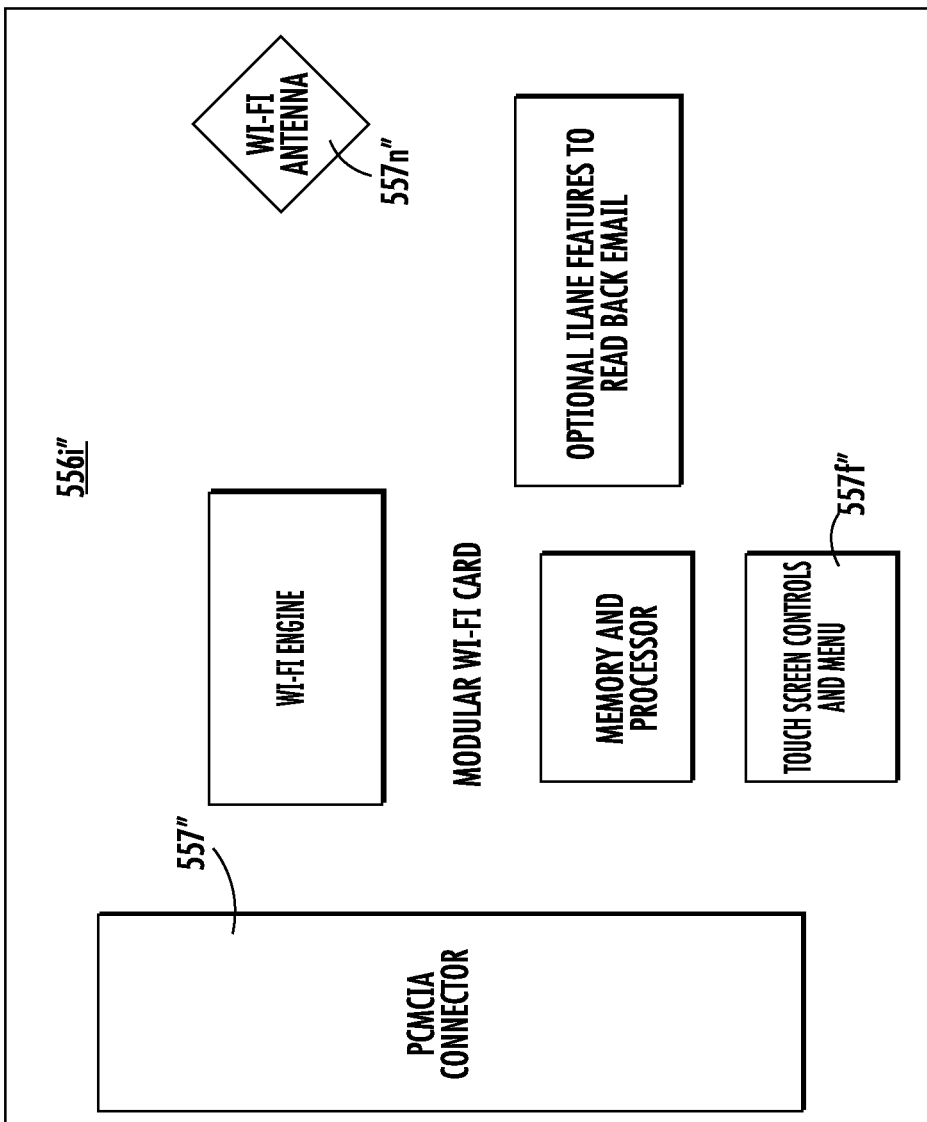
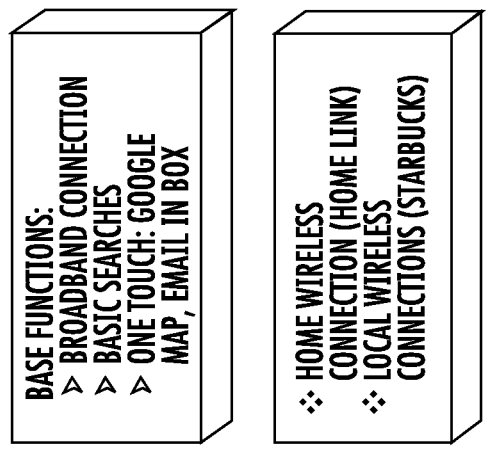
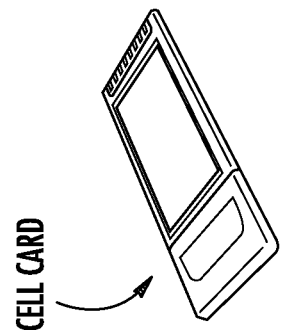
FIG. 15I

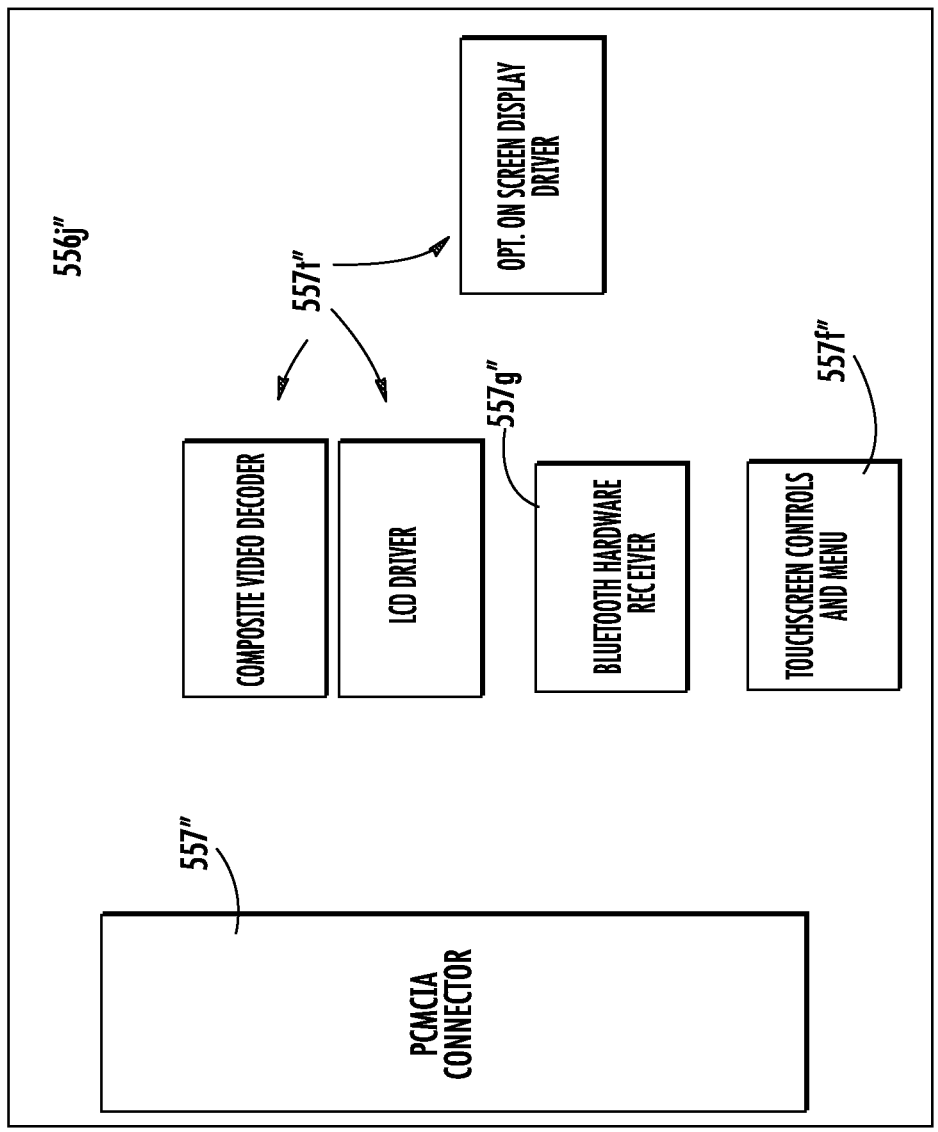
FIG. 15J
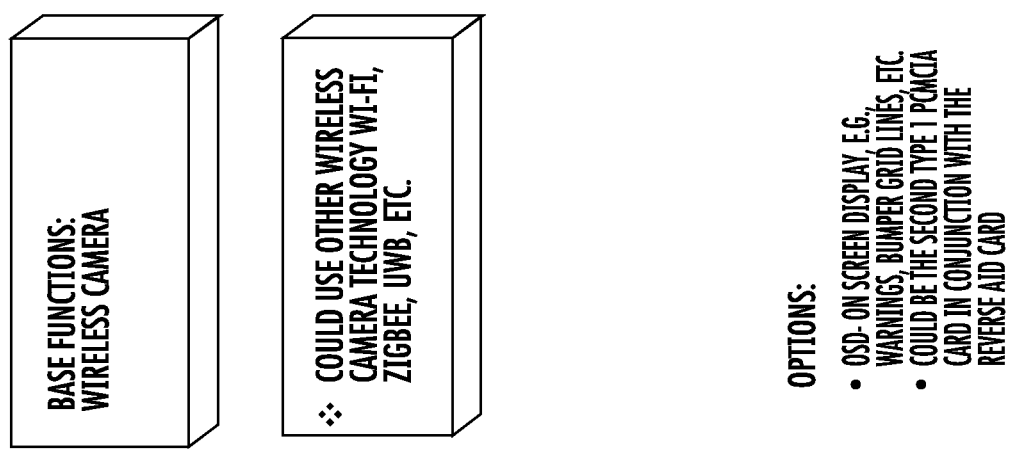

VEHICULAR DRIVER MONITORING SYSTEM

CROSS REFERENCE TO RELATED APPLICATIONS

The present application is a continuation of U.S. patent application Ser. No. 18/155,146, filed Jan. 17, 2023, now U.S. Pat. No. 11,798,319, which is a continuation of U.S. patent application Ser. No. 17/663,227, filed May 13, 2022, now U.S. Pat. No. 11,562,599, which is a continuation of U.S. patent application Ser. No. 17/445,631, filed Aug. 23, 2021, now U.S. Pat. No. 11,348,374, which is a continuation of U.S. patent application Ser. No. 16/564,334, filed Sep. 9, 2019, now U.S. Pat. No. 11,100,315, which is a continuation of U.S. patent application Ser. No. 15/494,647, filed Apr. 24, 2017, now U.S. Pat. No. 10,410,049, which is a continuation of U.S. patent application Ser. No. 15/131,594, filed Apr. 18, 2016, now U.S. Pat. No. 9,632,590, which is a continuation of U.S. patent application Ser. No. 14/556,340, filed Dec. 1, 2014, now U.S. Pat. No. 9,317,742, which is a continuation of U.S. patent application Ser. No. 13/097,576, filed Apr. 29, 2011, now U.S. Pat. No. 8,904,308, which is continuation of U.S. patent application Ser. No. 11/861,904, filed Sep. 26, 2007, now U.S. Pat. No. 7,937,667, which claims the benefit of U.S. provisional applications, Ser. No. 60/896,134, filed Mar. 21, 2007, Ser. No. 60/902,280, filed Feb. 20, 2007, Ser. No. 60/901,514, filed Feb. 13, 2007, Ser. No. 60/900,282, filed Feb. 8, 2007, Ser. No. 60/879,619, filed Jan. 10, 2007, Ser. No. 60/850,700, filed Oct. 10, 2006, and Ser. No. 60/847,502, filed Sep. 27, 2006, which are hereby incorporated herein by reference in their entireties.

FIELD OF THE INVENTION

The present invention generally relates to an interior rearview mirror assembly and, more particularly, to an interior rearview mirror assembly having multimedia capabilities.

BACKGROUND OF THE INVENTION

It is known to use a personal entertainment device or digital playback device (such as an iPOD® or MP3 player or the like) with a vehicle audio system to play songs or other audio signals through the vehicle audio system. For example, a playback device may be connected to or may include a transmitter that transmits a radio frequency (RF) signal that is received by the vehicle radio for playback through the vehicle audio system. Alternately, it is known to provide a wired connection between a docking station and the radio so that the playback device (docked to the docking station) communicates the signal to the radio via a wired connection. The playback device is accessed by the user to select the desired song or playlist or the like, whereby the selected tracks are played through the radio and vehicle audio system. The user thus may have to look down at the docking station and playback device (typically at the instrument panel or a floor-mounted center console of the vehicle or the like) to select the desired songs from a small screen of the playback device (such as is common on the likes or an iPOD®), such that the driver of the vehicle may have to look away from his or her forward field of view to select the desired track or playlist or the like.

Therefore, there is a need in the art for a multimedia system for playing tracks from a playback device through the vehicle's audio system that overcomes the shortcomings of the prior art and that allows the driver to readily view a menu or list of options or selections associated with the playback device, such as a listing of song titles or the like.

SUMMARY OF THE INVENTION

The present invention provides a multimedia mirror system or user-interactive display system for a vehicle that provides display (such as a display of song titles or of a menu or the like) and/or control of a digital playback device (such as an iPOD® or a similar personal entertainment device such as an MP3 player) at the interior rearview mirror assembly of the vehicle so that the driver of the vehicle may navigate the menus of the playback device while viewing the menus or listings or information/data associated with the playback device at the mirror-associated display. The mirror assembly may include a control or user input to allow the driver of the vehicle to control or navigate the menus of the personal, hand-portable playback device (such as an iPOD®) by accessing the control or user input at the mirror. The driver thus may navigate the playback device menus and select a desired song or track or playlist while maintaining his or her generally forward field of view through the vehicle windshield.

According to an aspect of the present invention, a user-interactive display system for a vehicle includes an interior rearview mirror assembly having a mounting structure and a reflective element, a portable hand-held device capable of being carried into and out of the vehicle, and a display device at or adjacent the interior rearview mirror assembly. The portable hand-held device, when carried into the vehicle, is operable to communicate a first signal to a vehicle-based receiver. The display device is operable to display a listing of choices in response to the communication of the first signal. The interior rearview mirror assembly further includes a user input, which is actuatable by a user so that a user can select an item from the listing of choices displayed by the display device. The user-interactive display system is operable to at least one of (a) display at the display device data associated with the selected item in response to the user-selection of the selected item from the listing of choices, and (b) audibly play at an audio device of the vehicle data associated with the selected item in response to the user-selection of the selected item from the listing of choices.

The listing of choices displayed by the display device may include at least one of (a) a listing of voice mail messages of a portable phone, (b) a listing of phone numbers of a portable phone, (c) a listing of received emails, and (d) a listing of songs of a portable playback device. The user input may be actuatable by a user so that a user can select at least one of (a) displaying at the display device data associated with a selected textual item and (b) audibly playing at the audio device data associated with a converted voice message of a selected textual item.

Optionally, the interior rearview mirror assembly may include a video display device that is operable to display images representative of a scene occurring rearward of the vehicle (such as in response to image data captured by a camera or imaging sensor generally at or near the rear of the vehicle and/or having a rearward field of view). The video display device may display the images on a display screen, and may include a non-electronic graphic overlay means that is viewable when the video display device is activated. The graphic overlay means may comprise indicia established in front of an illumination source of the video display device and viewable at the display screen when the video display device is activated and substantially not viewable at the display screen when the video display device is deactivated.

Optionally, the user-interactive display system may include a navigation device support structure for supporting a portable navigation device. The navigation device support structure may comprise an articulatable receiving structure that is articulatable to adjust an orientation of the portable navigation device supported thereon independent of adjustment of an orientation of the reflective element of the interior rearview mirror assembly. For example, the navigation device support structure may be articulatable between a stowed position, where the receiving structure is articulated such that the receiving structure and a portable navigation device supported thereon are generally along the windshield at a mounting base of the mirror assembly, and a use position, where the receiving structure is articulated such that the receiving structure and a portable navigation device supported thereon are generally below the reflective element and readily viewable by the driver of the vehicle.

Optionally, the user-interactive display system is operable to display information at the portable navigation device in a Consumer Hand-held Display Format (where the display may display details, such as map details, street name details, addresses, and/or the like) when the portable navigation device is not supported on the navigation device support structure, and to display information at the portable navigation device in an In-vehicle Display Format (where the display may display larger icons or the like and/or reduced information for quick viewing by the driver of the vehicle while the driver is driving the vehicle) when the portable navigation device is supported on the navigation device support structure.

According to another aspect of the present invention, a multimedia mirror system or user-interactive display system for a vehicle includes an interior rearview mirror assembly having a mounting structure and a reflective element and a docking station for a digital playback device. The docking station communicates a first signal to a radio or similar audio device of the vehicle. The first signal is indicative of an audio signal associated with a selected track of the digital playback device. The docking station communicates a second signal to a receiver of the mirror assembly. The second signal is indicative of display information being displayed at the digital playback device. The second signal preferably is communicated to the receiver via a wireless communication protocol (such as a BLUETOOTH® restricted-range RF communication protocol). The interior rearview mirror assembly further comprises a display device (such as a liquid crystal video screen or a dot matrix display or the like) that is operable to display the display information in response to the second signal.

Optionally, the interior rearview mirror assembly may include a user input (such as buttons or a control wheel or joystick or the like) that is operable to adjust the display information at the display device. The interior rearview mirror assembly communicates (preferably wirelessly, such as via an IR or RF wireless transmission) an adjustment output to the docking station via the wireless communication protocol to adjust the display information at the digital playback device (such as in a manner similar to adjustments that may typically be accomplished via the thumbwheel at the digital playback device). The user input of the mirror assembly thus may be adjustable to navigate menus of the digital playback device to select a desired track for playing the selected track via the vehicle audio system.

Therefore, the present invention provides a multimedia mirror system or user-interactive display system having an interior rearview mirror assembly that is in communication with a playback device docking station and/or a portable telephone and/or telephone docking station to provide display and control capabilities of the playback device and/or telephone at the mirror assembly. The interior rearview mirror provides an enhanced or improved location for the display of the menus of the playback device and/or telephone so that the driver of the vehicle may readily navigate the menus and select the desired songs or playlists while maintaining a sufficient forward field of view via the driver's peripheral vision while viewing the display. The radio of the vehicle would provide the audio controls, such as volume, tone, etc., such as in a typical or known manner. Thus, the mirror assembly and display may complement or supplement the playback device at the docking station so as to allow the driver of the vehicle or user of the playback device to access and control the menus and make the desired selections for playback by the playback device while viewing the display at the mirror assembly, and thus while maintaining his or her forward field of view forwardly through the windshield of the vehicle, such as while driving the vehicle in a forward direction of travel.

These and other objects, advantages, purposes and features of the present invention will become apparent upon review of the following specification in conjunction with the drawings.

BRIEF DESCRIPTION OF THE DRAWINGS

FIGS. 13A-L are schematics of different PC cards and circuitry or accessories or functions thereof that are useful with the interior rearview mirror assembly of FIG. 13;

FIGS. 14A-L are schematics of different PC cards and circuitry or accessories or functions thereof that are useful with the interior rearview mirror assembly of FIG. 14;

DESCRIPTION OF THE PREFERRED EMBODIMENTS

Figure 1:
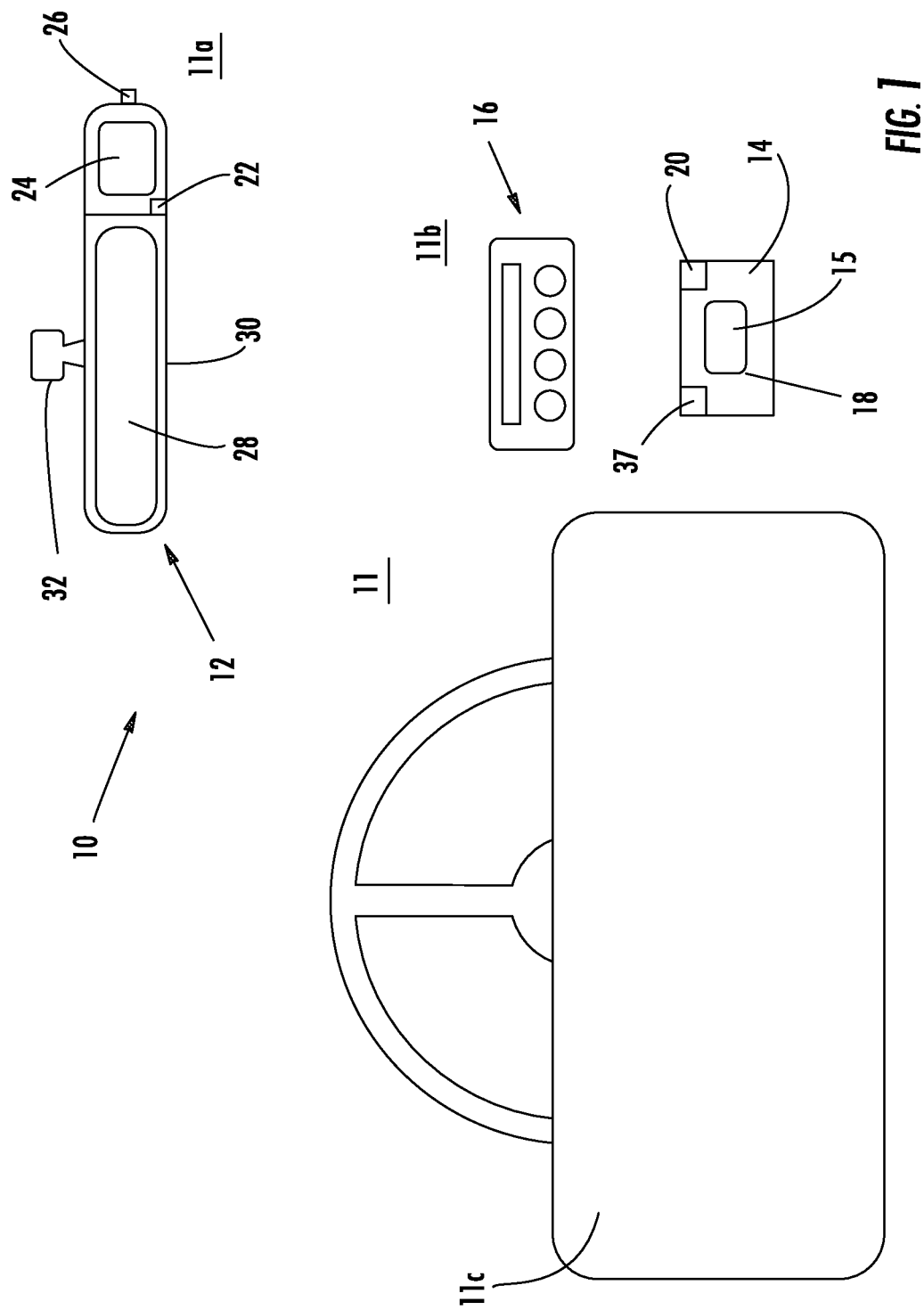
FIG. 1 is a diagram of a multimedia mirror system in accordance with the present invention.
Figure 3:
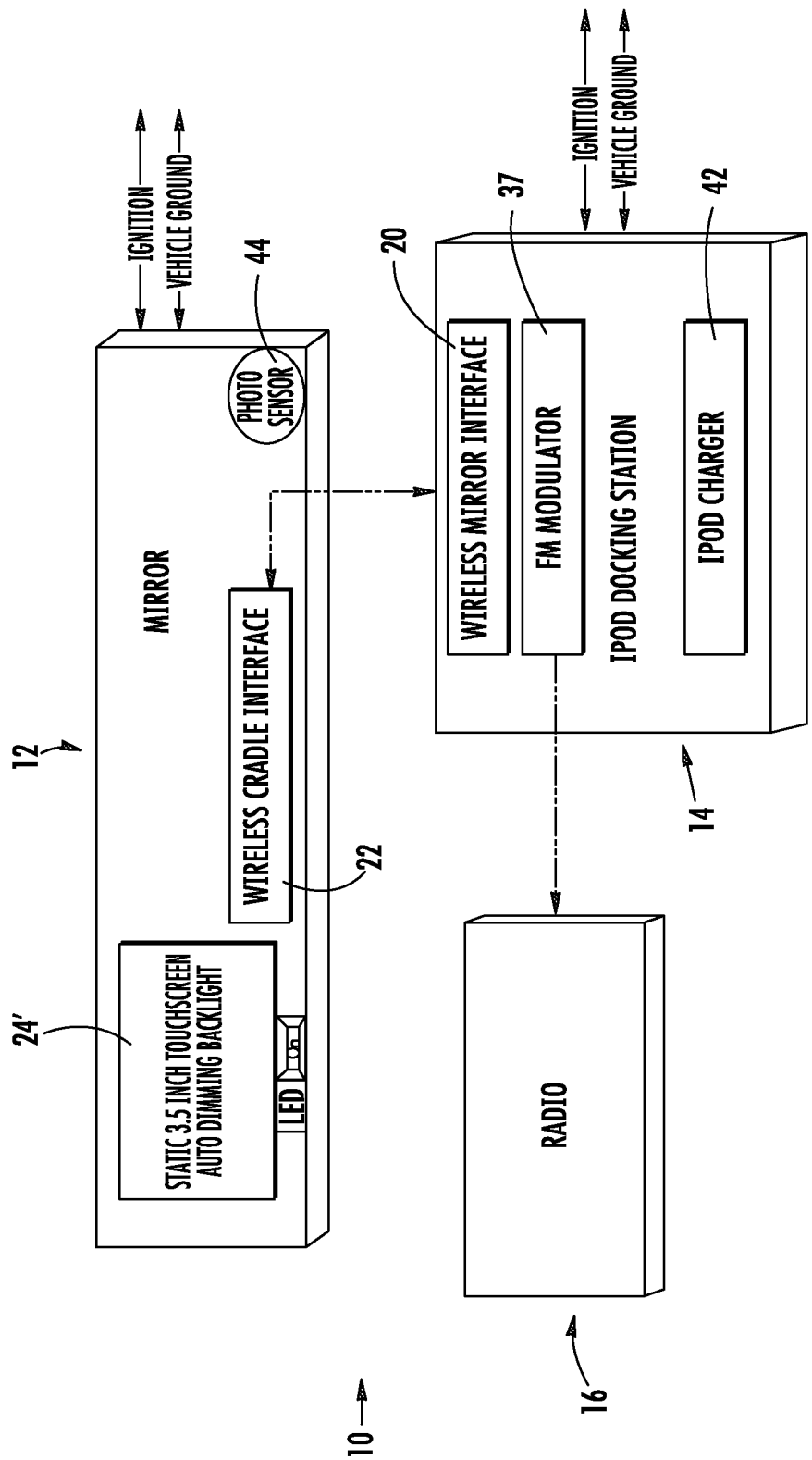
FIG. 3 is another diagram of the multimedia mirror system of the present invention.

Referring now to the drawings and the illustrative embodiments depicted therein, a vehicle-based multimedia system or user-interactive display system 10 for a vehicle 11 includes an interior rearview mirror assembly 12 mounted at an interior portion of the vehicle, a docking station 14, such as a docking station for a portable hand-held device 15, such as a digital playback device, such as an iPOD® or MP3 player or the like, or other portable hand-held device, such as a portable telephone device or a portable internet access or communication device or the like, and a vehicle-based radio 16 (FIGS. 1 and 3). The term "portable phone" or "portable communication device" or the like as used herein is intended to encompass any portable or hand-held communication device, such as a cellular telephone or other communication device including personal data assistants (FDA's) such as BlackBerry® wireless hand-held devices or the like. Docking station 14 includes a connector or socket or plug or receiving port 18 for connecting to or docking with the playback device and a transmitter 20, such as a BLUETOOTH® transmitter or other suitable transmitter or protocol, such as, for example, ZIGBEE® or the like, for wireless communication to and with a receiver 22 at the mirror assembly 12. The mirror assembly 12 and receiver 22 may receive a communication from the docking station 14, and may communicate a signal to the radio 16 for playback of the selection on the playback device through the vehicle audio system, as discussed below. The information displayed at the playback device (which displays the menu or menus and tracks or playlists or the like and which is typically controlled by a user input or thumbwheel of the playback device) may be displayed at a display screen or display element 24 of the mirror assembly 12, such that the driver of the vehicle may select the desired songs or tracks or playlists by viewing the display at the mirror assembly and thus maintaining his or her generally forward field of view, as also discussed below. Optionally, the multimedia mirror system or user-interactive display system may include a text to voice converter operable to convert textual data associated with the selected item into a converted voice message.

The portable hand-held device or playback device may comprise any portable hand-held device that is capable of being carried into and out from the vehicle by a user of the device. For example, the device may comprise a digital playback device, such as an iPOD® or MP3 player or the like, or a portable telephone device or a portable internet access or portable hand-held communication device (such as a BlackBerry® wireless device) or the like. The device may generate a listing of choices, which may be displayed by the display device, and which may include at least one of (a) a listing of voice mail messages of a portable phone, (b) a listing of phone numbers of a portable phone, (c) a listing of received emails, and (d) a listing of titles or tracks (such as of songs or stories or other files) stored in the memory of a portable playback device or downloadable from an external provider. The listing of choices thus may include textual data (such as emails or phone listings or the like) or audio data (such as voice mail messages or the like) or songs or audio tracks or the like.

Figure 2:
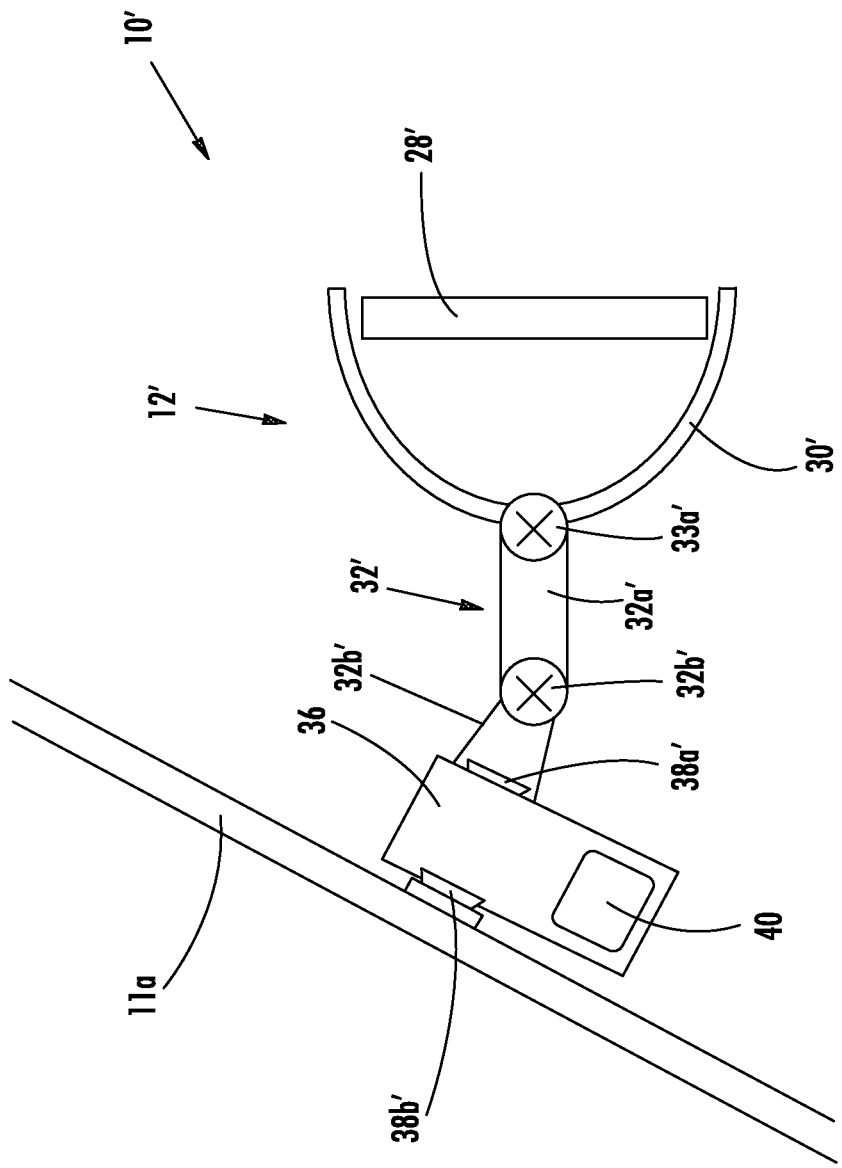
FIG. 2 is a side elevation and partial sectional view of mirror assembly and electronics module useful with the multimedia mirror system of the present invention.

The mirror assembly 12 may be mounted at the inner surface of the vehicle windshield (referred to generally at 11a in FIG. 1) or the like, while the radio 16 is typically mounted or installed at the instrument panel (referred to generally at 11b in FIG. 1) of the vehicle. The docking station 14 may be disposed or located or installed at the instrument panel or a floor mounted center console or the like (such as shown in FIG. 1), or may be located at a windshield electronics module or accessory module 36 or the like (such as shown in FIG. 2) or other location where it is readily accessible by the driver of the vehicle (when sitting in the driver's seat 11c of the vehicle).

Docking station 14 may be similar to known docking stations and includes a docking port 18 for connecting to the playback device. The docking station is connected to a power source, such as to the vehicle power source or battery and vehicle ground, and preferably to the vehicle ignition so that the docking station is powered when the vehicle ignition is on. The docking station may be hardwired to the vehicle radio or may include an FM modulator 37 to transmit an FM signal that the radio may receive for audio playback of the selected songs or tracks or playlists. Optionally, and preferably, the docking station includes a charging device 42 (FIG. 3) to charge the battery of the playback device when the playback device is docked at the docking station, and preferably only when the vehicle ignition is on (so as to limit drain on the vehicle battery when the vehicle is parked).

The driver thus may access the radio to select the desired input or radio station (so that the radio may receive a signal for playback of tracks from the playback device if desired) and/or to adjust the volume of the audio system, such as in a known manner. The radio 16 may receive an output signal from the docking station 14 (when the playback device 15 is docked thereat and activated), such as via a wired connection between the radio and docking station and/or via a RF signal and/or via other wireless communication interfaces or via a vehicle bus interface, such as a LIN or LAN interface or network or the like.

The user of the playback device thus may dock or plug in the playback device to the docking station or cradle, such as via known connection means and/or by utilizing aspects of the systems described in U.S. Pat. Nos. 7,012,727; 6,902,284; 6,648,477; 6,428,172; 6,026,162 and/or 5,940,503, and/or U.S. patent application Ser. No. 10/538,724, filed Jun. 13, 2005 and published Mar. 9, 2006 as U.S. Publication No. US-2006-0050018, which are hereby incorporated herein by reference in their entireties. The docking station may communicate an output signal to the radio (such as via FM modulator 37 of the docking station or via a hard-wire connection with the radio) for playing of the selected track through the vehicle audio system, and may also communicate an output signal via the transmitter 20 that is received by receiver 22 at the mirror assembly 12 (such that there is a wireless interface between the docking station or cradle and the multimedia mirror assembly). The output signal transmitted by transmitter 20 to receiver 22 of mirror assembly 12 may be indicative of the information or menu/menus displayed at the display screen of the playback device, and may be received by receiver 22 at the mirror assembly 12, whereby the display element or display screen 24 of mirror assembly 12 may display the information for viewing by the driver of the vehicle. The driver may use the user input or thumbwheel at the playback device to scroll through the menus and select the desired track or playlist or the like while viewing the menus and other displayed information at the display element 24 of the mirror assembly 12, or optionally may use a user input 26, such as a button or dial or thumbwheel or the like, at the mirror assembly to scroll through the menus being displayed at the display element 24 of mirror assembly 12.

The driver thus may plug in or dock the playback device 15 into the docking station 14 (and thereby also preferably electrically recharging/powering the docked/connected device), whereby the docking station 14 may communicate with the playback device and may transmit the display information signal to the mirror assembly for viewing of the display menus at the mirror assembly. The driver of the vehicle thus may navigate or scroll through the playback device menus to make a desired selection for playback while enhancing the driver's forward field of view and peripheral vision of the road ahead of the vehicle (since the driver does not have to look down to the docking station to see the menus).

The docking station may communicate the playback signal/signals to the radio (such as via an RF signal or wired signal or wireless communication) or to a receiver of another audio device of the vehicle, and/or to the receiver 22 of mirror assembly 12. Optionally, the docking station 14 may communicate the playback signal or signals to the mirror assembly 12, whereby a transmitter of the mirror assembly (or other suitable communication device or element) may communicate the signal or signals to the radio (such as via a wired connection between the mirror assembly and the radio or via a wireless communication interface or protocol) for playing the selected track or tracks through the vehicle's audio system. Optionally, the mirror assembly may include a speaker or speakers for playing the selected tracks without connection to the vehicle audio system. For example, the mirror assembly may include small high-fidelity speakers or thin film speakers (such as substantially flat speaker film capable of generating high quality sound), which may be disposed at selected or desired locations at the mirror assembly. Optionally, the audio playback may be through a speaker or speakers of the portable hand-held device itself, depending on the particular application.

Optionally, and desirably, the mirror assembly 12 includes the user input 26, such as a button or dial or thumbwheel or joystick or proximity sensor or the like, that allows the driver or user of the system to control or scroll through the menus of the playback device at the mirror, whereby the menus and playlists and the like (of the playback device) are displayed at the display element 24 of mirror assembly 12 and adjusted via the user input 26 of mirror assembly 12. Optionally, the display screen may comprise a touch screen 24' (FIG. 3) to allow the user to control and select menu options and the like by touching the appropriate display item or menu at the display screen 24 of the mirror assembly. The user of the playback device thus may control the playback device and view the display information of the playback device at the rearview mirror 12. Thus, the driver of the vehicle may select display information (that may include video imagery and/or textual or iconistic information) and/or audio playback tracks or selections while maintaining a forward field of view.

Optionally, the multimedia mirror system or user-interactive display system of the present invention may include a text to voice converter that is operable to convert textual data associated with a selected item (as selected by the user from the playlist or list of items) into a converted voice message, such that the user can listen to a selected text message if desired. Optionally, a user input (such as at the user input at the mirror assembly) may be actuatable by a user so that a user can select at least one of (a) displaying at the display device data associated with a selected textual item and (b) audibly playing at the audio device data associated with a converted voice message of a selected textual item. For example, the user may select an email from a list of emails, and may elect to view the email on the display or may select a conversion of the selected email into an audio message (such as an audio message output by the speakers of the vehicle's radio or other vehicle or mirror speakers or by the speaker or speakers of the portable playback device), whereby the user may hear an audible signal indicative of or representative of the text of the selected email. Optionally, the email may also be displayed at the display device, if desired or selected by the user of the system.

Thus, the mirror assembly 12 and display 24 may complement or supplement the playback device at the docking station 14 so as to allow the driver of the vehicle or user of the playback device to access and control the menus and make the desired selections for playback by the playback device while viewing the display at the mirror assembly 12. The multimedia mirror system of the present invention thus provides a display and control function for playback devices such as iPODs and MP3 players and the like, while allowing the driver to see the playback device menus at the mirror and, at least peripherally, the forward field of view of the road ahead of the vehicle. Thus, the complementary or supplementary mirror assembly allows for control and selection of playback items or tracks or playlists by the driver of the vehicle while the driver maintains his or her forward field of view forwardly through the windshield of the vehicle, such as while driving the vehicle in a forward direction of travel.

Optionally, the display of the mirror assembly may be voice controlled, so that the driver or user may vocalize a desired command, such as "scroll down" or "select" or "play" or "stop" or "pause" or the like to scroll through the menus and make the desired selection. The mirror assembly thus may include a microphone for receiving the voice command, whereby a control or signal processor of the mirror assembly may process the received command to identify or recognize the command and to control the display and/or the playback device accordingly.

Optionally, an image sensor or camera device may be incorporated into the mirror with a field of view toward the driver or passenger area of the front seats so as to capture images of an occupant in the front seat or seats. The image sensor may capture images, and an image processor may process image data and may function to recognize movement, such as simple hand gestures or the like, for alternative human-machine interface (HMI) control. An image processor such as those described in U.S. Pat. No. 5,877,897 and U.S. patent application Ser. No. 11/651,726, filed Jan. 10, 2007, now U.S. Pat. No. 7,311,406, which are hereby incorporated herein by reference in their entireties, may be used. For example, an EYEQ™ vision system-on-a-chip image processor, available from MobilEye N.V. (see www-.mobilieye-vision.com), may be used. Such hand gesture recognition may offer potential safety benefits for some types of secondary controls and special conditions, such as, for example, where a noisy environment which may impede voice commands, or where the physical location of the mirror is too far to reach for touch screen control or the like. Also, such hand gesture recognition allows the driver to control the device or mirror without having to shift his or her visual concentration from the road ahead—to the task—and back to the road again. Because some tasks require more than one glance, and because each glance from the road could take between about 0.5 seconds and about 2 seconds, limiting such distractions is a benefit to the driver of the vehicle. Optionally, a laser device or a glove-based device (where sensors may be worn by the driver to detect the hand motions) or other sensors may also or otherwise be used instead of a camera. Optionally, the image processor may be operable to recognize the gestures as defined by ASL (American Sign Language), in order to assist the deaf community.

As disclosed by U.S. Pat. No. 5,877,897 (which is incorporated above by reference in its entirety), the vehicular driver monitoring system may be configured as a compartment image data storage system to store any compartment image, such as the driver image, in the nonvolatile memory. To reduce data storage requirements, the image data frame may be compressed using any appropriate digital image compression technique. The image data frame is then stored in the nonvolatile memory, such as an EEPROM or any other appropriate nonvolatile memory, which has sufficient storage to store a predetermined number of image data frames. The vehicular driver monitoring system may also be used to monitor the vehicle interior to determine whether there is an adult occupant, a child restraint system or no occupant in the front or rear passenger seat areas. The vehicular driver monitoring system may be configured as a vehicle occupant detection system that may be used to aid in the intelligent deployment of air bags depending, for example, on the status of the vehicle occupant. Image information, such as size, shape, contour and motion may be processed by a logic circuit to determine whether to output a control signal to the air bag deployment system to prevent an air bag from deploying (such as a passenger air bag when there is no front seat passenger) or for controlling the rate at which the airbag deploys. The image sensor comprises a photosensor array that is responsive to or senses both visible light and near infrared illumination. For the vehicular driver monitoring system, either natural sources (such as sunlight) or supplemental sources of near infrared illumination may be used to enhance the image information available to and the performance of the system. For the specific the vehicular driver monitoring system applications described herein, near infrared illumination between about 700 and 1200 nm is preferred because: (1) it is visible to the photosensor array but not to the human eye and (2) it does not affect adaption of the human eye. There are a number of readily available near infrared illumination sources, including solid-state sources such as light emitting diodes (LEDs) and lasers, flash lamps such as xenon or krypton lamps, incandescent lamps such as tungsten lamps, as well as many others. Preferred, however, are gallium arsenide (GaAs) or gallium aluminum arsenide (GaAlAs) LEDs because they provide a relatively narrow band (about 750 to 950 nm) of near infrared illumination. Such illumination sources are also typically packaged with a lens to distribute the illumination. Depending on the particular application, the illumination distribution characteristics of readily available lens/source packages may range from narrow so as to provide spot or collimated illumination to very diffuse so as to cover about 160°. In the vehicle interior monitoring system, the lens/source package preferably provides illumination coverage on the order of about 100°. Other illumination sources providing broad-band illumination (ultraviolet through infrared) may also be used, but it may be desirable or necessary to filter such broad-band illumination using absorption or interference type filters, or any other appropriate filter. In particular, an interference filter known as a long-wave pass filter or cold mirror reflects visible light, transmits infrared illumination and looks like the normal silvered mirrors typically used in the rearview mirror. Alternatively, a long-wave pass absorption filter may be used with a supplemental source of broad-band infrared illumination. Long-wave pass absorption filters may be fabricated using a wide variety of polymers having appropriate optical transmission characteristics such as epoxies, acrylics, polycarbonates, as well as a variety of glasses. The acrylic and polycarbonate polymers are preferred because they are environmentally stable, cost effective and because they may be used to injection mold parts having various geometric shapes or polished or textured surfaces. Using absorption filter materials, the photosensor array and supplemental source of illumination may be integrated into the rearview mirror so that they are not readily apparent to vehicle occupants, passers-by or potential intruders.

Optionally, the mirror system of the present invention may include a user input or control at the rear passenger compartment of the vehicle so that a passenger in the rear vehicle seat may control the audio device at the docking station. For example, a touch screen may be embedded at the rear of the headrest of the front seat or seats of the vehicle, whereby a passenger at the rear seat may control the audio device or iPOD® for music selection or the like. Optionally, the rear seat control screen may receive a video feed from the docking cradle (such as via a hard wired connection or a RF communication link, such as BLUETOOTH® or the like, or other suitable communication link) so that the rear passenger or passengers may view at the rear of the vehicle front seats the same video images and other informational displays as are displayed on the screen of the portable electronic device (such as a hand-held portable GPS navigational device) brought into the vehicle by the driver or another occupant of the vehicle (and removable therefrom at journey's end).

Mirror assembly 12 includes a reflective element 28 and casing 30 and is adjustably mounted to the interior surface of the windshield of the vehicle via a mounting structure or mirror support structure 32. Optionally, the mounting structure 32 may mount or attach to the vehicle windshield via a conventional channel mount or mounting button (not shown in FIG. 1), such as described in U.S. Pat. Nos. 5,820,097; 5,487,522; 5,671,996; 5,820,097; 5,615,857; 5,330,149; 5,100,095; 4,930,742, which are hereby incorporated herein by reference in their entireties, which may provide a breakaway mounting or release mechanism as is known in the art. Although shown and described as being mounted to the vehicle windshield, it is envisioned that, optionally, the mirror assembly may be located or attached elsewhere at the vehicle, such as at an overhead console or headliner of the vehicle or the like. Optionally, the mounting structure may mount to the windshield and/or headliner and/or overhead console or the like via other suitable mounting means, such as by utilizing aspects of the mounting elements described in U.S. Pat. Nos. 6,824,281; 5,487,522; 5,615,857 or 5,671,996, and/or U.S. patent application Ser. No. 10/958,087, filed Oct. 4, 2004, now U.S. Pat. No. 7,188,963; and/or Ser. No. 11/226,628, filed Sep. 14, 2005 and published Mar. 23, 2006 as U.S. Publication No. US-2006-0061008, which are hereby incorporated herein by reference in their entireties.

In the illustrated embodiment of FIG. 1, mirror assembly 12 comprises an asymmetric mirror assembly with the mirror reflective element 28 being off-center relative to the support structure 32 and toward the driver side of the vehicle, and the display 24 being at the passenger side of the vehicle when the mirror assembly is installed in the vehicle. Such a mirror assembly may provide enhanced display characteristics by positioning the display outside of the direct field of view through the rear window of the vehicle, such as described in PCT Application No. PCT/US2006/042718, filed Oct. 31, 2006 and published May 10, 2007 as International Publication No. WO 2007/053710; and U.S. provisional applications, Ser. No. Ser. No. 60/836,219, filed Aug. 8, 2006; and Ser. No. 60/759,992, filed Jan. 18, 2006, which are hereby incorporated herein by reference in their entireties. For example, the reflective element (typically a prismatic mirror element or an electrochromic mirror element) of a typical interior rearview mirror assembly may be aligned so as to have a rearward field of view through the rear window of the vehicle. The length of the reflective element of the mirror assembly may be increased in size so that the passenger-side length is increased by about 2½ to 3 inches (relative to where the support arm attaches) so as to accommodate a video display element or screen (such as described in U.S. Pat. No. 6,690,268, which is hereby incorporated herein by reference in its entirety). The video screen may be located at the outer, expanded passenger side region of the asymmetric mirror assembly, and thus may have a field of view that is outside the field of view through the rear window (and thus not directly subject to sunlight streaming in through the rear window on a sunny day). By placing the video screen outside the direct field of view through the rear window, the mirror assembly may significantly reduce display washout on sunny days.

Display element or screen 24 of mirror assembly is thus located at or toward the passenger side of the vehicle when mirror assembly 12 is mounted at the vehicle. The display element 24 may comprise a video display element or device or may be display-on-demand or transflective type display or other display, such as by utilizing aspects of the displays described in U.S. Pat. Nos. 6,690,268; 5,668,663 and/or 5,724,187, and/or U.S. patent application Ser. No. 10/538,724, filed Jun. 13, 2005 and published Mar. 9, 2006 as U.S. Publication No. US-2006-0050018; and/or Ser. No. 11/226,628, filed Sep. 14, 2005 and published Mar. 23, 2006 as U.S. Publication No. US-2006-0061008, and/or PCT Patent Application No. PCT/US2006/018567, filed May 15, 2006 and published Nov. 23, 2006 as International Publication No. WO 2006/124682, which are all hereby incorporated herein by reference in their entireties, or may include or incorporate video displays or the like, such as the types described in U.S. Pat. No. 6,690,268 and/or U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005 and published Jul. 27, 2006 as U.S. Pat. Publication No. US-2006-164230, now U.S. Pat. No. 7,370,983; and/or PCT Application No. PCT/US2006/042718, filed Oct. 31, 2006 and published May 10, 2007 as International Publication No. WO 2007/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, which are hereby incorporated herein by reference in their entireties. Optionally, the mirror assembly may include a video display that is selectively positionable, such as extendable/retractable or pivotable or foldable so as to be selectively positioned at a side or below the mirror casing when in use and storable within or at least partially within the mirror casing when not in use. The display may be automatically activated and/or may automatically extend/pivot to an in-use position in response to an actuating event, such as when the playback device is activated (and/or optionally, when the display is associated with a rearward vision system or back up aid, when the vehicle is shifted into its reverse gear).

Optionally, for example, the display may comprise a 3.5 inch (or larger or smaller depending on the particular application) touch screen and/or video display. For example, the display may comprise a backlit video display such as the types described in U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005 and published Jul. 27, 2006 as U.S. Pat. Publication No. US-2006-164230, now U.S. Pat. No. 7,370,983; and/or PCT Application No. PCT/US2006/042718, filed Oct. 31, 2006 and published May 10, 2007 as International Publication No. WO 2007/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, which are hereby incorporated herein by reference in their entireties. Optionally, the intensity of the display may be automatically adjusted to automatically dim the backlighting of the display element, such as in response to a photo sensor 44 (FIG. 3) at the mirror assembly. The intensity of the display may thus be increased when the photo sensor senses an increase in ambient lighting so that the user may readily view and discern the display in high ambient lighting conditions, such as a sunny day, and may be decreased when the photo sensor senses an decrease in ambient lighting so that the display is not too bright in low lighting conditions to avoid being a distraction to the driver of the vehicle.

Optionally, the display may be operable to display information for viewing by the driver of the vehicle and also to display information or video for viewing by the passenger of the vehicle. For example, the output of the docking station that is received by the receiver at the mirror assembly may include video data (such as a movie or the like that is played by the playback device) for viewing by the passenger of the vehicle while the driver is driving the vehicle. Thus, the display may be configured such that the video is viewable by the passenger but substantially or principally not viewable by the driver of the vehicle (while other information, such as the selection menus and the like, may be viewed by the driver of the vehicle). The display may include louvers or microlouvers (such as described in U.S. Pat. Nos. 4,764,410; 4,766,023; 4,906,085; 5,254,388; 5,303,322; 5,313,335 and 5,481,409, and/or PCT Application No. PCT/US2006/018567, filed May 15, 2006 and published Nov. 23, 2006 as International Publication No. WO 2006/124682, and/or PCT Application No. PCT/US2006/042718, filed Oct. 31, 2006 and published May 10, 2007 as International Publication No. WO 2007/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, which are hereby incorporated herein by reference in their entireties), such as at a video display portion of the display to direct the video display toward the passenger side (and maybe downward as well) to enhance viewing of the video display by a person sitting in the front passenger seat of the vehicle, while another display portion includes louvers or microlouvers that direct the menu information at the other display portion toward the driver of the vehicle for viewing by the driver.

Optionally, the display may be configured such that the viewed information or display changes depending on the viewing angle of the display, such that the driver views the display and sees the menu/selection information, while the passenger views the display and sees the video (or other display information as desired). Optionally, the display may selectively display the desired or appropriate display images or video images toward the driver or passenger side of the vehicle via a mechanical selective tilting or angling or canting of the display element toward the selected side (such as via a pivot actuator that adjusts the display element or display module within the mirror casing relative to the reflective element to set the display element), such that the projected images are projected or emitted at the desired or appropriate or selected angle. Thus, the passenger may watch a video at the interior rearview mirror assembly (with the audio to the movie being output through the vehicle audio system as described above or through headphones or ear-buds connected to the playback device and/or docking station), while limiting interference or distraction to the driver while the driver is driving the vehicle.

Preferably, the mirror-located (or optionally windshield electronics module (WEM)-located) single video screen is a multi-viewing video screen, such as a dual-viewing screen or such as a Triple Directional Viewing LCD Screen, such as are available from Sharp Corporation and Sharp Laboratories of Europe, Ltd., who have developed a Triple Directional Viewing LCD that comprises a display that controls the viewing angle so that the display can show different images from the left, right, and center simultaneously. Alternatively, a two-way viewing-angle LCD screen with switchable viewing-angle LCD construction can be used. Such Triple Directional Viewing LCD screens from Sharp control the viewing-angle via a parallax barrier on a standard thin film transistor liquid crystal display (TFT LCD) video display element, whereby the screen splits light in three directions (such as left, right, and center) and displays three separate images on the same screen (and preferably over substantially the entire or full screen) at the same time. For example, the driver can view the interior mirror-located or WEM-located video screen for playlists and/or driver information and/or the like (preferably on-demand or episodically so that when a song or a menu selection is chosen, the image at a display on demand transflective mirror reflector, for example, is no longer seen by the driver), while the person in the passenger seat sees a different image (maybe a TV show), and the person in the back seat enjoys a movie on DVD, with all of the displays being displayed in full-screen view at the mirror-located or WEM-located display. Such a triple directional viewing screen thus provides at the mirror or WEM a single LCD video screen that plays three roles at once.

Optionally, and with reference to FIG. 2, the mirror assembly 12' of a playback system 10' may be supported via a support structure 32' at a windshield electronics module (WEM) or accessory module 36, which in turn may be mounted to or affixed to the interior surface of the vehicle windshield 11a. The mirror assembly may be supported in a button-on-button mounting arrangement with the windshield electronics module, such as by utilizing aspects of U.S. Pat. No. 6,824,281 and U.S. patent application Ser. No. 10/958,087, filed Oct. 4, 2004, now U.S. Pat. No. 7,188,963, which are hereby incorporated herein by reference in their entireties. Optionally, the mirror assembly may be mounted to the interior surface of the windshield and the windshield electronics module may attach to the mirror mounting structure or to the windshield at or near the mounting location of the mirror assembly, without affecting the scope of the present invention.

In the illustrated embodiment of FIG. 2, support structure 32' comprises a double ball mounting or support structure and includes a support arm 32a' that is pivotally attached to the mirror head or casing 30' (such as at a pivot joint 33a') and to a mirror support base 32b' (such as at a pivot joint 33b'). The mirror head or casing thus may be pivoted relative to the windshield to adjust the rearward field of view of the driver via the mirror reflective element 28', such as is known in the automotive mirror art. The mirror support base 32b' is mounted to a rearward surface of windshield electronics module 36, such as at a conventional or known channel mount or mounting button 38a', while a forward surface of windshield electronics module 36 is mounted to the interior surface of the vehicle windshield at another channel mount or mounting button 38b' (typically adhered or bonded to the interior surface of the windshield of the vehicle, such as in a manner known in the vehicle mirror art).

As shown in FIG. 2, windshield electronics module 36 may include a docking station or port 40 for receiving or docking a digital playback device (such as an iPOD® or MP3 player or the like), such as in a similar manner as described above with respect to docking station 14. Docking station 40 may be in communication with the radio and/or the mirror display in a similar manner as described above, and may communicate signals wirelessly or via a wired connection, depending on the particular application of the windshield electronics module and mirror assembly. Optionally, in such an application, the windshield electronics module may include a user input or thumbwheel or the like (such as at a lower portion of the module where the user input may be readily accessible by the driver of the vehicle) to allow the driver to control the menu/display at the mirror assembly, or the user input may be disposed at the mirror assembly and near the display element such as described above. Optionally, the docking port of the mirror system may be disposed at the mirror assembly itself, such as at an elongated foot or cowling at the mounting base of the mounting structure, or the docking port may be disposed at a fixed casing or housing of a mirror assembly, such as a fixed casing of the type described in U.S. patent application Ser. No. 11/842,328, filed Aug. 21, 2007, now U.S. Pat. No. 7,722,199, which is hereby incorporated herein by reference in its entirety, while remaining within the spirit and scope of the present invention.

Optionally, with a microphone and a phone docking station or cradle, a hands free telephone system may be integrated with the mirror system and mirror assembly. Optionally, such a hands free telephone system may work with a BLUETOOTH® compatible telephone such that the phone docking station would not be needed. Such a hands free telephone and mirror system would provide a display and control function for a portable telephone. The mirror provides an enhanced location for the user to navigate menus and/or phone number listings/contact information to allow the user to select the desired contact while maintaining the user's (such as the driver of the vehicle) forward field of view through the windshield.

Figure 4:
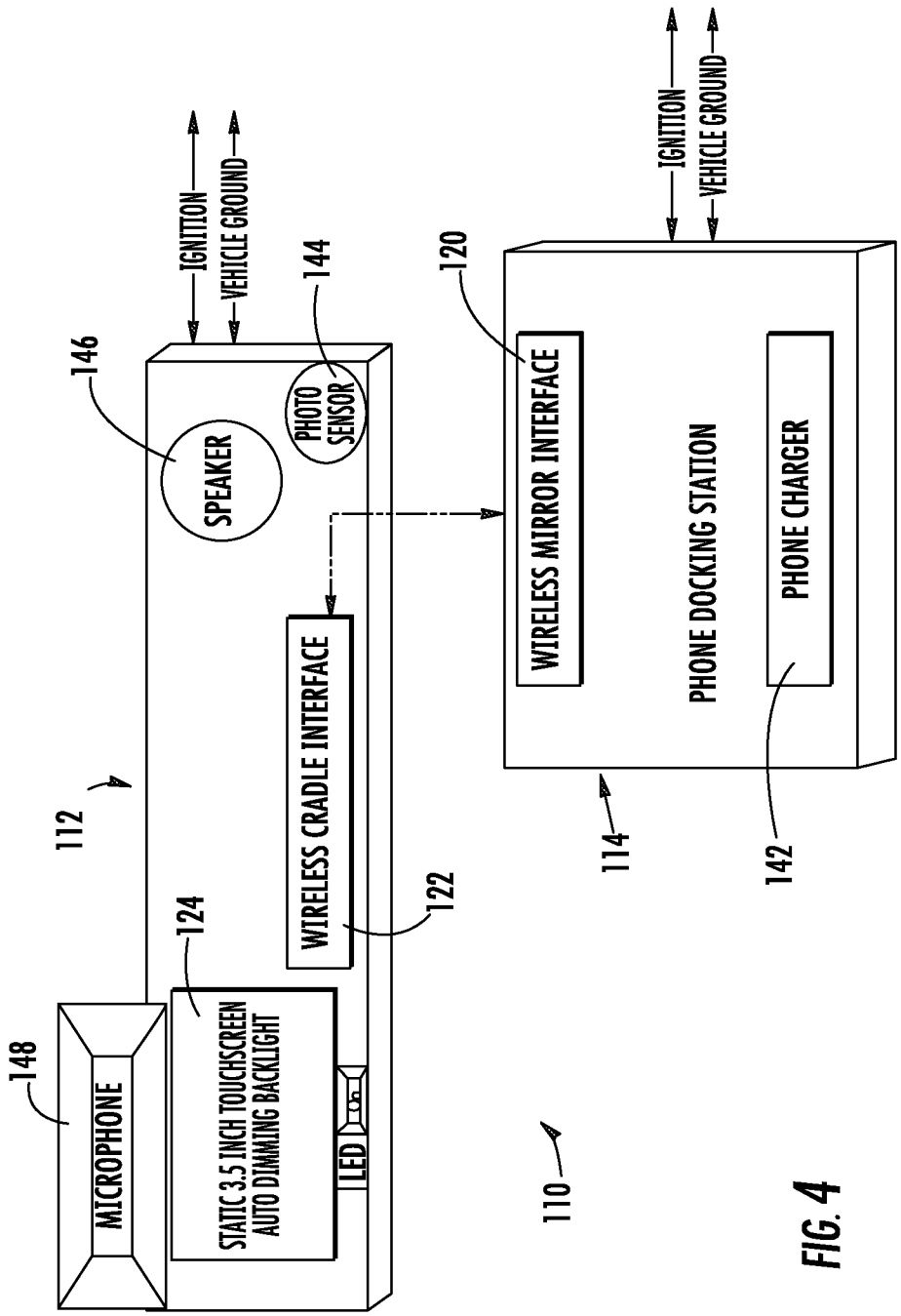
FIG. 4 is a diagram of a hands free telephone mirror system in accordance with the present invention.

For example, and with reference to FIG. 4, a telephone mirror system 110 includes an interior rearview mirror assembly 112 and a telephone docking station or cradle 114 (each of which may be connected to the ignition and ground of the vehicle). The telephone docking station 114 includes a docking port for docking a portable telephone (such as a cellular telephone or the like) and may include a charging device or element 142 for charging the battery of the telephone when the telephone is docked at the docking station. The phone docking station includes a transmitter 120, such as a BLUETOOTH® or ZIGBEE® compatible transmitter, for transmitting menu or display information from the docked telephone to a receiver 122 at the mirror assembly 112. The mirror assembly includes a display 124 (such as a static touch screen display) for displaying the telephone display and includes a user input that is operable to allow the user to navigate the telephone menus and to scroll through contact listings and the like, such as via a thumbwheel or joystick or touch screen or the like. Optionally, and desirably, the display 124 may comprise an automatic dimming backlit display that is operable to increase/decrease the intensity of the display in response to an output of a photo sensor 144 that senses the light or glare at or near the mirror assembly. Optionally, the mirror assembly and/or display may also or otherwise have manual dimming controls for manually adjusting the intensity of the display.

The mirror assembly may include a speaker 146 for providing an audio output to the user and a microphone 148 for receiving an audio input or voice signal from the user. The wireless communication interface between the docking station and the mirror allows the user to speak toward the mirror whereby the voice signal is received by the microphone and the voice signal is transmitted or communicated to the docking station and to the docked telephone at the docking station. Likewise, the communication interface allows the audio signal from the telephone to be communicated to the speaker at the mirror assembly (via the docking station) so that the user may hear the audio signal.

Thus, a user may dock the portable telephone at the docking station and may navigate the telephone menus to select and dial the desired contact. The user may then converse with the dialed or connected person or contact via the mirror-based speaker and mirror-based microphone without having to look down to the docked telephone and thus without having to take his or her eyes off the road ahead of the vehicle. Optionally, a BLUETOOTH® compatible telephone may communicate directly with the mirror and the radio (whereby the audio signals from the telephone may be output through the vehicle audio system) thus eliminating the need for the docking station. Optionally, the vehicle may be integrated with a bus (such as CAN, MOST, and/or the like), and the system may have an automatic radio mute function to automatically mute the vehicle radio or audio system when an incoming call is detected or when the user selects the telephone function.

Therefore, the mirror assembly may be in communication with a playback device docking station and/or a portable telephone and/or telephone docking station to provide display and control capabilities of the playback device and/or telephone at the mirror assembly. The interior rearview mirror provides an enhanced or improved location for the display of the menus of the playback device and/or telephone so that the driver of the vehicle may readily navigate the menus and select the desired songs or playlists while maintaining a sufficient forward field of view via the driver's peripheral vision while viewing the display. The radio of the vehicle would provide the audio controls, such as volume, tone, etc., such as in a typical or known manner. Optionally, the display may be a slideout video display or a display on demand transflective display, and may be controlled by a user input (such as a thumbwheel or joystick control or the like) at the mirror assembly. Optionally, the display may be controlled via a voice activated control, wherein the mirror assembly or windshield electronics module may include a microphone for receiving the voice commands. Thus, the mirror assembly and display may complement or supplement the playback device at the docking station so as to allow the driver of the vehicle or user of the playback device to access and control the menus and make the desired selections for playback by the playback device while viewing the display at the mirror assembly. The multimedia mirror system of the present invention thus provides a display and control function for playback devices such as iPODs and MP3 players and the like, while allowing the driver to see the playback device menus at the mirror and, at least peripherally, the forward field of view of the road ahead of the vehicle. Thus, the complementary or supplementary mirror assembly allows for control and selection of playback items or tracks or playlists by the driver of the vehicle while the driver maintains his or her forward field of view forwardly through the windshield of the vehicle, such as while driving the vehicle in a forward direction of travel.

Optionally, a vehicle navigation system may be integrated with the mirror system and mirror assembly. Optionally, the navigation system may include a docking station for docking a portable hand-held navigation device, or such a vehicle navigation system may work with a BLUETOOTH® compatible navigation device (such as a hand-held or portable navigation device with wireless communication capabilities or other communication capabilities, such as wired communication), such that a docking station would not be needed. Such a navigation mirror system would provide a display and control function for a navigation device. The mirror provides an enhanced location for the user to navigate menus and/or routes or waypoint information to allow the user to select the desired destination and/or route while maintaining the user's (such as the driver of the vehicle) forward field of view through the windshield. Optionally, the navigation device or docking station may be in wireless (or wired) communication with the vehicle radio, whereby audible information provided by the navigation device may be heard through the vehicle sound system and may be controlled (such as volume, tone and the like) via the radio controls.

Figure 5:
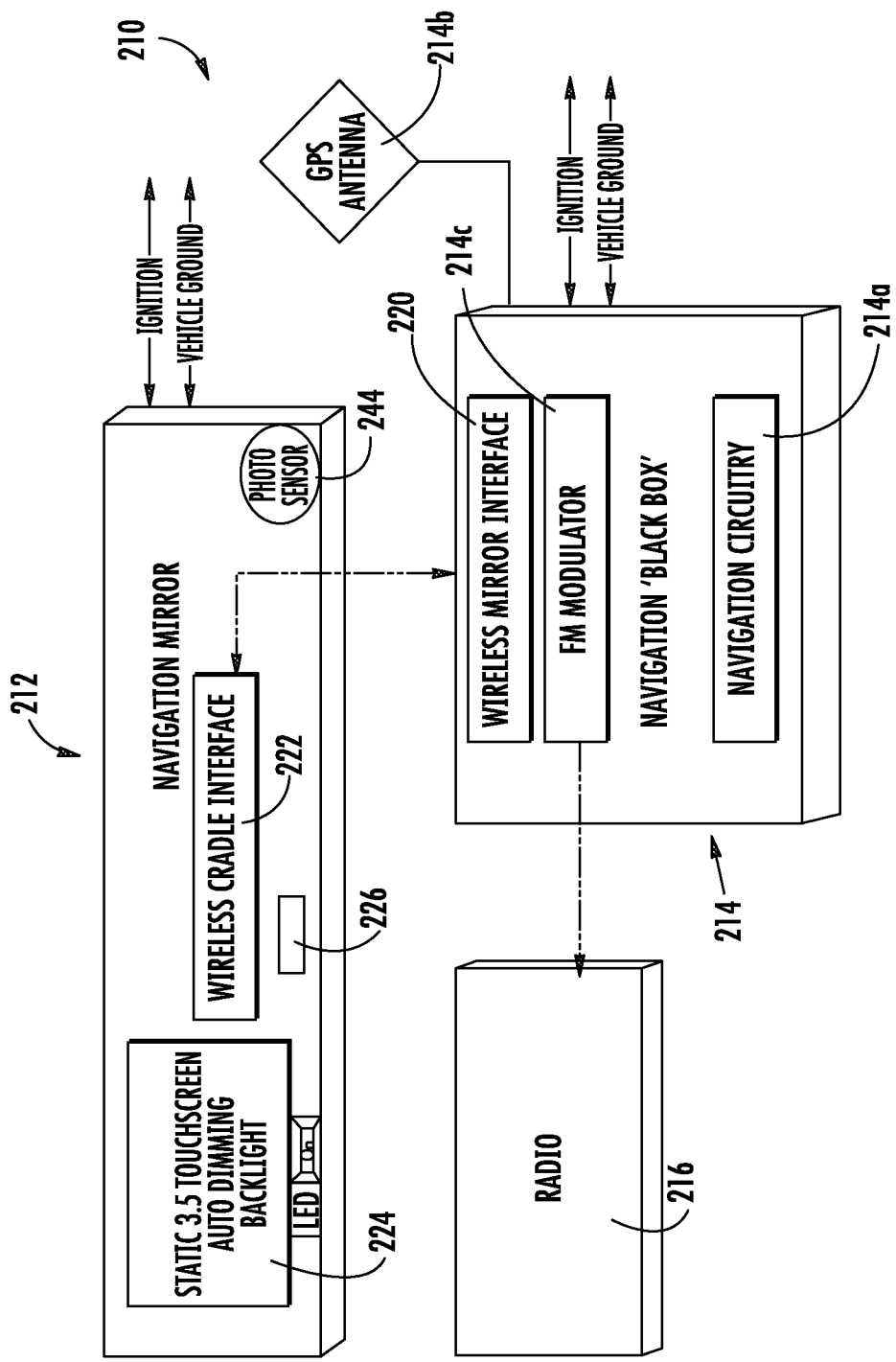
FIG. 5 is a diagram of a navigation mirror system in accordance with the present invention.

For example, and with reference to FIG. 5, a navigation mirror system 210 includes an interior rearview mirror assembly 212 and a navigation device or navigation "black box" 214 (or optionally, a navigation device docking station or cradle for receiving a portable hand-held navigation device), each of which may be connected to the ignition and ground of the vehicle. The navigation device 214 includes a transmitter 220, such as a BLUETOOTH® or ZIGBEE® compatible transmitter, for transmitting menu or display information from the navigation device 214 to a receiver 222 at the mirror assembly 212. The mirror assembly 212 includes a display 224 (such as a static touch screen display with auto dimming backlight) for displaying the navigation display and includes a user input 226 that is operable to allow the user to navigate the navigation menus and to scroll through waypoints, destinations, routes and the like, such as via a thumbwheel or joystick or touch screen or the like. Optionally, and desirably, the display 224 may comprise an automatic dimming backlit display that is operable to increase/decrease the intensity of the display in response to an output of a photo sensor 244 that senses the light or glare at or near the mirror assembly.

The navigation device 214 includes navigational circuitry 214a and a GPS antenna 214b to determine the geographical location of the vehicle and to provide routes to targeted or selected destinations, such as by utilizing aspects of known navigational devices and/or the devices of the types described in U.S. Pat. Nos. 4,862,594; 4,937,945; 5,131, 154; 5,255,442; 5,632,092; 5,798,688; 5,971,552; 5,924, 212; 6,243,003; 6,278,377; 6,420,975; 6,946,978; 6,477, 464; 6,678,614 and/or 7,004,593, and/or U.S. patent application Ser. No. 10/645,762, filed Aug. 20, 2003, now U.S. Pat. No. 7,167,796; Ser. No. 10/529,715, filed Mar. 30, 2005, now U.S. Pat. No. 7,657,052; Ser. No. 10/538,724, filed Jun. 13, 2005 and published Mar. 9, 2006 as U.S. Publication No. US-2006-0050018; and/or Ser. No. 10/964, 512, filed Oct. 13, 2004, now U.S. Pat. No. 7,308,341, which are all hereby incorporated herein by reference in their entireties. Optionally, the mirror or navigation device may include a microphone, whereby the mirror or navigation device may provide voice activated control of the navigation device.

Optionally, navigation device 214 may include an FM modulator 214c (or other suitable transmitter or communication device) so that the navigation device can communicate wirelessly to the vehicle radio 216. For example, audio messages or signals (such as voice instructions such as "turn right at maple street") may be communicated by navigation device 214 to radio 216 and may be heard via the vehicle audio system. The audio messages or signals may be controlled via the radio controls to control the volume or tone or the like of the audio signal. The mirror system may have an override function where the normal radio function or program is muted and the navigation audio signal is played through the vehicle sound system to enhance the driver's ability to hear and discern the audible navigation instructions or signals. Optionally, the navigation device may include a speaker, and thus may eliminate the connection (either wireless or hardwired) between the navigation device and the vehicle radio.

Optionally, the radio may be hardwired to the navigation device or the mirror, and/or the navigation device may be hardwired to the mirror to eliminate the wireless links. Optionally, the navigation circuitry may be incorporated into the mirror, thereby eliminating the navigation device or docking station or "black box". In such an application, the mirror may include or may be connected to a GPS antenna and may be in communication with the vehicle radio, such as in a similar manner as described above.

Figure 6:
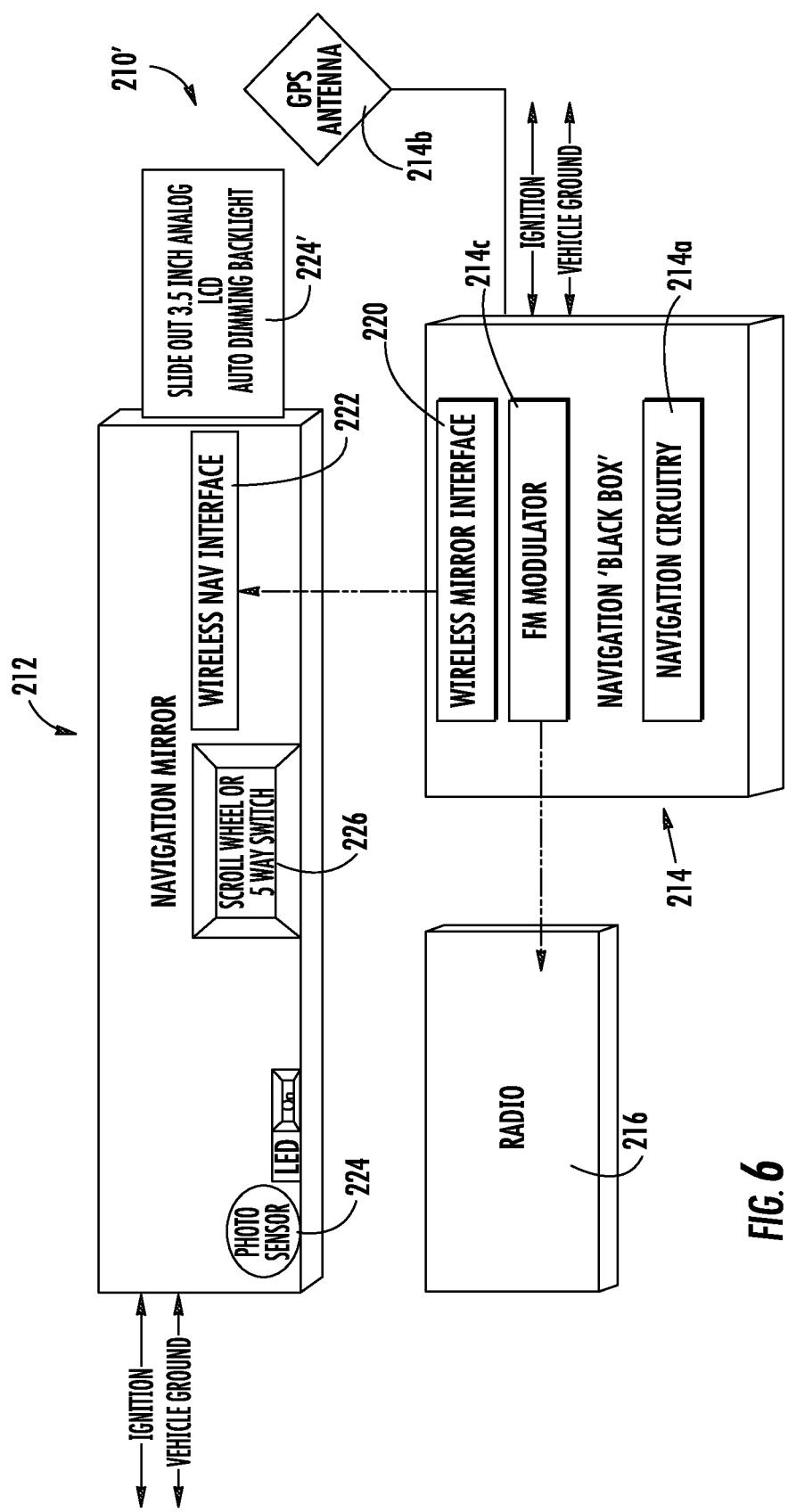
FIG. 6 is a diagram of another navigation mirror system of the present invention, with a slide out video display.

Optionally, and as shown in FIG. 5, the display 224 may comprise a static display, such as a static video display screen (such as a display utilizing aspects of the displays described in U.S. Pat. Nos. 5,530,240 and/or 6,329,925, which are hereby incorporated herein by reference in their entireties, or a display-on-demand or transflective type display or other display utilizing aspects of the displays described in U.S. Pat. Nos. 6,690,268; 5,668,663 and/or 5,724,187, and/or U.S. patent application Ser. No. 10/054, 633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005 and published Jul. 27, 2006 as U.S. Pat. Publication No. US-2006-164230, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006 and published May 10, 2007 as International Publication No. WO 2007/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, and/or PCT Application No. PCT/US03/40611, filed Dec. 19, 2003 and published Jul. 15, 2004 as International Publication No. WO 2004/058540, which are all hereby incorporated herein by reference in their entireties). Alternately, the display screen may comprise a display (such as a backlit LCD video display) that is movable to extend from the mirror casing when activated. For example, and with reference to FIG. 6, a navigation mirror system 210' includes an interior rearview mirror assembly 212' with a slide out display 224', which may extend sidewardly (preferably toward the passenger side of the vehicle so as to not interfere with the driver's forward field of view when extended) for viewing by the driver of the vehicle. Such a slide out display 224' may comprise an analog liquid crystal display (such as a 3.5 inch analog LCD) with an auto dimming backlight, and may utilize aspects of the display devices described in U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005 and published Jul. 27, 2006 as U.S. Pat. Publication No. US-2006-164230, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006 and published May 10, 2007 as International Publication No. WO 2007/053710; and U.S. provisional applications, Ser. No. 60/836,219, filed Aug. 8, 2006; Ser. No. 60/759,992, filed Jan. 18, 2006; and Ser. No. 60/732,245, filed Nov. 1, 2005, which are all hereby incorporated herein by reference in their entireties. Navigation mirror system 210' may otherwise be substantially similar to navigation mirror system 210, discussed above, such that a detailed discussion of the navigation mirror systems need not be repeated herein. The similar or common components or elements or devices of the navigation mirror systems are shown in FIGS. 5 and 6 with like reference numbers. Optionally, and preferably, the display is episodically extended, such as to display driving instructions to the driver as the vehicle approaches a waypoint or turn along the selected route, and then retracted after the vehicle has passed the waypoint and continues along the selected route.

Optionally, the display on the video screen may be operable to display an alert to the driver of a potential hazardous condition detected ahead of or in the forward path of the vehicle. For example, an output of a forward-viewing active night vision system incorporating an imaging sensor or camera device and near-IR floodlighting (such as those described in U.S. Pat. No. 5,877,897 and U.S. patent application Ser. No. 11/651,726, filed Jan. 10, 2007, now U.S. Pat. No. 7,311,406, which are hereby incorporated herein by reference in their entireties), or an output of another suitable forward facing sensor or system such a passive far-IR thermal imaging night vision sensor/camera, may be processed by an image processor, such as, for example, an EYEQ™ image processing chip available from Mobileye Vision Technologies Ltd. of Jerusalem, Israel. Such image processors include object detection software (such as the types described in U.S. Pat. No. 7,038,577; and/or Ser. No. 11/315,675, filed Dec. 22, 2005, now U.S. Pat. No. 7,720,580, which are hereby incorporated herein by reference in their entireties), and they analyze image data to detect objects. The image processor or control may determine if a potentially hazardous condition (such as an object or vehicle or person or deer or the like) may exist in the vehicle path and may provide an alert signal (such as by actuation of a visual indicator or an audible indicator or by an enhancement/overlay on a video display screen that is showing a video image to the driver of what the night vision sensor/camera is seeing) to prompt/alert the driver of a potential hazard (such as a deer or a pedestrian or a fallen rock or the like) as needed or appropriate. The display thus may provide an episodal alert so that the driver's attention is drawn to the display alert only when there is a potential hazard detected. Such a system avoids the driver from having to look forward out the windshield while often looking to or watching a monitor running a video of the camera's output, which is not particularly consumer-friendly and simply loads the driver with yet another task.

Using an image processor coupled to a forward-facing night vision sensor, the likes of a display-on-demand or transflective video mirror (or any other suitable display device viewable by the driver in the cabin of the vehicle) can be used such that the night vision video image is turned on for display to and for viewing by the driver of the video images being captured by the night vision sensor/camera only when the image processor determines that there is a potential hazard ahead. Because the night vision image is presented for view by the driver episodically and "on-demand" only when the image processor has determined that a potentially hazardous condition may exist, the driver's attention is automatically drawn to the night vision image by its episodal appearance, and so driver fatigue and overload is obviated by only having the night vision image be presented to the driver when the image processor (such as an EYEQ™ vision system-on-a-chip image processor or the like) determines and decides there may be a potential hazard on the road ahead and beyond the visible range of the vehicle's headlighting.

Optionally, the video display may be supplemented or augmented with an audible or haptic/tactile alert. Optionally, and particularly for a low-cost night vision system, the video display may be obviated and an alert device may optionally be provided with and/or a visual alert (such as an iconistic indicator of a hazard ahead), which may be generated based on an output of the image processor.

Optionally, the display by the display screen may be episodically enhanced in response to a detection of a potentially hazardous condition in the vehicle path. For example, the display system may enhance the display of the forward field of view when an object is detected in the road ahead of the vehicle. For example, the display may be enhanced by highlighting or automatically zooming into or enlarging the image of the detected object in the display or zooming and framing the image of the detected object or flashing the image of the detected object or otherwise modifying or enhancing the display and particularly the image of the detected object, so as to rapidly draw the driver's attention to the image of the detected object. For example, if a deer (or other object) is detected in the road ahead of the vehicle, the image of the deer (which may be captured by an image sensor supplemented with a near infrared illumination source, such as described in U.S. Pat. No. 5,877,897 and U.S. patent application Ser. No. 11/651,726, filed Jan. 10, 2007, now U.S. Pat. No. 7,311,406, which are hereby incorporated herein by reference in their entireties) may be enlarged or flashed or highlighted or framed or the like, so that the driver is quickly alerted to the detection of a deer (or other object) in the road. Thus, by using an image processor (as described above), the cost and complexity of providing an actual video display to the driver of the images captured by the imaging sensor (such as a night vision sensor) can be obviated. Instead of displaying on an actual video screen, the video images captured by the likes of a night vision imaging sensor/camera are fed to an image processor (such as an EYEQ™ video system-on-a-chip), and object detection/pattern recognition/scenic analysis/spatial differentiation and similar image processing techniques are used by the image processor to distinguish that an object may be ahead of and in the forward path of travel of the vehicle, whereupon a visual/audible/haptic alert may be generated to alert the driver to look carefully ahead and/or to slow down because there may be a hazard ahead (and if the driver is ignoring such an alert, then the vehicle may optionally be automatically decelerated/stopped). The image processor thus takes the role of the driver's "eyes and brain" in terms of analyzing the imaged data. Also, because there is machine vision at play here, the resolution of the imaging sensor (such as a night vision sensor/camera, such as a passive thermal-pile far-IR multipixel sensor) may be reduced/degraded because a human is not viewing the imaged data, thus enhancing economical provision of the likes of a night vision system. Optionally, a monochrome imager may be used (when an image is being displayed on a video screen, most consumers want and desire a color image) for such an application.

Figure 7:
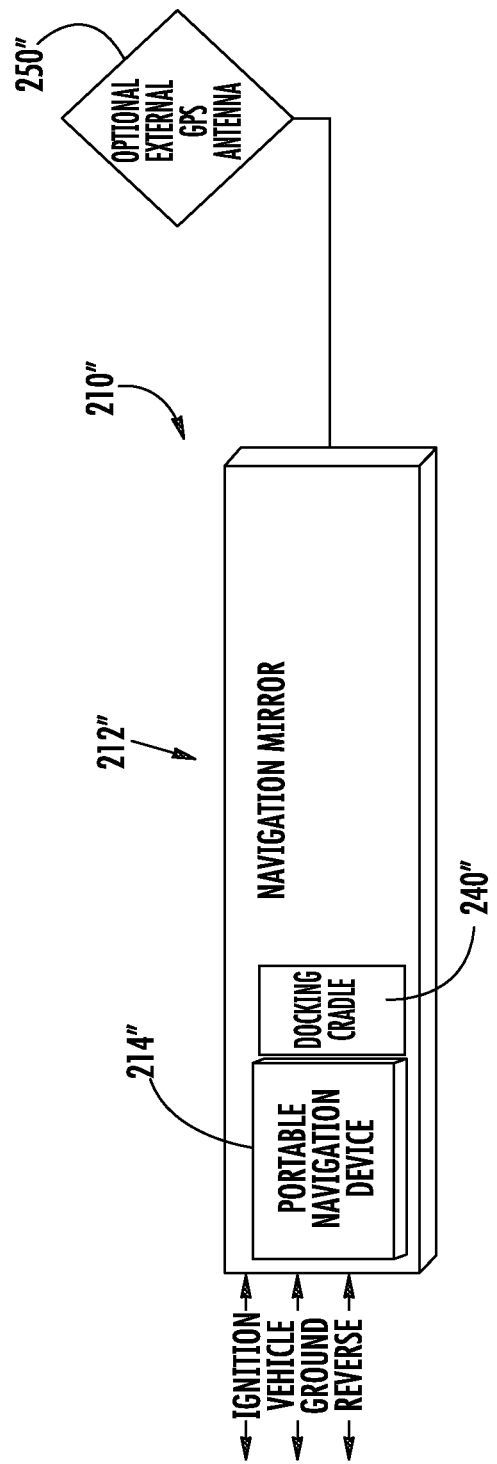
FIG. 7 is a diagram of another navigation mirror system of the present invention, with a detachable navigation device at the mirror assembly.

Optionally, and with reference to FIG. 7, a navigation mirror system 210" may include a fully integrated Personal Navigation Device (PND) 214", such as available from TomTom, Garmin and/or Navman, can be stored or disposed or docked at the interior mirror assembly 212" or at a WEM, such as by a locking mechanism or docking cradle or port 240" of the mirror assembly 212". The unit or device can be ejected (such as via a tab or the like) when the vehicle is in park (or ignition off). The stored/docked unit/device may include a small speaker located in its back, and preferably includes a touch screen or touch proximity/contact controls, text-to-speech conversion and auto brightness of the stored/docked display, which are controlled such as by mirror electronics or windshield electronics module (WEM) electronics or other electronics or circuitry of the vehicle that control via the mirror/WEM docking element.

Optionally, for example (and as shown in FIG. 7), the PND may be statically housed in a pocket or receiving portion on the driver's side (or on the passenger's side) of the interior mirror, or may be statically housed in a pocket or receiving portion at the mirror mounting portion of the interior mirror assembly (typically at the windshield of the vehicle), or at a fixed mirror housing or casing, such as a fixed mirror casing of the type described in U.S. patent application Ser. No. 11/842,328, filed Aug. 21, 2007, now U.S. Pat. No. 7,722,199, which is hereby incorporated herein by reference in its entirety. Electrical and/or mechanical connectivity to the mirror/WEM and vehicle is preferably via a quick connect element(s)/member(s), such as at either the back or side of the PND. Preferably, locking tabs hold the PND in place at the mirror. These locking tabs preferably are robust enough to pass crash testing and repeated customer use. The pocket or receptacle within or at the mirror assembly (or WEM) that houses/receives/docks the PND may have perforations or small holes (such as at the back) to allow sound from loudspeakers to travel from the PND toward or to the windshield for amplification.

Optionally, for example, the PND may be attached to or may be attachable to an extendable/retractable arm or slider or the like, such as via locking tabs, so that the PND can extend or retract such as from the passenger's side of the interior mirror assembly. Electrical and/or mechanical connectivity to the mirror assembly/WEM and vehicle can also be made through a quick connect at the side or on the extendable arm. Again, the locking tabs should be robust enough to pass crash testing. Mechanically, such a slideout version may be more complicated than the embodiment described above, and such a slideout version may not be as user friendly, since drivers will have to look further to their right to see the display.

Note that in either application, the screen of the PND is preferably a touch-screen. Optionally, another embodiment may have an FM modulator integrated, such as with an adjustable locking tab, into or at the rearview mirror assembly or WEM. Optionally, another embodiment may have a BLUETOOTH® HFCK module integrated into or at the rearview mirror assembly or WEM. Such a module may include voice recognition, a hard wired audio line, FM modulation and/or an integrated speaker. By adding a low cost GPS module to a HFCK module, a low-cost telematics unit can be formed. For example, the interior mirror located-unit can use the driver's personal cell phone to call a remote service call center. Optionally, the PND may be configured to receive WIFI transmission so as to be able to receive advertisements and other information pertinent to the location of the vehicle and PND. For example, the PND may receive restaurant information and the mirror assembly may display information about restaurants near where the vehicle is located or along the selected route that the vehicle is traveling, so as to assist the driver as he or she travels the selected route.

Optionally, the mirror assembly or docking station or port may include a satellite radio head or circuitry, and may have a satellite radio antenna (such as an XM or SIRIUS antenna and circuitry). Such a mirror assembly and system may display the radio stations and the track that is playing (via the satellite radio transmission) at the display of the mirror assembly, and may provide for control of the satellite radio circuitry via a user input at the mirror assembly (such as at the touch screen or elsewhere at the mirror assembly) or WEM or the like. Optionally, the portable hand-held navigation device may have such a satellite head incorporated therein, whereby the satellite radio station feed may be communicated through the vehicle audio system or speakers at the mirror assembly or WEM or the like.

Thus, a navigation mirror system may provide a display and control function for navigation, and may provide an enhanced location for the driver of the vehicle to navigate and view routes while maintaining his or her forward field of view. Optionally, and desirably, the navigation device of the mirror assembly may be detachable from the mirror so that it can be used outside of the vehicle, and may be attachable to the vehicle for use while driving the vehicle. Optionally, and desirably, the portable navigation device may be substantially or entirely self-contained with the user interfaces and features, such as a touch screen display, speaker and microphone, so that it can be removed from the mirror assembly and taken out of the vehicle for external use.

Optionally, the mirror assembly may be connected to an external GPS antenna 250", so that the portable navigation device may have better GPS reception when attached/docked to the mirror, thereby providing enhanced system performance when the driver is driving the vehicle. Such an external GPS antenna may also further enhance system performance by providing satellite radio reception, such as reception of traffic channels, weather channels and the like, whereby the traffic and/or weather for locations along the selected or navigated route may be provided to the driver of the vehicle (such as at the display at the mirror assembly or WEM).

Optionally, the mirror system may provide a docking station or docking cradle or support or receiving cradle for receiving and/or supporting a portable or personal navigation device or other portable digital device or unit (such as a personal audio playback device, such as an iPOD® or MP3 player or the like), whereby the docking station may be at or near the mirror assembly and not attached to the windshield of the vehicle. In some states, such as California and Minnesota, it is illegal to mount or attach or adhere such portable devices to the vehicle windshield, such as via suction mounts (such as set forth in California Vehicle Code Section 26708(a) and Minnesota Statutes 2005, Section 169.71, which are hereby incorporated herein by reference in their entireties). Thus, such portable or hand-held electronic devices or units (such as consumers might buy in the likes of a Best Buy or a Circuit City consumer electronics store, or may buy on-line via the INTERNET) may not be attached or adhered to the windshield of the vehicle, such as via a suction mount cradle or the like, or otherwise mounted in a manner that may otherwise impede the driver's forward field of view.

In order to provide a mounting arrangement for such portable or hand-held electronic devices that does not attach or adhere the device to the windshield yet supports the device at a location that is readily viewable by the driver of the vehicle and without significantly impeding the driver's forward field of view, the present invention provides a docking station or mounting support or cradle that is a part of the interior rearview mirror assembly (such as by utilizing aspects of the mirror assemblies described in U.S. Pat. No. 6,690,268, which is hereby incorporated herein by reference in its entirety), and by so doing, a portable electronic device may be supported by the interior rearview mirror assembly and may be at a location that is readily viewable by the driver of the vehicle without impeding the driver's forward field of view, and without having to attach the portable device to the interior surface of the windshield, whereby such a mounting arrangement may be allowable under various state laws. The support may be movable or pivotable between a stowed position (where the support may be generally at the mirror support or mounting base of the mirror assembly and thus at least partially out of the view of the driver of the vehicle and at least partially behind the mirror housing of the interior mirror assembly) and a use position (where the support may be lowered or moved to a location generally below the mirror assembly for holding the portable device for viewing by the driver of the vehicle), such as via a mechanical pivot or articulating or swivel configuration or the like.

Figure 8:
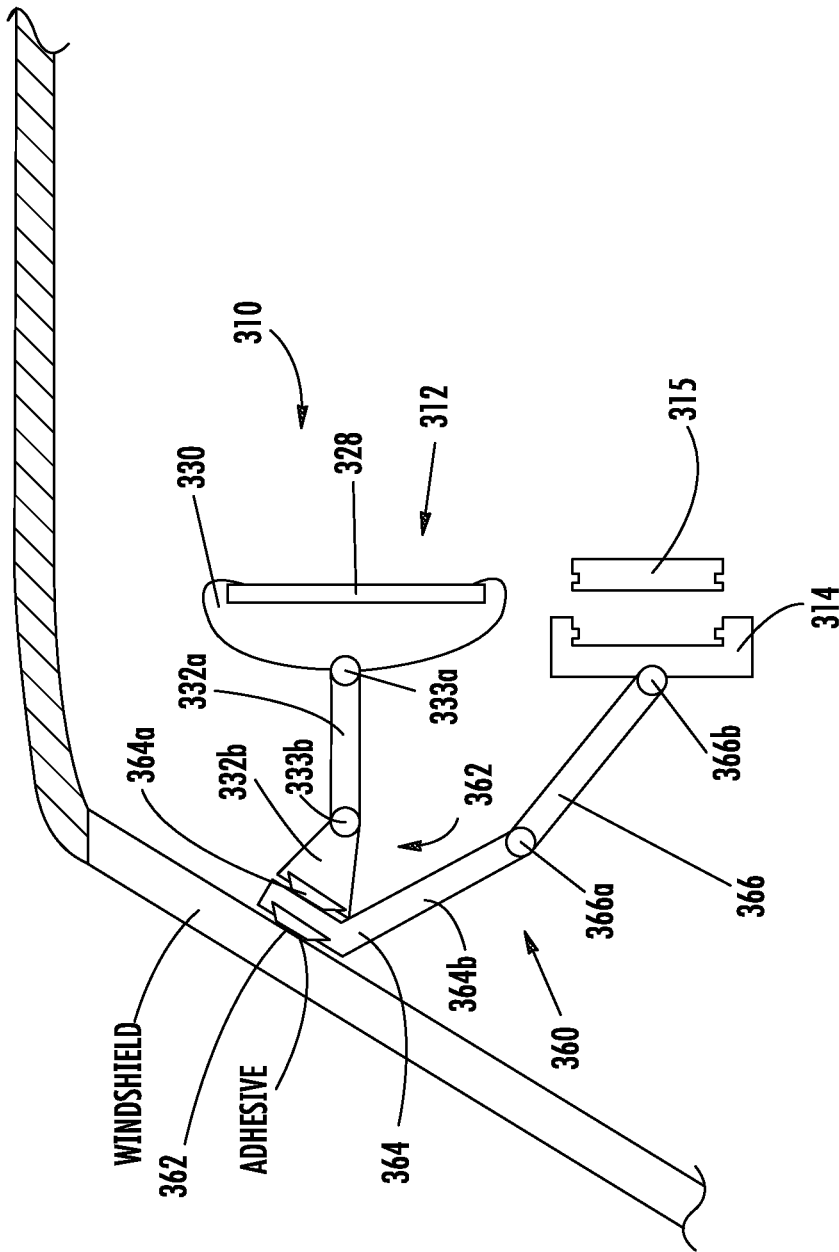
FIG. 8 is a side elevation of a mirror assembly and support assembly of the present invention.

For example, and with reference to FIG. 8, a mirror system 310 of a vehicle includes an interior rearview mirror assembly 312 and a docking station or receiving cradle 314, which is disposed at a support assembly 360 or the like of the mirror assembly. In the illustrated embodiment, docking station or receiving cradle 314 is pivotally or adjustably attached at an end of support assembly 360, which is adjustable to move the docking station between a use position (as shown in FIG. 8), where the docking station 314 and the portable device 315 (that can be the same as the consumer bought at the likes of a shopping mall or on-line) docked thereat are at a location generally below the mirror casing and thus readily viewable by the driver of the vehicle, and a stowed position (not shown), where the support assembly is pivoted or swiveled or folded or articulated or moved upward so as to be generally at the mirror casing or mirror support and not readily viewed by the driver of the vehicle, such as for when the portable device 315 is not docked at the docking station 314.

Optionally, the support assembly and docking station may mount at the mirror mounting base or mirror support base 332b or the mirror mounting button or element 362 (typically adhered or bonded to the interior surface of the windshield) so as to be part of the interior rearview mirror assembly. In the illustrated embodiment, support assembly 360 includes a base portion 364 attachable at the mirror mounting button 362, where the base portion 364 includes a second mirror mounting button or element 364a and a base support arm or portion 364b. The mirror assembly 312 may be mounted at the second mirror mounting button 364a so that the mirror assembly and support assembly are mounted at the vehicle windshield via a button-on-button mounting arrangement, such as described above and such as described in U.S. Pat. Nos. 6,690,268 and 6,824,281 and U.S. patent application Ser. No. 10/958,087, filed Oct. 4, 2004, now U.S. Pat. No. 7,188,963, which are hereby incorporated herein by reference in their entireties.

As shown in FIG. 8, mirror assembly 310 includes a mirror mounting assembly or support structure 332, which adjustably supports the mirror casing 330 and reflective element 328. Support structure 332 comprises a double ball mounting or support structure and includes a support arm 332a that is pivotally or adjustably attached to the mirror head or casing 330 (such as at a pivot or swivel joint 333a) and to a mirror support base 332b (such as at a pivot or swivel joint 333b). The mirror head or casing thus may be pivoted or swiveled relative to the windshield to adjust the rearward field of view of the driver via the mirror reflective element 328, such as is known in the automotive mirror art. The mirror support base 332b is mounted to a rearward surface of base portion 364, such as at a conventional or known channel mount or mounting button 364a, while a forward surface of base portion 364 is mounted to the interior surface of the vehicle windshield at another channel mount or mounting button 362 (typically adhered or bonded to the interior surface of the windshield of the vehicle, such as in a manner known in the vehicle mirror art).

In the illustrated embodiment, support assembly 360 includes a second support arm 366 that is pivotally or adjustably mounted at an end of support arm 364b and is pivotable or adjustable about a pivot joint 366a to adjust the orientation of the support arm 366 relative to the base portion 364. Although shown as a fixed support arm, it is envisioned that support arm 364b may be pivotable or adjustable relative to the mounting button to provide an additional pivot or swivel joint for the support assembly, if desired. Also, the support assembly may include more pivot joints, or one or more swivel joints or the like, such as ball and socket joints or other pivot/swivel type joints, while remaining within the spirit and scope of the present invention. The receiving cradle 314 is preferably pivotally or adjustably attached at an end of support arm 366 (such as at a pivot or swivel joint 366b) so that the receiving cradle 314 is adjustably mounted at the windshield and is adjustable to provide the driver a desired viewing angle of the navigation device docked at the docking station.

Optionally, and desirably, the receiving cradle 314 is configured to removably receive the portable device or unit 315, such as via a snap connection or the like. For example, the portable device may be snapped into the receiving cradle, and electronic connections (such as for charging or for communications between the portable device and mirror circuitry or vehicle circuitry or a display) between the portable device and receiving cradle may be made as the portable device is snapped into the cradle. Thus, when the portable device is docked at the receiving cradle 314, power is provided to the portable device and to the docking station, and a communication linkage between the portable device and the mirror circuitry and/or vehicle is also preferably provided. Note that the receiving cradle 314 may be a purely mechanical support for the self-contained, hand-held portable electronic device (such as a portable GPS navigation system that comes with its own integrated video screen user actuations buttons/controls/touch screen, its own microphone and loudspeaker for hands free usage, its own BLUETOOTH® or equivalent/similar wireless communication port, its own battery power supply, and the like).

Optionally, an FM modulator may be provided at the docking station or receiving cradle so that the portable device is connected to the FM modulator when the portable device is docked at the receiving cradle, whereby an audio output of the portable device or unit may be transmitted to the audio system of the vehicle (or to the mirror) wirelessly. Optionally, such an FM modulator may be attached to the portable device or unit, and may provide for wireless communication from the portable device to the vehicle system or mirror system even when the portable device is not docked at the receiving cradle.

Figure 9:
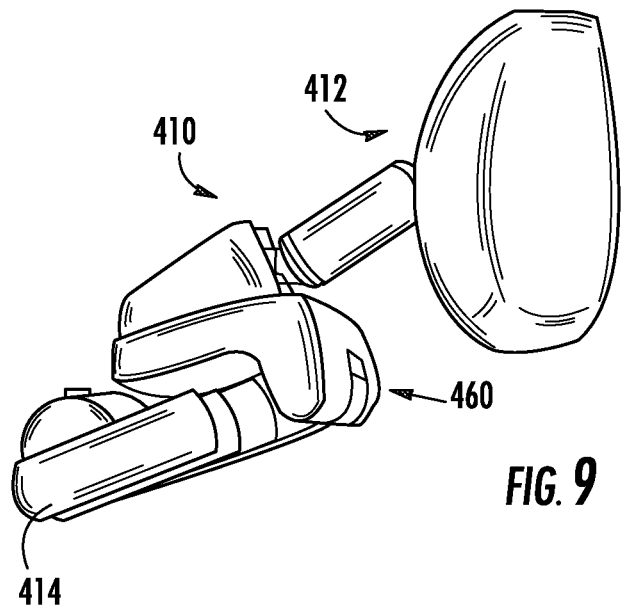
FIG. 9 is a side perspective view of another mirror assembly and support assembly of the present invention.
Figure 10:
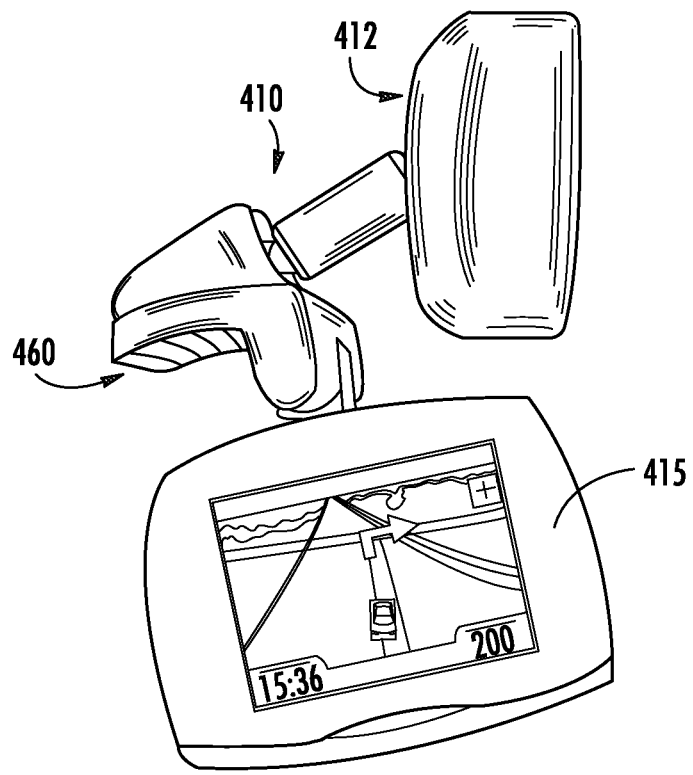
FIG. 10 is another side perspective view of the mirror assembly and support assembly of FIG. 9, with the support flipped down to a use position.

Optionally, and with reference to FIGS. 9 and 10, a mirror system 410 may include a support assembly 460 for supporting a portable or hand-held device or unit (such as a portable navigation device, such as a Garmin StreetPilot c580 or a Garmin c540 unit or the like, or such as a portable digital playback device or unit, such as an iPOD® or MP3 player or the like) at the mirror assembly 412. In the illustrated embodiment, the support assembly 460 (which may utilize aspects of the mirror assemblies and systems described in U.S. Pat. No. 6,690,268, which is hereby incorporated herein by reference in its entirety) is part of the mirror mounting base or support base and includes a docking station or receiving cradle 414 that is pivotable between a stowed position (FIG. 9), where the receiving cradle is articulated or pivoted or swiveled upward and generally along the windshield at the mounting base of the mirror assembly, and a use position (FIG. 10), where the receiving cradle (and portable unit docked thereat) is pivoted or articulated or swiveled downward so as to be readily viewable by the driver of the vehicle. As shown in FIG. 10, the receiving cradle may be pivoted or swiveled or canted toward the driver side of the vehicle to enhance viewing of the docked/supported unit by the driver of the vehicle.

Thus, the mirror system of the present invention provides a docking station or cradle or support for receiving or docking or supporting a portable hand-held device or unit at a location where it is readily viewable by a driver of the vehicle during use, and that may be moved to a stowed position generally out of the direct view of the driver of the vehicle when not in use. The receiving cradle and support assembly are part of the mirror assembly, and may be attached at the mirror mounting button or the mirror mounting or support base (or optionally to the mirror support arm or mirror casing if desired), so as to be part of the mirror assembly and not adhered to the vehicle windshield.

The receiving cradle may receive or dock a portable navigation unit, such as the types commercially available from Garmin International Inc. (such as shown in FIG. 10). Such portable navigation units typically provide information for the user to read and discern while walking and carrying the hand-held unit. However, such information often takes time for the user to read and discern as such devices are primarily designed to be used by a consumer carrying the unit in his or her hand while walking or the like, and thus may not be optimally suitable for viewing while driving a vehicle, where the driver may have difficulty in dwelling on the screen a sufficient amount of time to discern all of the information being provided by the navigation unit. Optionally, the hand-held unit or docking station or receiving cradle or mirror system of the present invention may provide an information display screen that is adapted for the habitat or environment at which it is used. For example, the display may display detailed information when used outside of the vehicle, such as when the user is walking and has time to review the information being displayed, and may display a reduced set of information when the unit is docked in the vehicle. For example, the portable unit may display multiple streets (such as the streets and other map data within a particular distance of the portable unit or a particular distance along the selected navigation route) and street names and navigation instructions when used outside of the vehicle, and may be adapted to display a reduced amount of information, such as the immediate driving instruction or street name for the next turn or a "zoomed in" map portion (such as shown in FIGS. 10 and 11A) of the area at which the vehicle is located (and optionally with an arrow indicating the direction in which the vehicle is to be driven) or the like, when used in the vehicle or when docked at the receiving cradle.

Figure 11A:
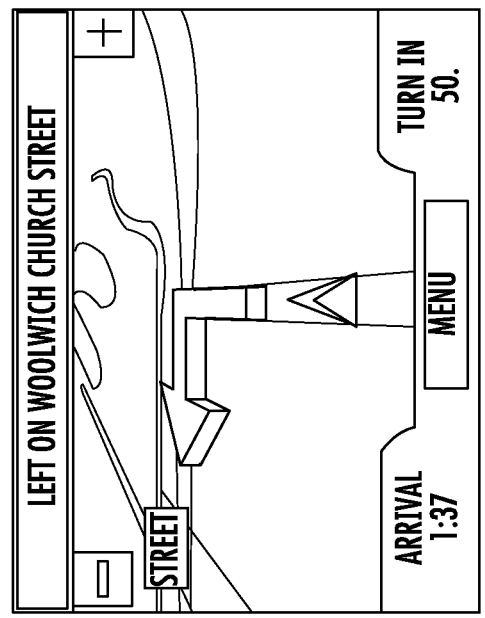
FIGS. 11A and 11B are front elevations of a display that may be displayed by a portable navigation device docked at the support assembly of the mirror assembly and support assembly of FIG. 10.

Preferably, only a sparse sub-set of the likes of the map data shown in FIGS. 10 and 11A is shown to the driver when the unit is operated within the confines of the vehicle. For example, the detail shown in FIG. 11A may be the display shown when outside the vehicle (such as via a Consumer Hand-held Display Format, which shows additional details for viewing by a consumer when the consumer is not driving a vehicle, such as street names and addresses and/or other map or directional/instructional data), but when the device or unit is used within the vehicle by the driver, only the arrow may be displayed in a "turn-by-turn" format, but now larger to fill the screen so that the driver can tell at a glance whether to keep driving ahead, or to turn left, or to turn right, or to take a left fork or take a right fork, or the like (and thus, the display is re-formatted to an In-Vehicle Display Format and shows a reduced degree of information (such as large arrows indicating a turn is approaching or the like) so that the driver may readily discern and understand the displayed information via a quick glance at the display while the driver is driving the vehicle). Optionally, only the next instruction (such as "Left on Woolwich Church Street ahead") may be displayed when the device is used in the vehicle, such as in large font so as to alert the driver that the next cross street is ahead, and to turn left (or other driving instruction). Thus, the Consumer Hand-held Display Format may change to an In-vehicle Display Format where there is less information/detail displayed by the device and where the images/information displayed are larger and less cluttered. The display format may be selectable by the user, such as via a user input or the like, or may automatically set to the Consumer Hand-held Display Format when the portable device is not in communication with the vehicle-based system (such as when the portable device is external the vehicle and being carried by the user) and may automatically set to the In-vehicle Display Format when the portable device is in communication with the vehicle-based system or when the portable device is located in the vehicle or the like.

Thus, the information that is critical or highly relevant to the driver of the vehicle is displayed as an enlarged display that may encompass all or a substantial portion of the display screen so that it is readily viewable and discernible by the driver of the vehicle. Since the display screens of such portable hand-held navigation devices are typically sized in the range of about two inches diagonal to about four and one half inches diagonal, the display screen is relatively small, such that detailed information may be displayed in a manner that is too small or busy for a driver to quickly view and discern while driving the vehicle. By adapting the display to be a more focused, lower-detail but larger font/character/icon size display that displays only the critical or highly relevant information to the driver (but larger than when the unit is typically used outside the vehicle), the present invention may display such critical or highly relevant information as large as possible (and with little to no auxiliary or background map or point-of-interest data/information shown) so that it is quickly viewable and discernible by the driver of the vehicle when the driver quickly glances over at the display while he or she is driving the vehicle (and thus the driver may quickly redirect his or her attention back to road to enhance the driving of the vehicle).

Optionally, the display may be dynamically adapted or dynamically scalable, whereby the display scale (such as the degree of zoom of the map portion being displayed) may vary depending on how far away the vehicle is from a waypoint or a destination of the selected route. For example, the closer the GPS detects that the vehicle is to the next waypoint, the larger the display information (such as a map or depiction of the road or intersection that the vehicle is approaching) gets, so that the information being displayed is dynamically scalable and/or map data may automatically change to a simpler turn-by-turn arrow or the like that gets bigger as the turn to be taken is approached (and that flashes or otherwise highlights if the driver misses the turn). Thus, as the vehicle approaches a waypoint or destination or point-of-interest along the selected route, the driver may more readily view and discern the next driving instruction, since the display information pertaining to the next driving instruction will be enlarged as the vehicle approaches the next waypoint.

Optionally, and desirable, the hand-held unit or docking station or receiving cradle or mirror system of the present invention may be dynamically adapted to switch between the detailed information display and the reduced information display. For example, the receiving cradle may cause the portable navigation unit to switch to the reduced information display when the portable navigation unit is docked at the receiving cradle (such as via a mechanical means such as a switch or the like, or via a non-mechanical means such as a proximity sensor such as a Hall-effect sensor or the like), or the portable navigation unit may receive a signal from the mirror system (such as via a BLUETOOTH® receiver or the like of the portable navigation unit) when within a particular range of the mirror assembly or docking station or vehicle whereby the signal causes the portable unit to switch to the reduced information display for use while the vehicle is being driven. Other means for adapting or switching the display of the portable navigation device or unit between the detailed information display and the reduced information display may be implemented while remaining within the spirit and scope of the present invention. Optionally, the hand-held unit or docking station or receiving cradle or mirror system of the present invention may include a manual or user input (such as a switch or button), so that a user of the device or unit may manually select the display mode of the portable navigation device or unit.

Figure 11B:
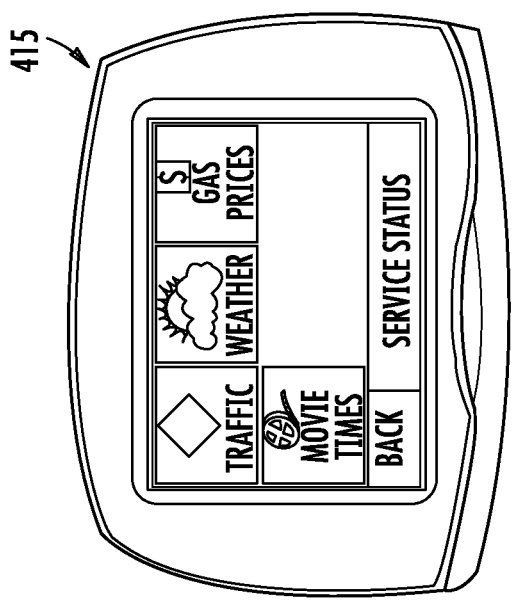

Such portable navigation units, such as the nevi 680 and the StreetPilot c580 commercially available from Garmin International Inc., provide personal navigation devices that provide map data and navigational instructions, and that may incorporate real-time traffic reports, gas prices, weather conditions, and movie times (such as can be seen in FIG. 11B) from Microsoft's MSN Direct network. The portable devices or units may receive up-to-date traffic incident and flow information for major cities across the United States. Once the vehicle driver programs a destination into the device, MSN Direct traffic data helps select a route that avoids traffic accidents, road closures, and construction. If conditions change during the trip, the device may automatically alter the route to minimize trip time. Optionally, and desirably, the device may provide an alert to the driver of the vehicle to alert the driver that the route has been altered.

Optionally, such devices may also receive gas price data from gas stations, and/or may receive weather information or other information that the driver may find relevant as the driver navigates the selected route, so that the driver of the vehicle is informed of weather and gas prices and other information along the selected route. Optionally, and desirably, the portable navigation device may include a video display screen, such as a super-bright 4.3-inch touch screen, with easy-to-use interface, travel and entertainment capabilities, and may provide an audio output (for spoken street names). Such portable navigation devices typically include a high-sensitivity GPS receiver, BLUETOOTH® hands-free calling capability, an FM transmitter (so that the device is capable of playing voice prompts and entertainment over a car stereo or the like).

Optionally, and with respect to any of the above described mirror systems, the radio (audio line in) and/or mirror may be hardwired depending on the particular application, thereby eliminating the wireless communication links. Optionally, the vehicle may be equipped or integrated with a bus (such as CAN, MOST or the like) and the communication lines between the components may be made over the vehicle bus, thereby eliminating hardwires and/or wireless modules. Optionally, digital photographs and/or videos may be displayed at the mirror display utilizing the vehicle bus or a higher end wireless module, such as a wireless module that provides ultra-wideband (UWB) wireless communication that is capable of providing a high speed data transfer link between the components, such as described below.

Optionally, a FM modulator may be incorporated into the mirror assembly to make it a substantially standalone system, such as for the hi fidelity stereo audio output, without a hardwire interface to the vehicle's audio system. Such a configuration may ease the installation complexity at the vehicle. Typically, the radio would need an auxiliary audio input, or optionally the installer may tap directly into the speaker wires, to provide an audio connection for audio output through the vehicle speakers. By providing a FM modulator at the mirror assembly, the audio output of a personal navigation device or personal audio device may be played through the vehicle's speaker system without additional hardwire connections between the docking station and the vehicle's audio system. Such a configuration may be especially useful for a mirror that docks a personal audio device, such as an iPOD® or the like, where a high fidelity audio output is highly desirable. Also, a personal navigation device (PND) could communicate the navigation information directly and wirelessly to the mirror assembly and/or to the vehicle's audio system. Today, many cell phones are offering navigation service as well. When such phones are capable of transmitting navigational information, the mirror assembly of the present invention may function to display/control such information that is communicated from the hand-held device (such as a PND, cell phone and/or the like).

Optionally, a reverse aid camera or image sensor may be integrated with an additional analog/digital (A/D) circuit and reverse input (where the mirror circuitry or WEM circuitry may receive an input indicative of the vehicle being shifted into its reverse gear). The mirror display may be activated (and/or extended/retracted) in response to the reverse input, so that the display may extend and activate when the vehicle is shifted into the reverse gear so as to display images of the scene captured by the rearward facing camera. Optionally, the mirror display may also or otherwise display other vehicle characteristics or functions, such as a compass heading of the vehicle, an outside temperature (in response to an external temperature sensor of the vehicle), a tire pressure of at least one of the vehicle tires, a passenger side airbag status, and/or the like, while remaining within the spirit and scope of the present invention.

Figure 12:
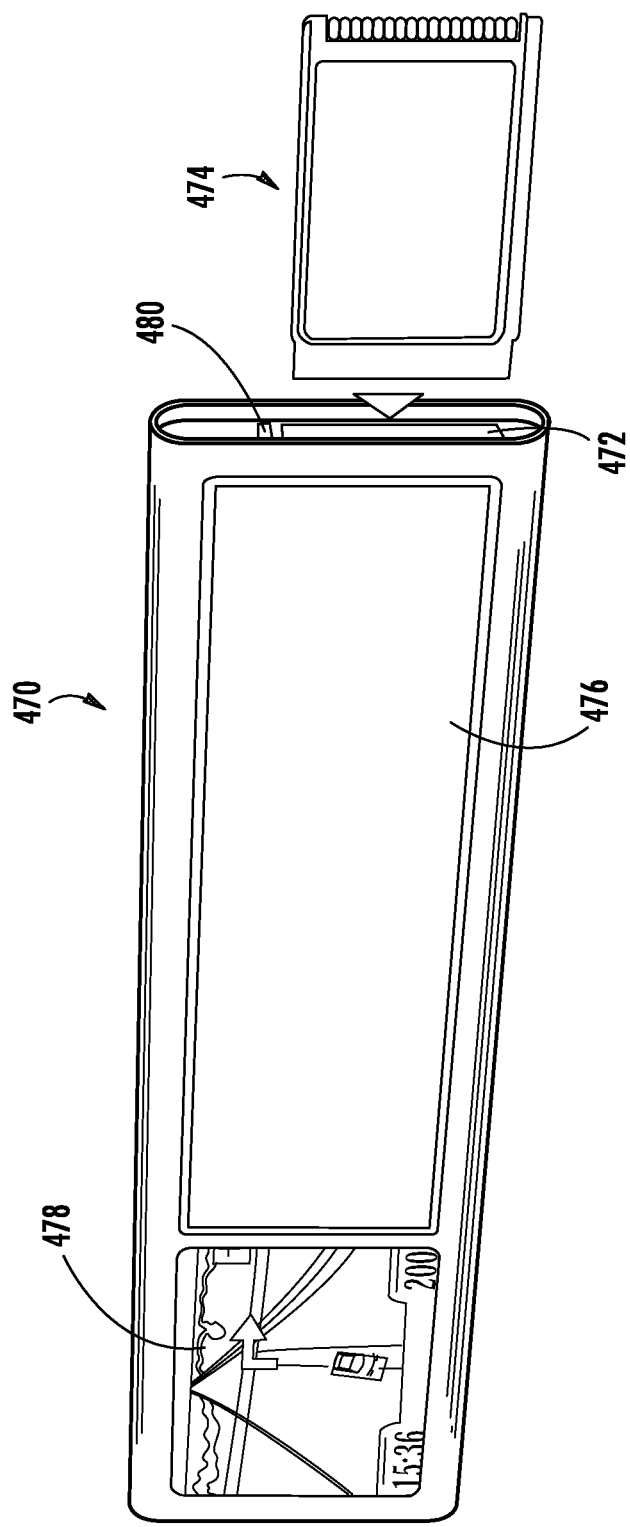
FIG. 12 is a perspective view of an interior rearview mirror assembly in accordance with the present invention.

Optionally, an interior rearview mirror assembly 470 (FIG. 12) may include a slot or receiving portion 472 for receiving a PC card or plug-in module 474 to provide the desired or selected or appropriate electronic content or features to the mirror assembly. The plug-in module 474 is inserted or plugged into the receiving portion to electrically connect the circuitry of the module to the circuitry of the mirror assembly (such as circuitry of a printed circuit board or the like within the mirror assembly). The card may provide a variety of features or functions or content, as discussed below. In the illustrated embodiment, the mirror assembly 470 includes a reflective element 476 and a video display screen 478, such as a touch screen or the like. The video display screen 478 may be associated with a navigational feature or function, and may display driving instructions or navigation information or map data or the like.

Optionally, the video display screen 478 may display navigational information provided by the plug-in module 474 when the plug-in module 474 is inserted into or plugged into the receiving portion 472 of the mirror assembly 470 (such as a slot or socket or the like at a side or end of the mirror assembly). Optionally, for example, the plug-in module 474 may provide road or street or map data for a particular geographical region or regions, whereby the driver of the vehicle may insert an appropriate module when driving in the respective geographical region to which the module is associated (such that the mirror circuitry need not include extensive map data, since the appropriate map data may be provided by selecting an appropriate plug-in module). Other plug-in modules or cards may be provided for map data of other geographical regions, or for other electronic content or features for the mirror assembly, such as discussed below.

Optionally, the plug-in module or card may have GPS capability (such as by including a GPS antenna and/or sensors and/or circuitry and the like on the module or card). Such a GPS card or module may be provided from various hand-held GPS device suppliers, such as Garmin or the like, and may be sold separately as an aftermarket unit. Such plug-in cards or modules may be used for different vehicles (with similarly equipped mirror assemblies or accessory modules or the like), whereby a user may readily transfer the GPS function or navigation functions to another vehicle. Such plug-in modules or cards may also provide an upgradeable feature for the vehicles, whereby a user may purchase upgraded levels of plug-in modules or cards if desired and depending on the particular application and features desired or selected by the user or driver of the vehicle.

The plug-in module 474 thus may be inserted into the receiving portion of the mirror assembly, and may be retained within or at least partially within the mirror assembly when plugged into the receiving portion. The mirror assembly or card or module may include a releasing element, such as a releasing button or element 480 that a user may depress or actuate to release the module or card from the mirror (optionally, the receiving portion may be spring-loaded or otherwise biased so as to partially eject the card or module when the releasing element is actuated by a user so that the user may readily grasp the card or module to remove the card or module from the mirror assembly). Optionally, and desirably, the slot or opening for the card or module may have a flap or cover that may move to close or substantially close the slot when the card or module is removed therefrom, and may readily move to an open position (such as via pivoting) when a card or module is inserted into the slot or opening.

Figure 13:
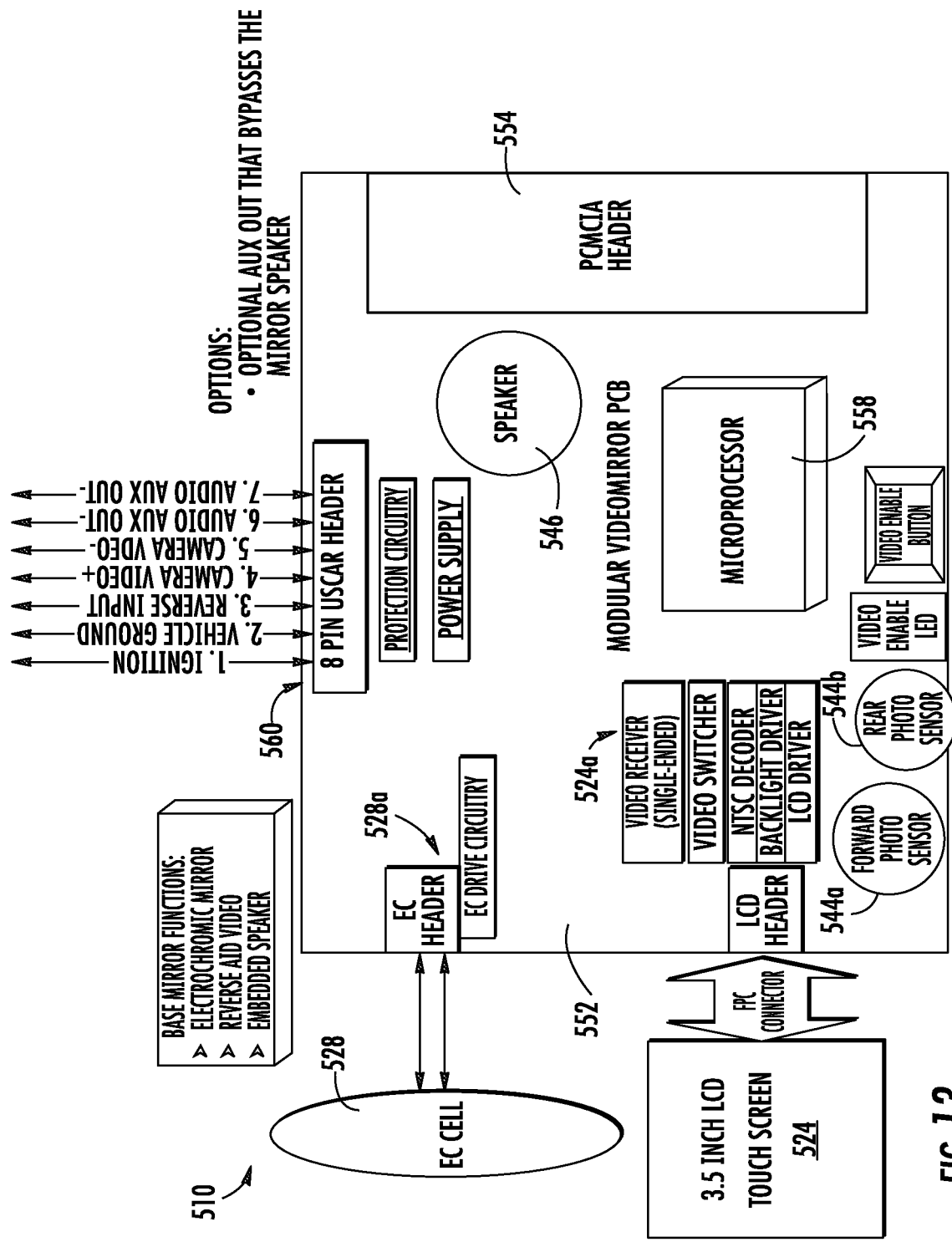
FIG. 13 is a schematic of an interior rearview mirror assembly having an embedded speaker and a PC card interface or connector therein for connecting to a removable or insertable PC card in accordance with the present invention.
Figure 13A:
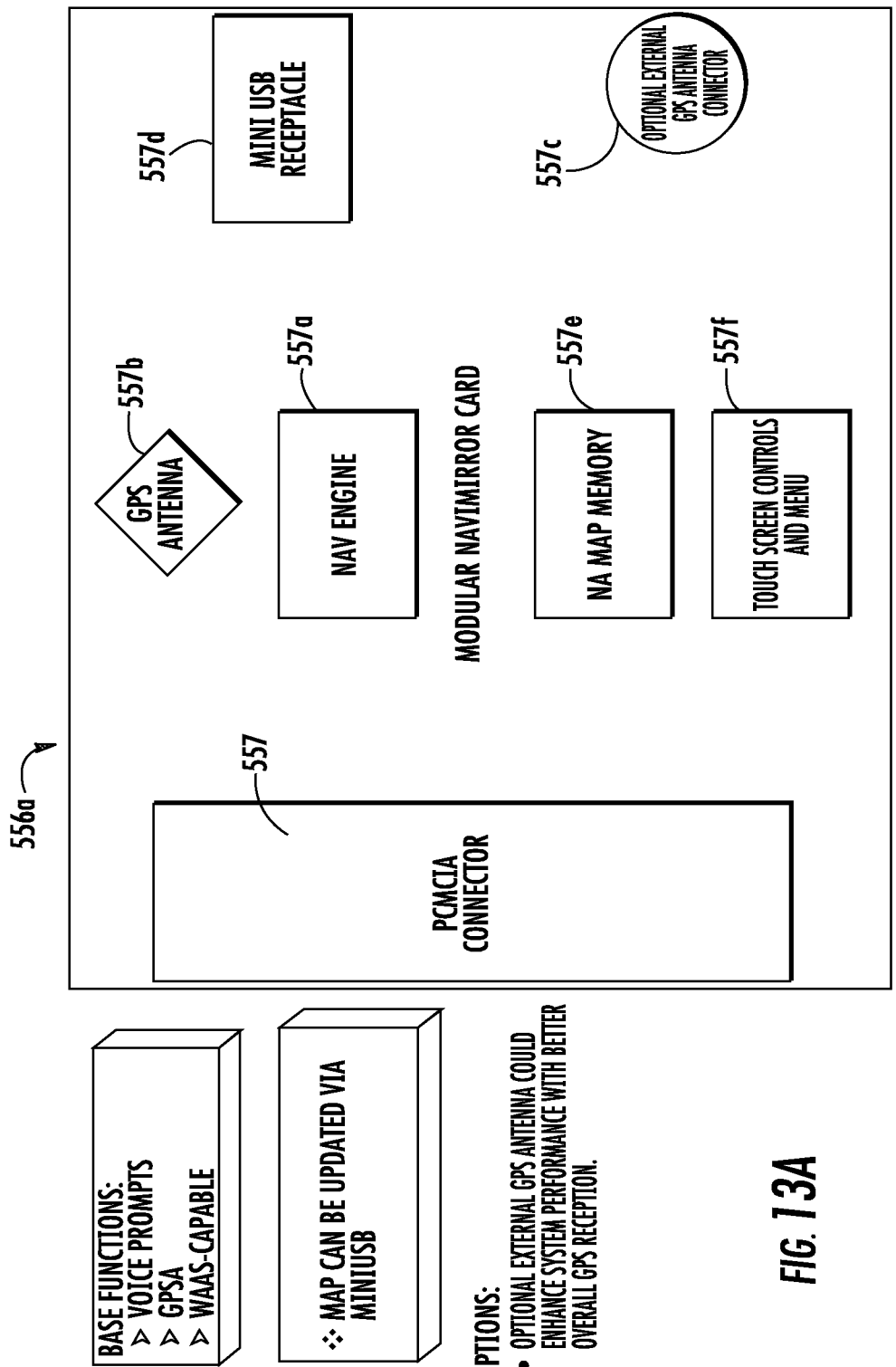
Figure 13B:
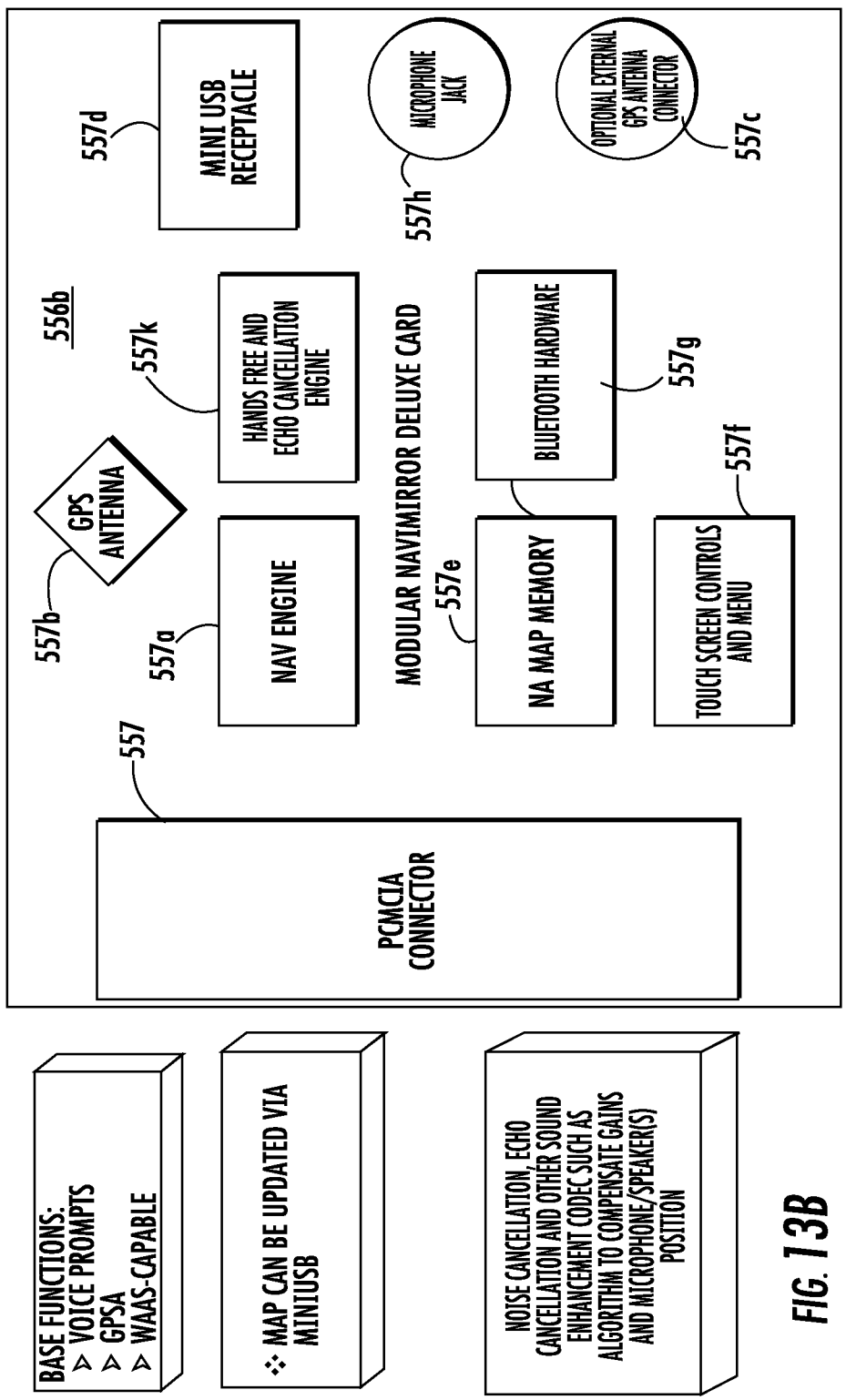
Figure 13C:
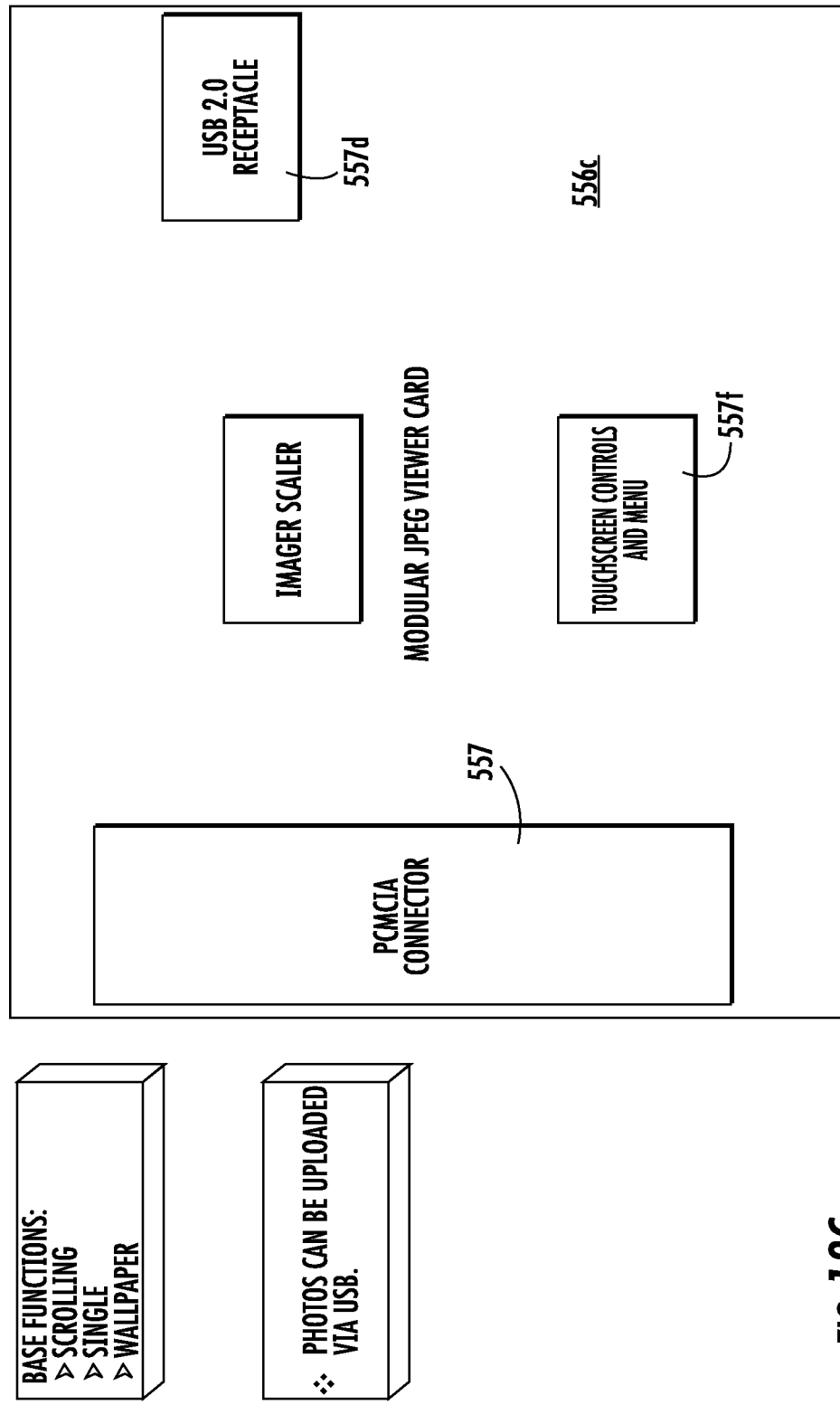
Figure 13D:
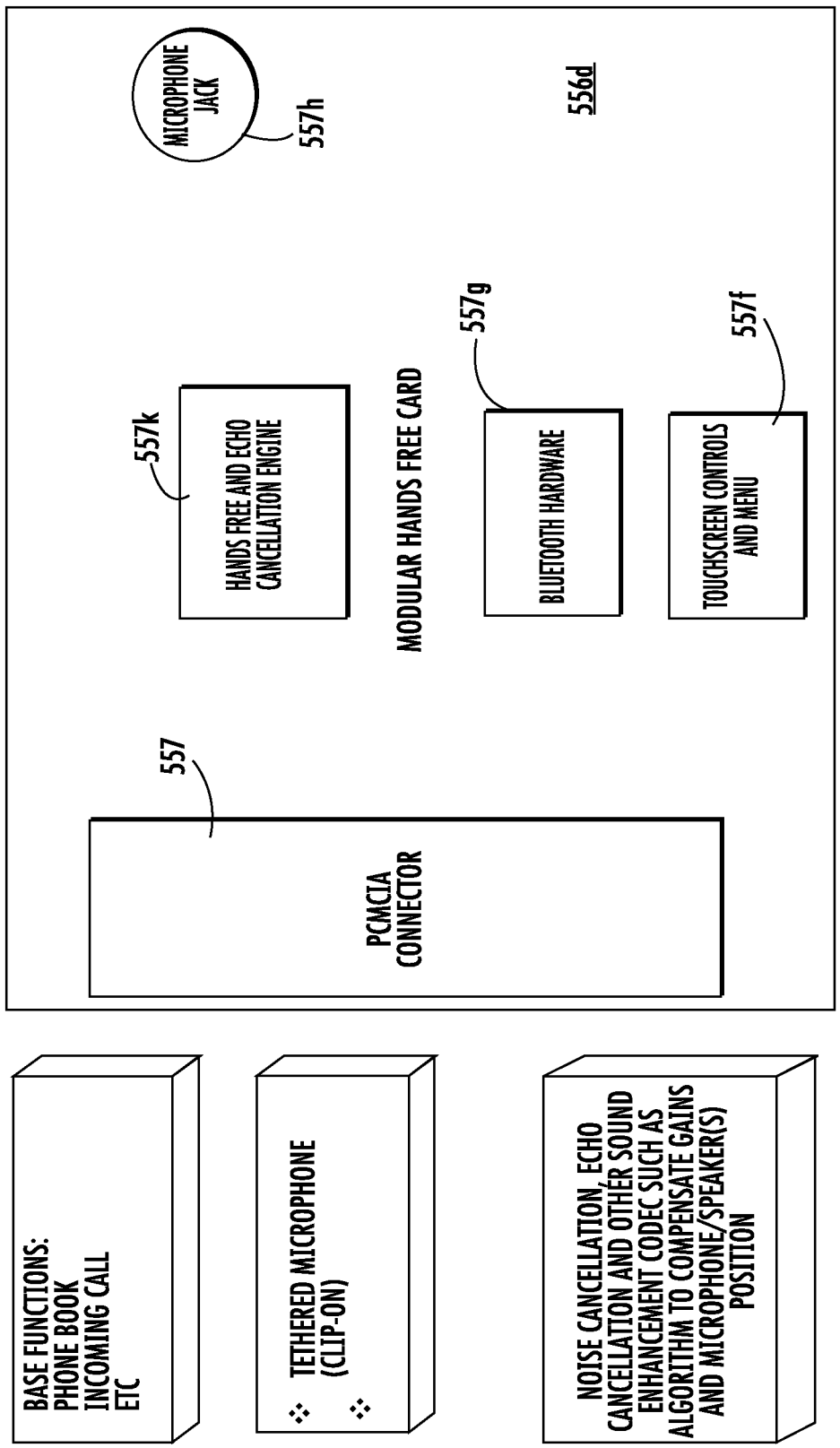
Figure 13E:
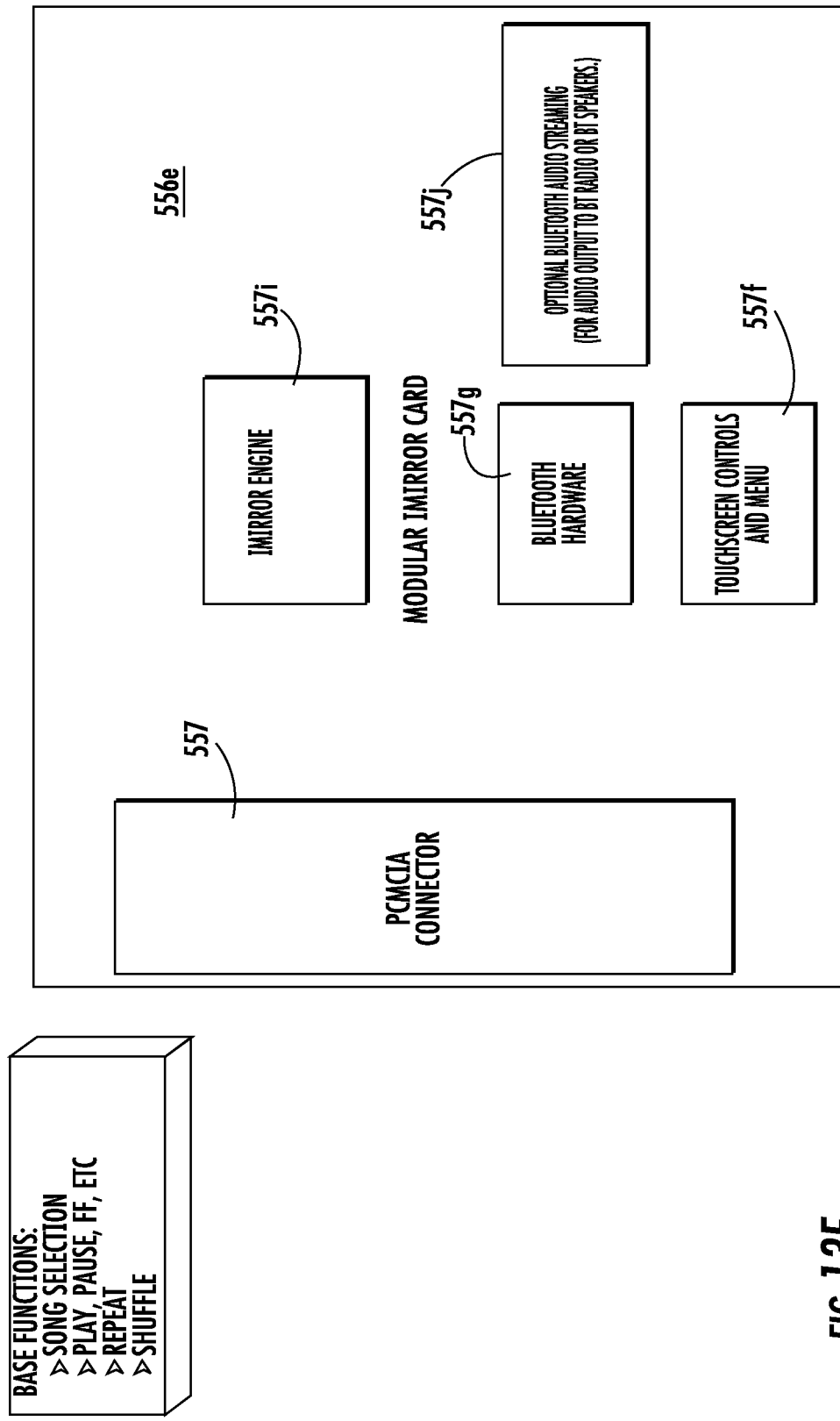
Figure 13L:
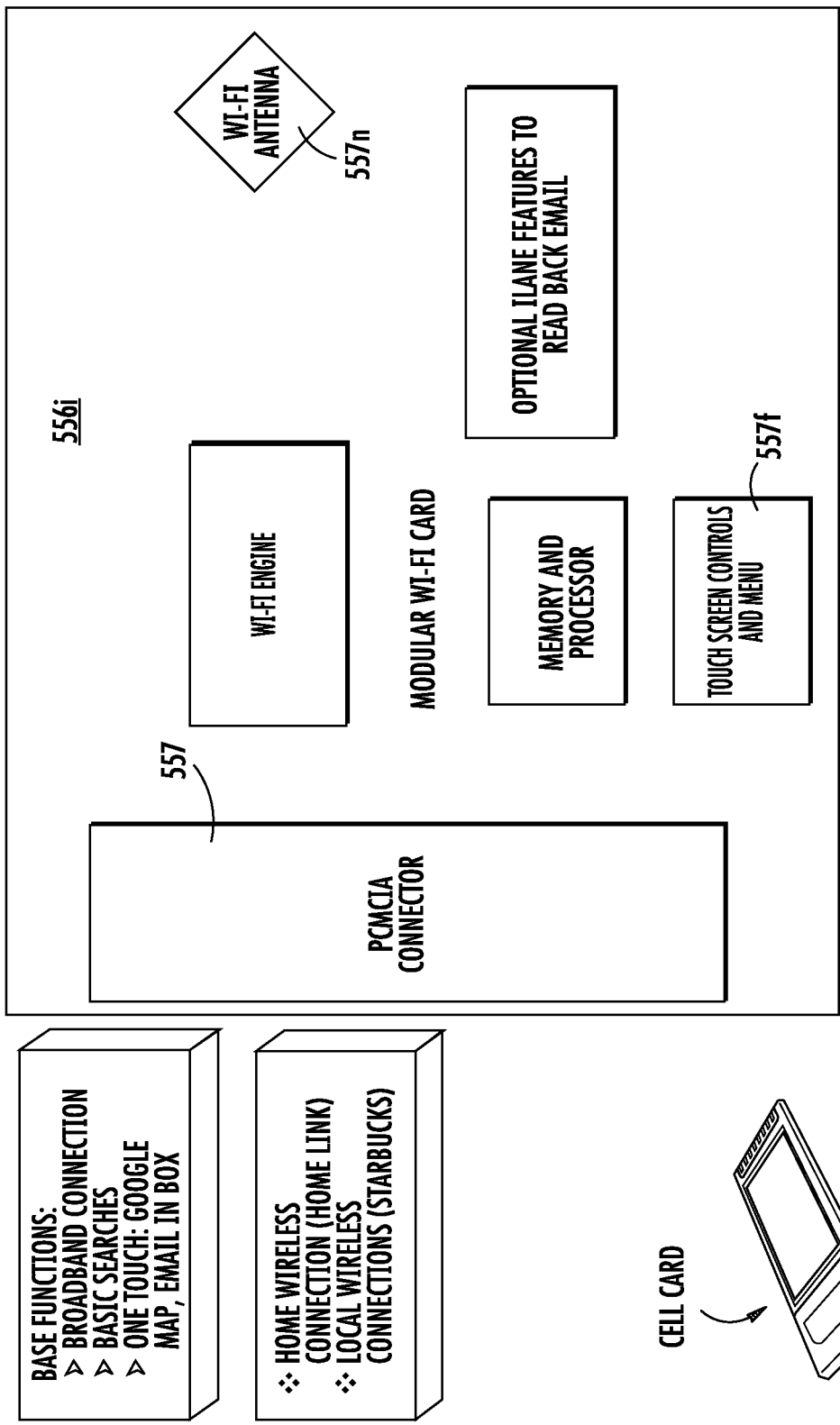
Figure 13K:
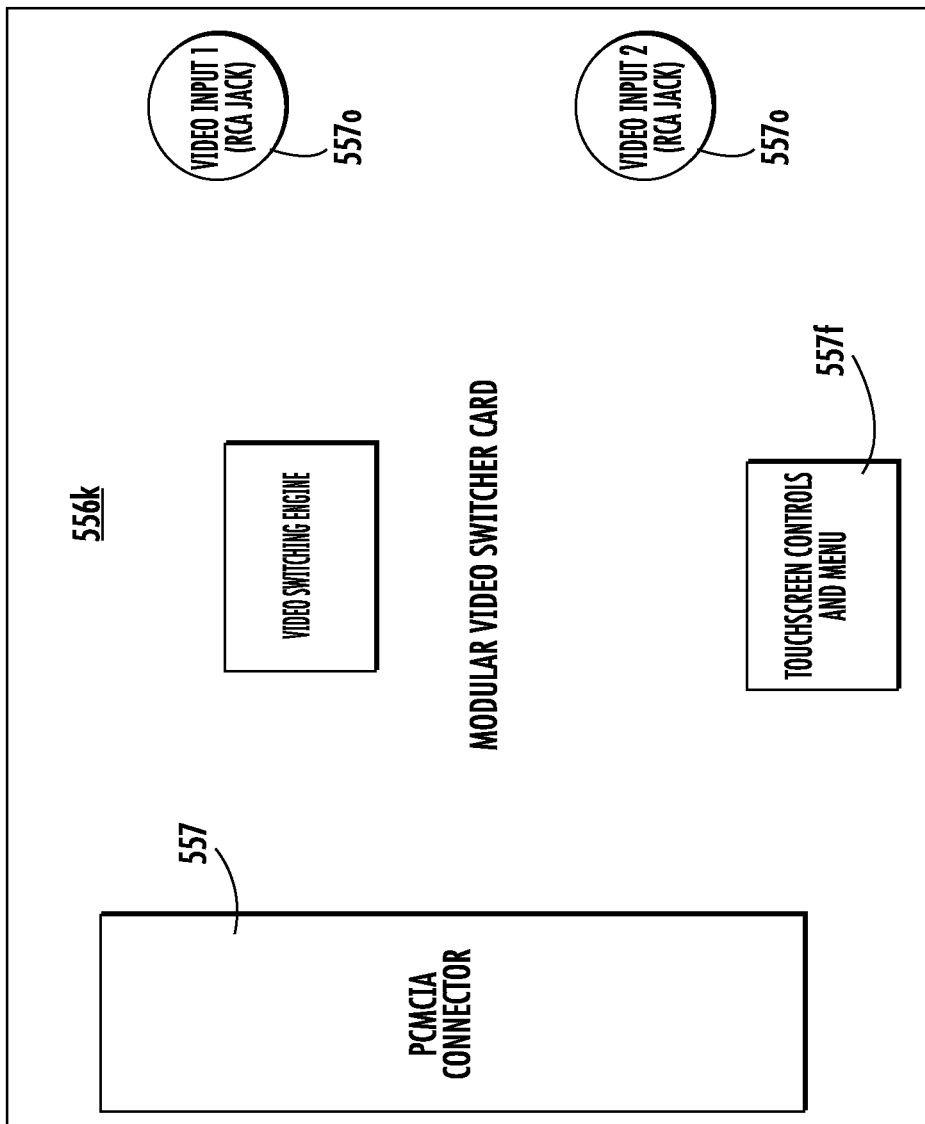
Figure 13L:
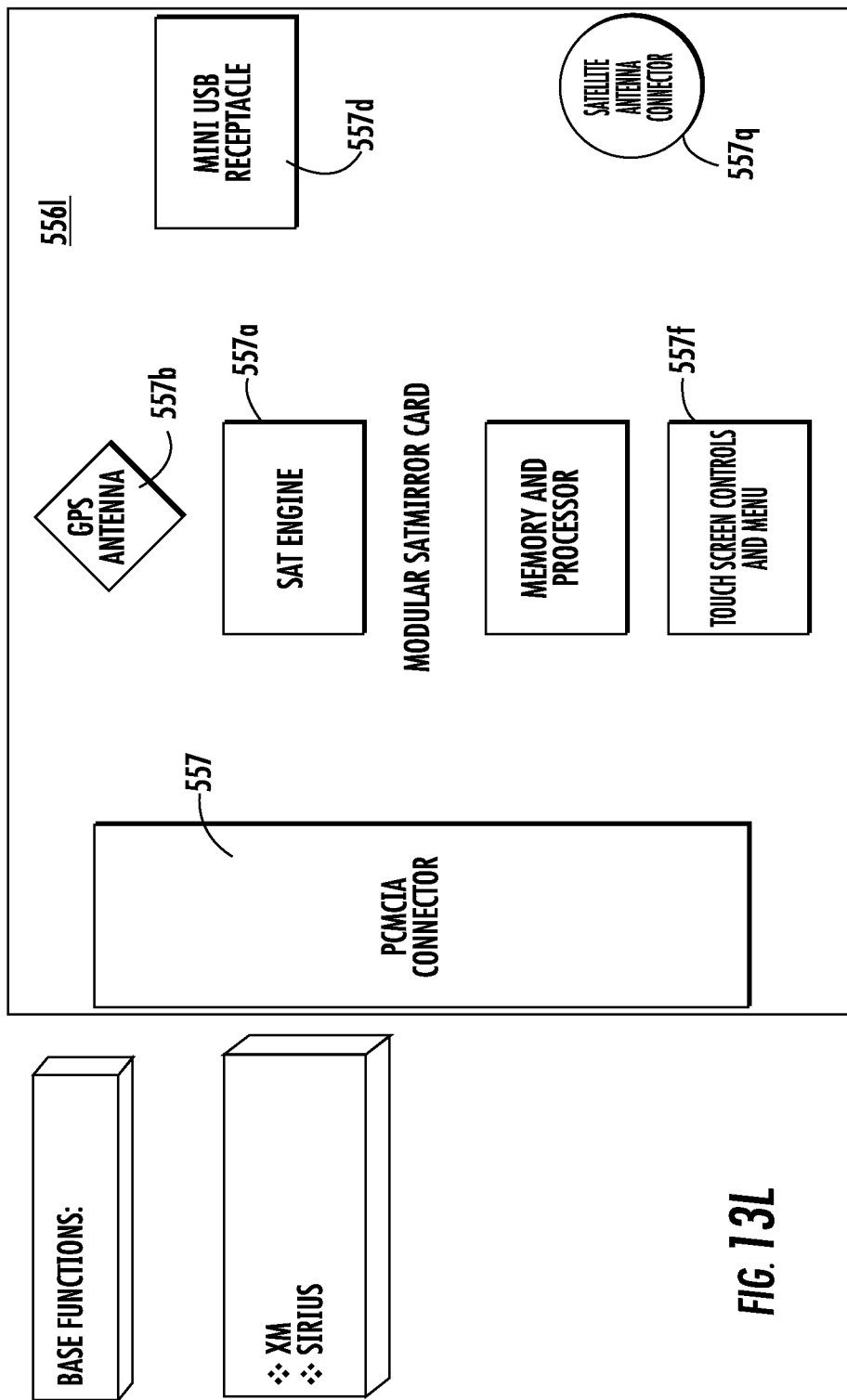

Referring now to FIGS. 13-13L, an interior rearview mirror assembly 510 (or a windshield electronics module or accessory module) includes a circuit board 552, such as a printed circuit board or the like with circuitry disposed on a circuit substrate or the like, and with a PC card interface 554 at or in connection with the circuit board 552. The PC card interface 554 provides for electrical connection (such as via multi-pin or multi-terminal connection) to a PC card or plug-in module 556a-l (FIGS. 13A-L) to provide various optional circuitry or accessories or features to the mirror assembly 510 via selection of a desired or appropriate PC card (or other type of circuitry card or element or the like) and insertion of or connection of the card to the interface, as discussed below.

In the illustrated embodiment, mirror assembly 510 includes an electro-optic (such as electrochromic) reflective element assembly or cell 528 that is electrically connected to EC drive circuitry 528a of circuit board 552, and with a video image display screen 524, which may also be connected to video drive circuitry 524a of circuit board 552. Mirror assembly 510 may also include a forward facing photo sensor or ambient light sensor 544a and a rearward facing photo sensor or glare sensor 544b and may include a microprocessor or control 558 for controlling one or more accessories or circuitry elements or the like of the mirror assembly. Mirror assembly 510 also includes a speaker 546 for generating an audio output, and includes an electrical connector 560 for connecting to a power supply or vehicle ignition and ground and/or to a camera video input or the like (such as an input from a camera or image sensor of the vehicle that has a forward or rearward or interior field of view) and/or to an audio line out (such as an output of an audio signal to the vehicle sound system or the like, and such as an audio output that may optionally bypass the mirror speaker) and/or the like.

The base mirror functions (without the PC card or plug-in module inserted therein) thus may provide a variably reflective mirror reflective element and a reverse aid video (or other video image display) and an embedded speaker, while the PC card or plug-in module may provide other features, as discussed below. As shown in FIG. 13A, a PC card or plug-in module 556a includes a PC card connector 557 for electrically connecting the card 556a to the PC connector 554 of mirror assembly 510. For example, the mirror casing (not shown) may have a slot formed therethrough that is generally aligned with the PC connector 554, whereby the PC card 556a may be inserted into the slot and connected to or plugged into the connector to electrically connect the PC card to the mirror circuitry and thus to selectively provide the features of the particular PC card being inserted into or connected to the mirror assembly. Other means for connecting the card to the connector may be implemented (such as various forms of cards being removably inserted into or snapped into or onto a mirror casing or mirror assembly whereby the electrical connection is made as the card is mechanically snapped or attached or secured to the mirror assembly), without affecting the scope of the present invention.

The PC card or plug-in module thus may be selected and implemented depending on the features or accessories provided on the card and on the desired features or content of the mirror assembly. For example, and as shown in FIG. 13A, PC card or plug-in module 556a may provide navigation features and may include a navigation engine or control circuitry 557a, GPS antenna 557b and optionally a GPS antenna connector 557c to enhance the system performance. The navigation card may also include a USB receptacle 557d to facilitate updating of the navigation data or map data in the memory or data storage 557e of the PC card 556a. The PC card 556a may also include touch screen controls 557f and menus and the like, so that the user inputs of the mirror assembly are adapted or configured to control the display or touch screen in the appropriate manner as dictated by the PC card inserted into the mirror assembly and connected to mirror circuitry. Optionally, and with reference to FIG. 13B, an upgraded navigation PC card or plug-in module 556b may include additional circuitry, such as BLUETOOTH® hardware 557g (or other short range communication protocol) and a microphone jack 557h or the like, and may provide for hands free communication and echo cancellation and the like, such as via a hands free and echo cancellation engine 557k.

Other features may be provided by different selected PC cards or plug-in modules (such as PC cards or plug-in modules 556c-l of FIGS. 13C-L or the like), depending on the particular mirror content desired. For example, an image storage and viewer card or plug-in module 556c (FIG. 13C) may provide a storage capability for storing digital images or photos (such as in a JPEG format or the like), whereby the images may be stored to the card (such as via the USB receptacle 557d or the like) and then may be selectively displayed on the video display screen of the mirror assembly. Optionally, for example, a modular hands free PC card or plug-in module 556d (FIG. 13D) may provide for hands free communication via BLUETOOTH® hardware 557g and a microphone jack 557h, such as in a similar manner as described above with respect to card 556b, but without the navigational features.

The PC card or plug-in module and mirror of the present invention may provide for selective use of the mirror for playing or outputting songs or tracks from a digital playback device or the like. For example, a modular digital music playback PC card or plug-in module 556e (FIG. 13E) may include a playback engine 557i for playing back stored digital songs or tracks from a digital playback device, such as an iPOD® or the like, which may communicate the songs or tracks to the PC card and the mirror assembly via a BLUETOOTH® communication link or the like. The music or track may be output by the card or the mirror (such as via the mirror speaker 546 or via streaming of the audio output to the vehicle radio speakers or other speakers via a streaming output 557j). Optionally, an upgrade version of a music playback card or plug-in module 556f (FIG. 13F) may include a microphone jack 557h and hands free and echo cancellation engine 557k for hands free communication or the like. Optionally, for example, a modular MP3 player PC card or plug-in module 556g (FIG. 13G) may provide for playback of digital tracks via processing circuitry 557l, whereby the card and mirror may cooperate to playback digital tracks stored on the card or on a remote MP3 player or the like, and whereby the stored songs or tracks may be altered or updated via a USB receptacle 557d or the like.

Optionally, a PC card or plug-in module 556h (FIG. 13H) may provide a cell antenna 557m or the like and may provide for internet connection or broadband cell connection. Optionally, a PC card 556i or plug-in module (FIG. 13I) may include a Wi-Fi antenna 557n to provide for an internet connection or broadband connection and to allow for control or operation of the connection, such as for basic searches or one touch access to "favorite" sites or the like, such as Google maps or email or the like, and may utilize a remote wireless connection or the like. Optionally, a PC card or plug-in module 556j (FIG. 13J) may include a microphone jack 557h and BLUETOOTH® hardware 557g and may provide a wireless camera card for receiving images from a camera or the like. Optionally, a PC card 556k (FIG. 13K) may include one or more video input jacks 557o and may provide a video switching feature and may be configured to input and display two or more video sources (in addition to the video input of the mirror assembly). Optionally, a PC card or plug-in module 556l (FIG. 13L) may provide a satellite radio feature and may include a satellite radio engine 557p and satellite antenna connector 557q so as to provide a satellite radio feature for the mirror assembly and vehicle. Other features may be provided on other PC cards or the like while remaining within the spirit and scope of the present invention, such that the mirror assembly provides a customized or convertible or adaptable or reconfigurable mirror assembly depending on the desired or appropriate mirror content and allows the consumer or end user of the mirror assembly to select the features that are desirable to the consumer without having to select or receive other features that are not as desired.

Figure 14:
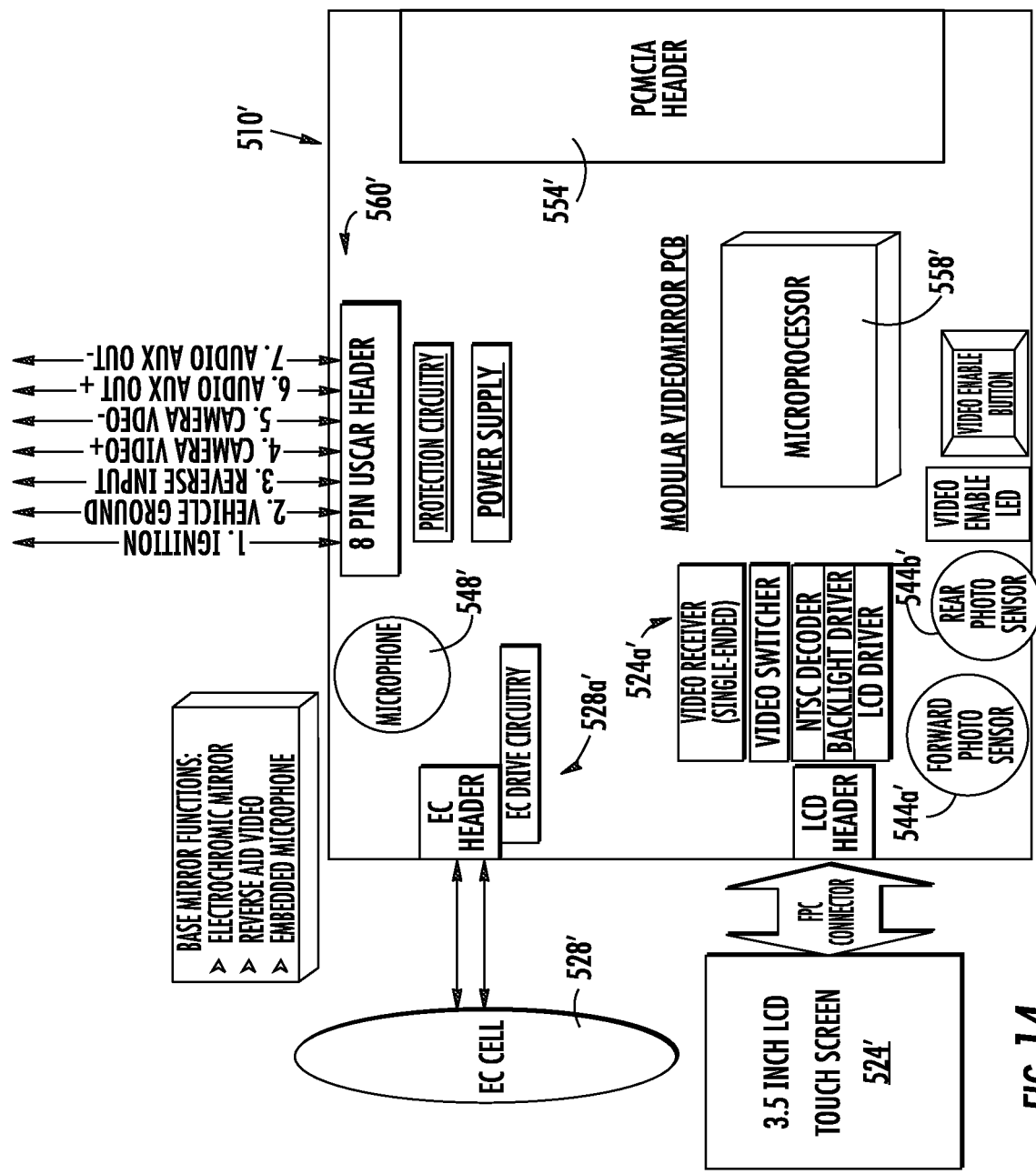
FIG. 14 is a schematic of an interior rearview mirror assembly having an embedded microphone and a PC card interface or connector therein for connecting to a removable or insertable PC card in accordance with the present invention.
Figure 14A:
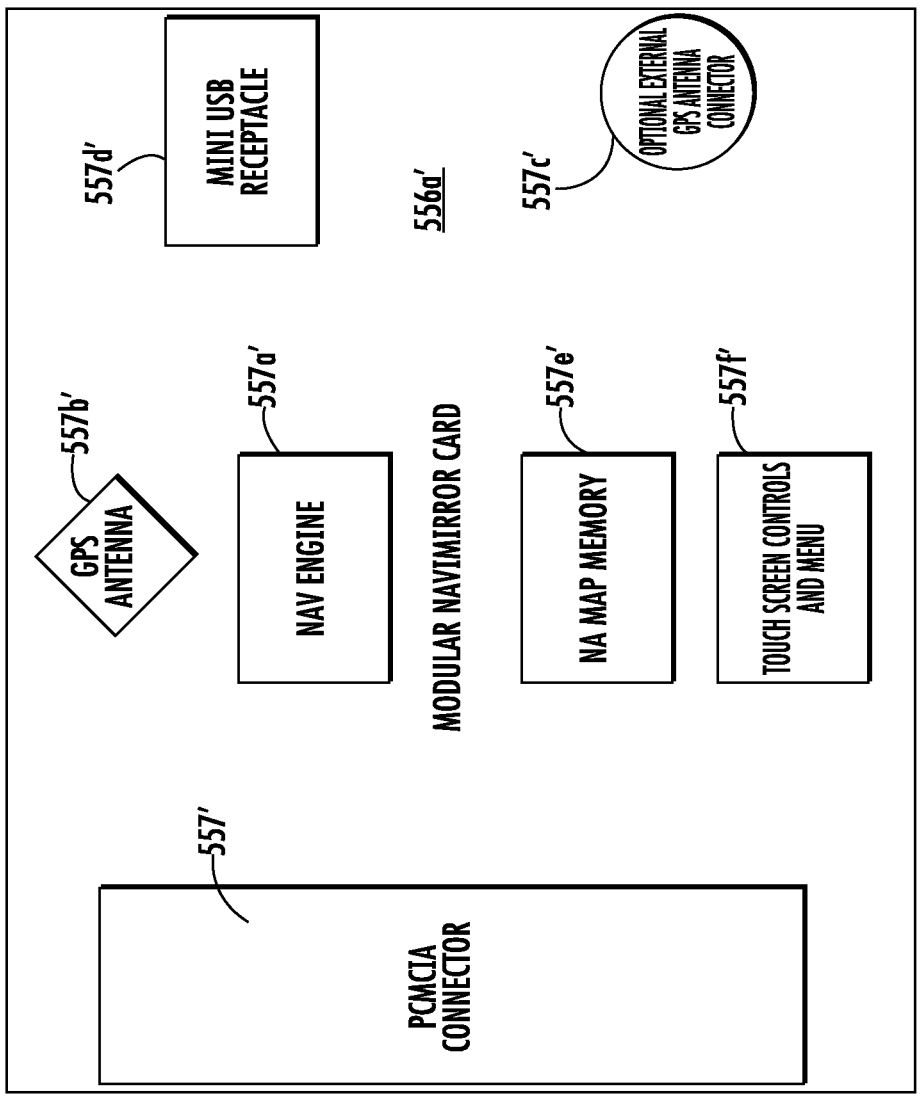
Figure 14B:
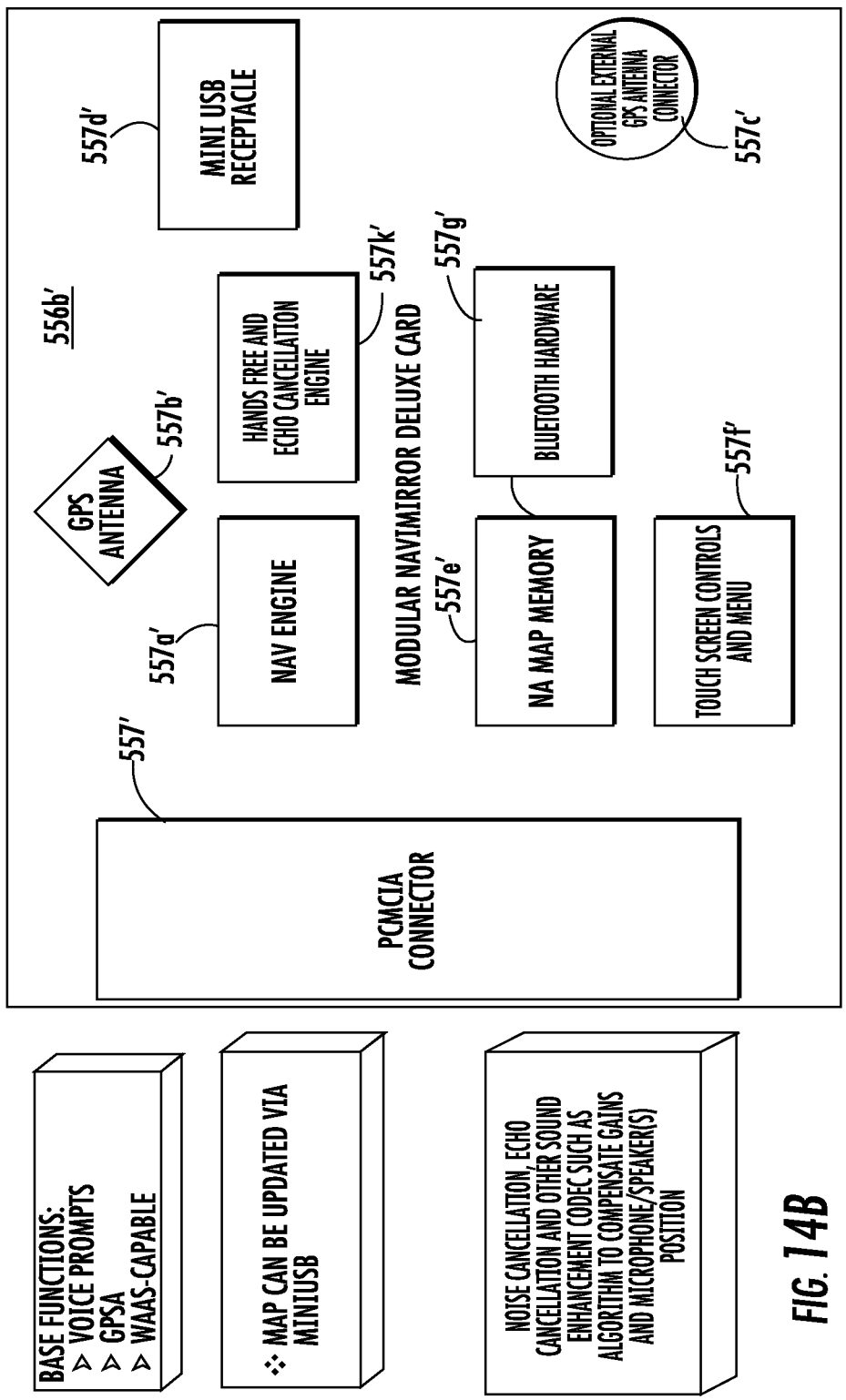
Figure 14D:
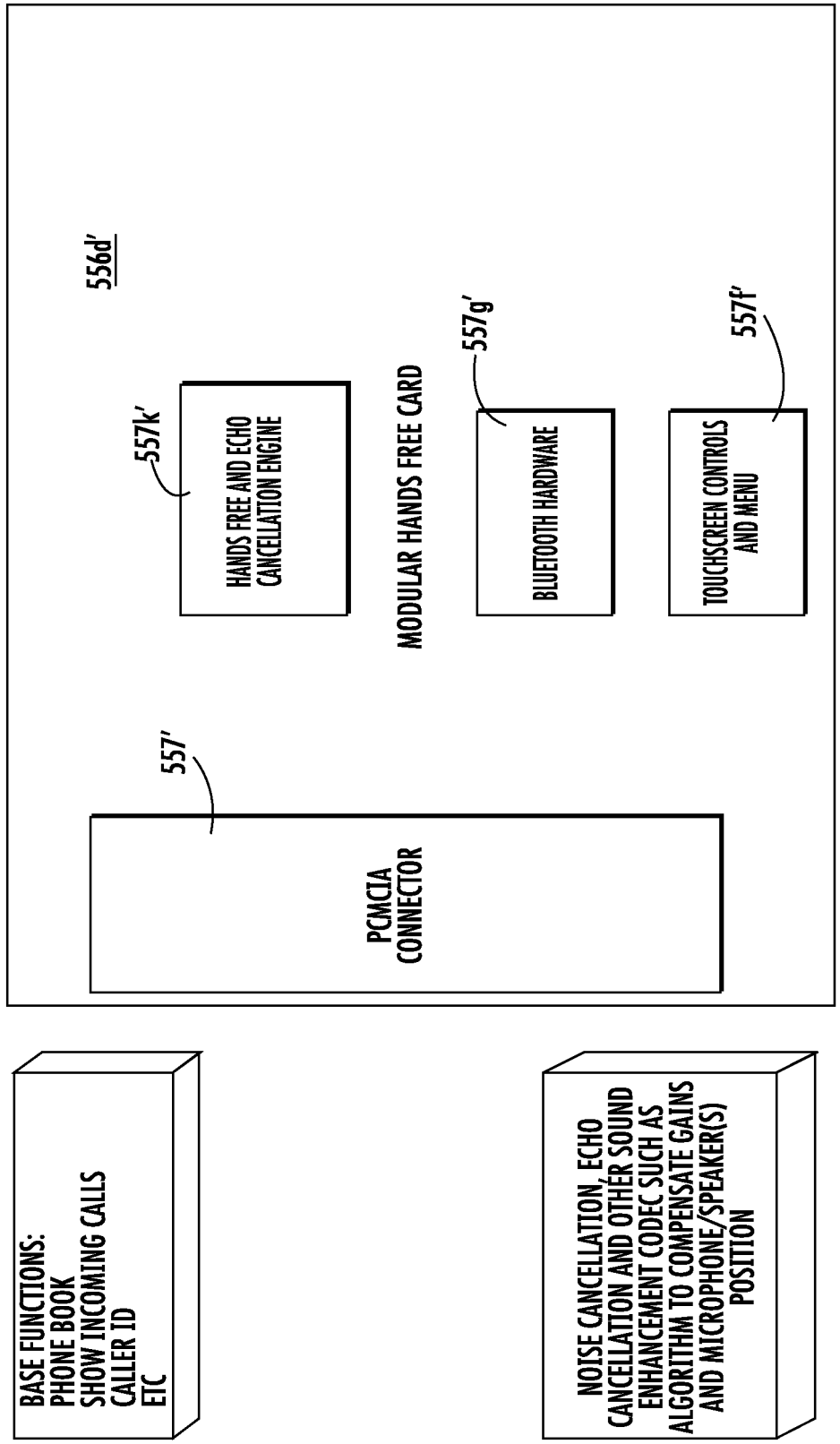
Figure 14E:
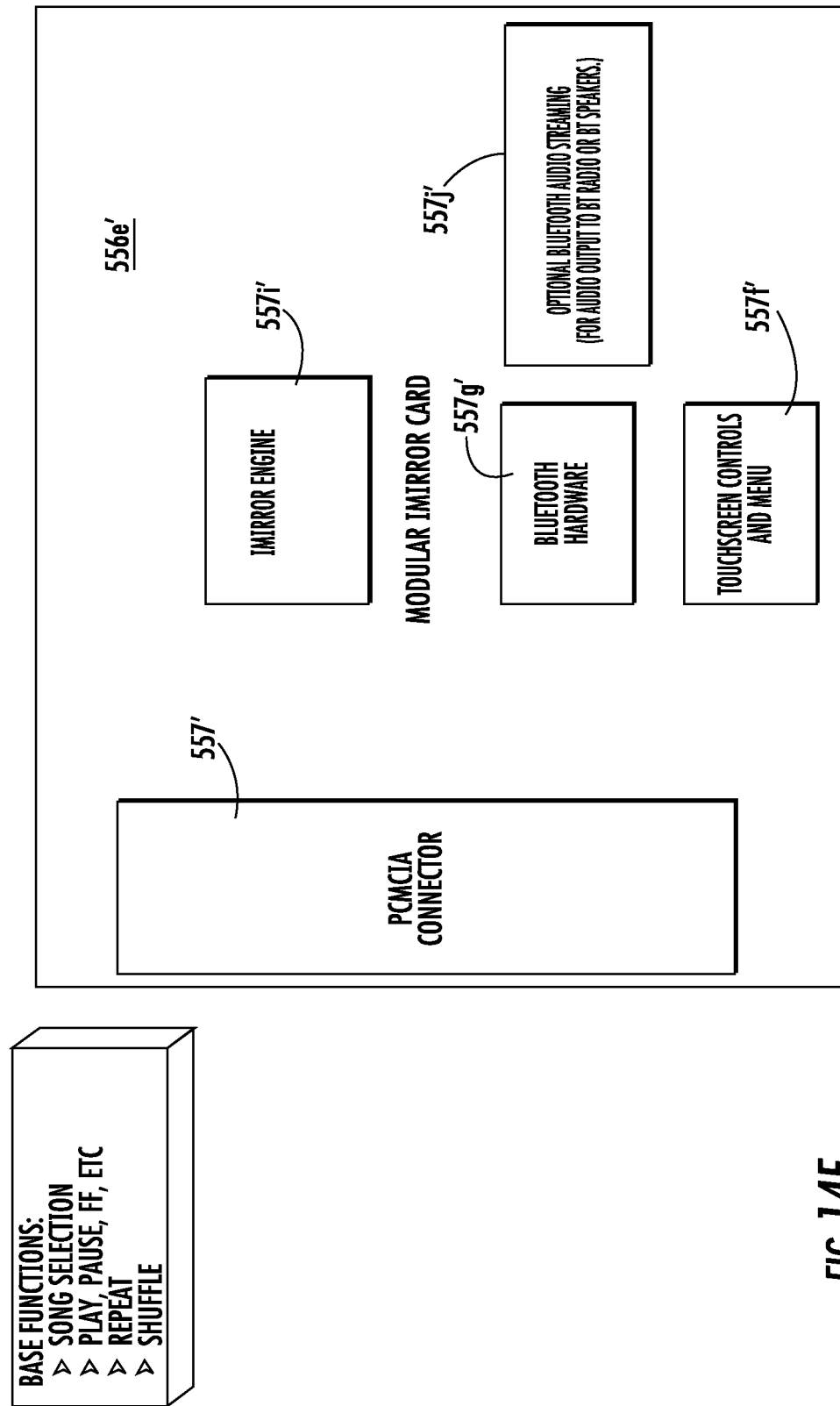
Figure 14G:
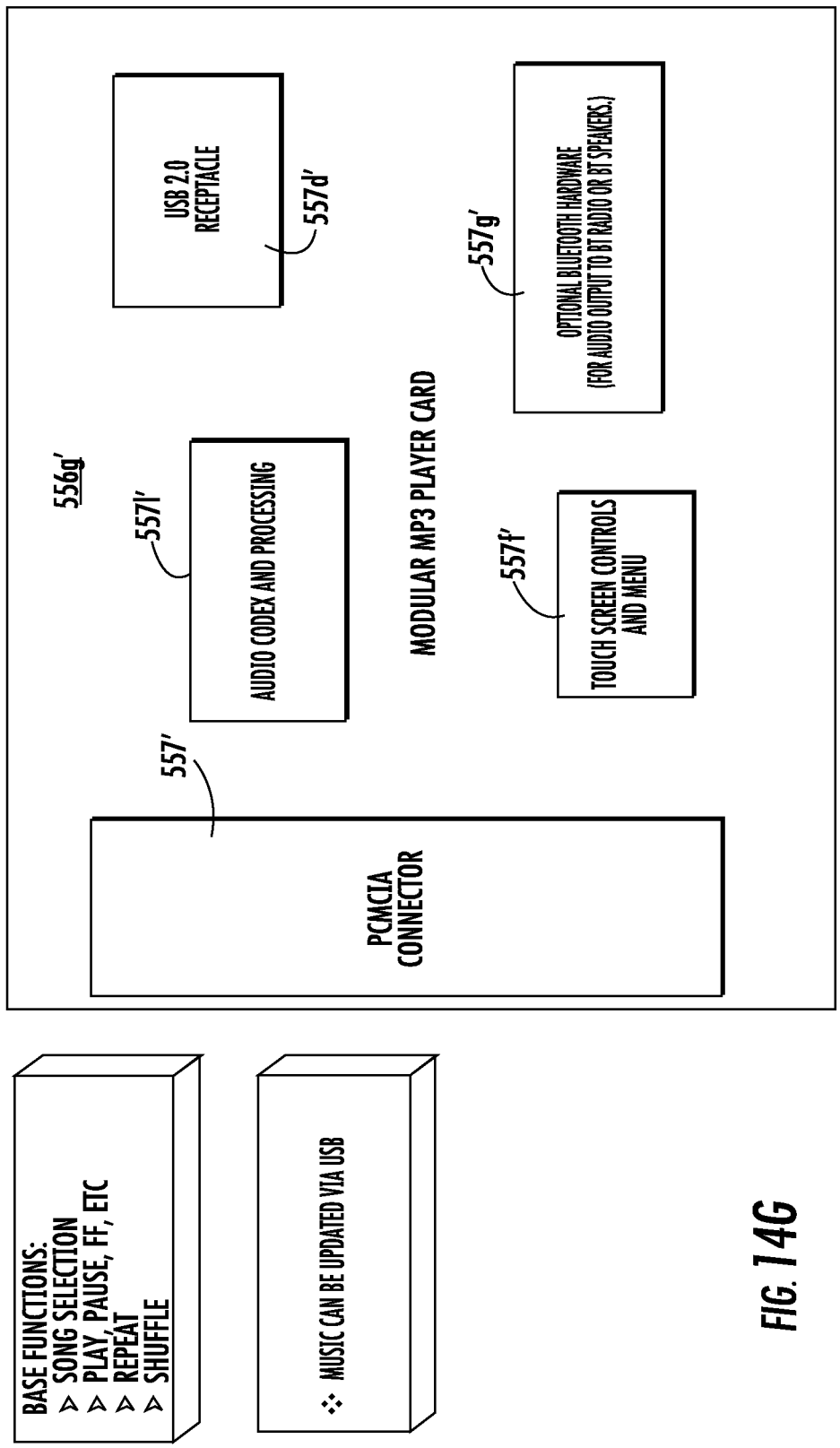
Figure 14I:
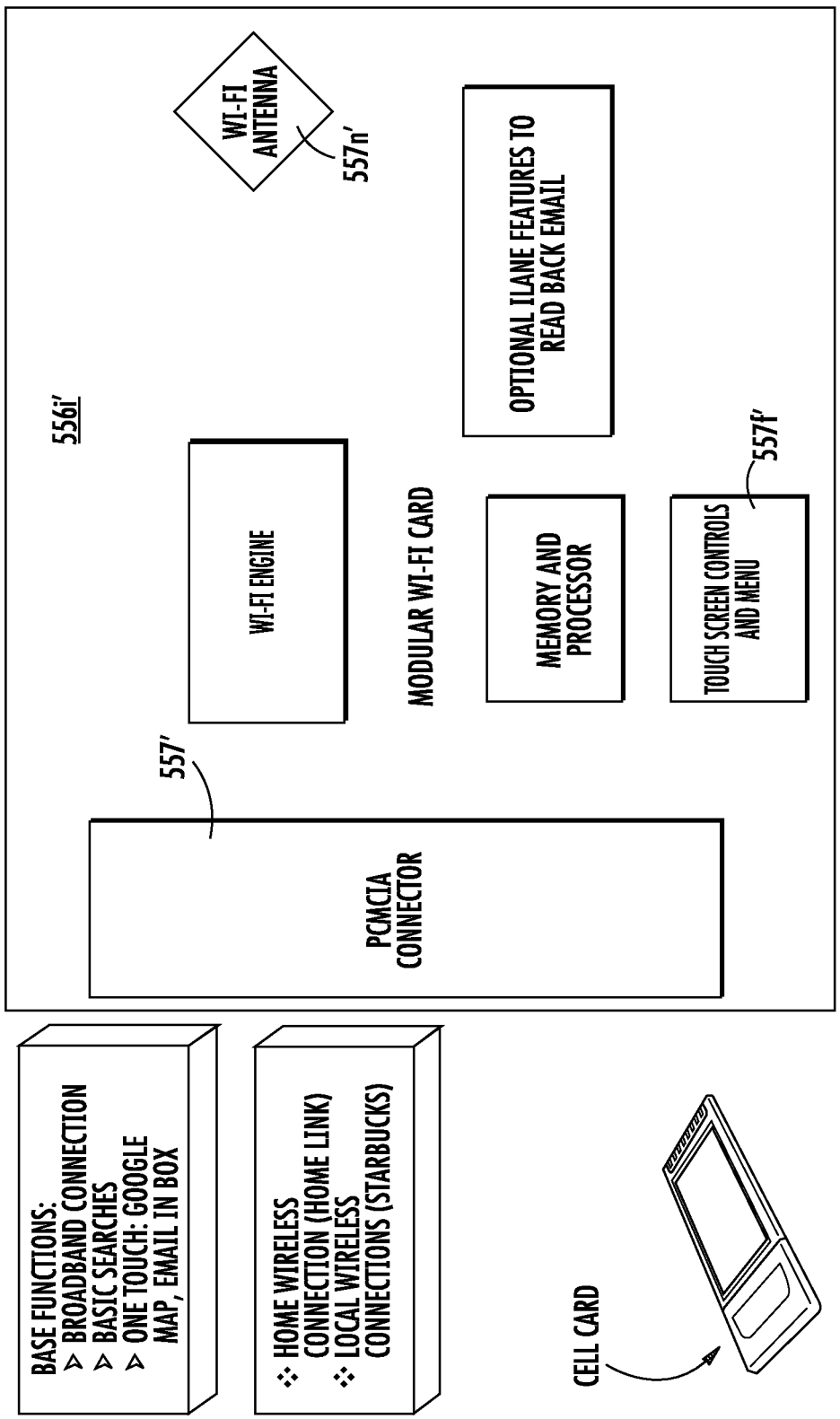
Figure 14L:
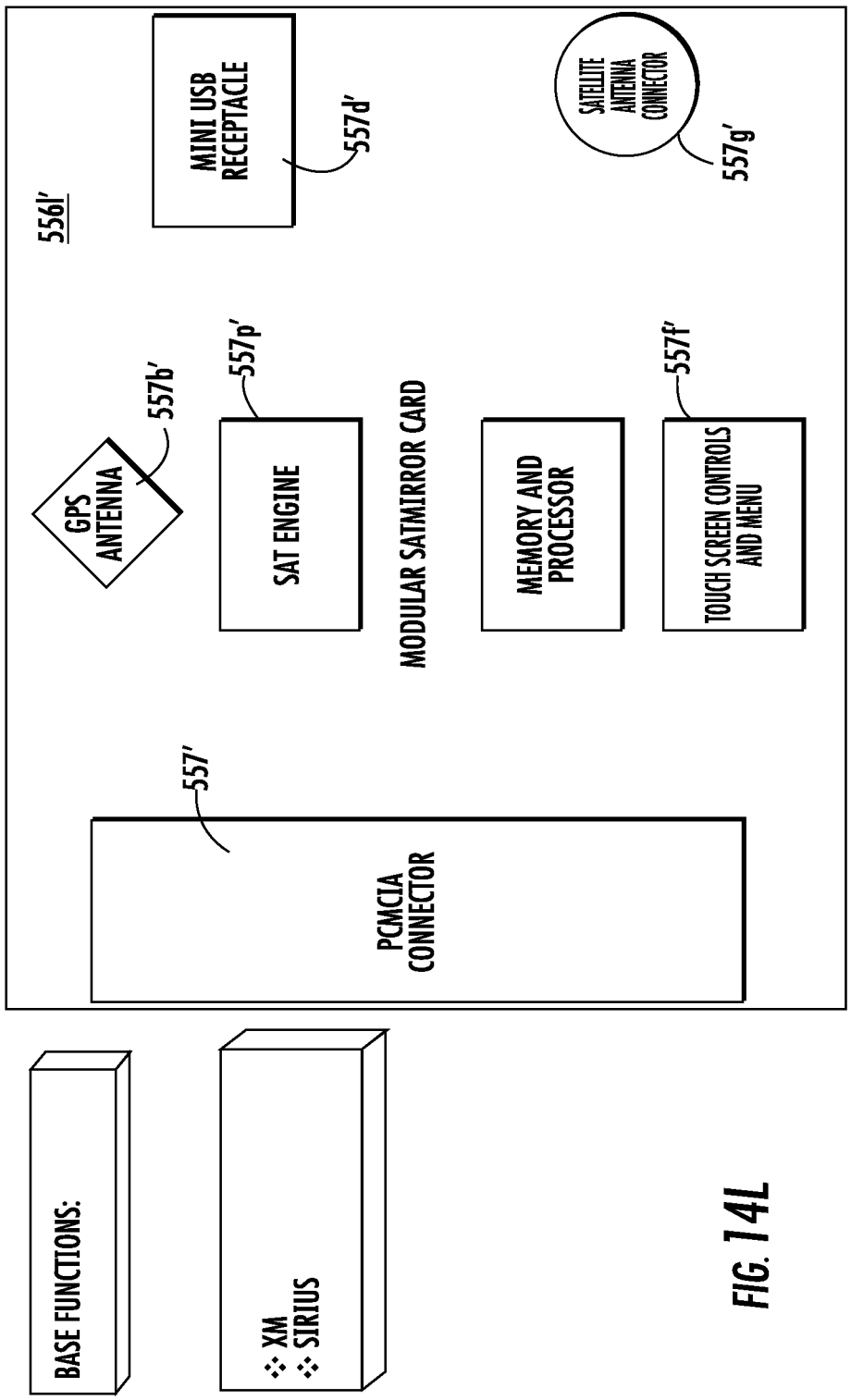

Optionally, and with reference to FIGS. 14-14L, a mirror assembly 510' may be substantially similar to mirror assembly 510, discussed above, but may include an embedded microphone 548' instead of the embedded speaker. The similar components and features of the mirror assembly 510' are shown in FIG. 14 with similar reference numbers as used in FIG. 13. Because the mirror assemblies may be similar to one another, a detailed discussion of the mirror assemblies need not be repeated herein. Likewise, the PC cards or plug-in modules 556a'-556l' for use with mirror assembly 510' may be similar to PC cards or plug-in modules 556a-556l discussed above, such that a detailed discussion of the PC cards or plug-in modules also need not be repeated herein. Suffice it to say that some of the PC cards or plug-in modules, such as PC cards or plug-in modules 556b', 556d', 556f' and 556j' would not need or likely include a microphone jack, since the mirror assembly 510' includes the embedded microphone 548'.

Figure 15:
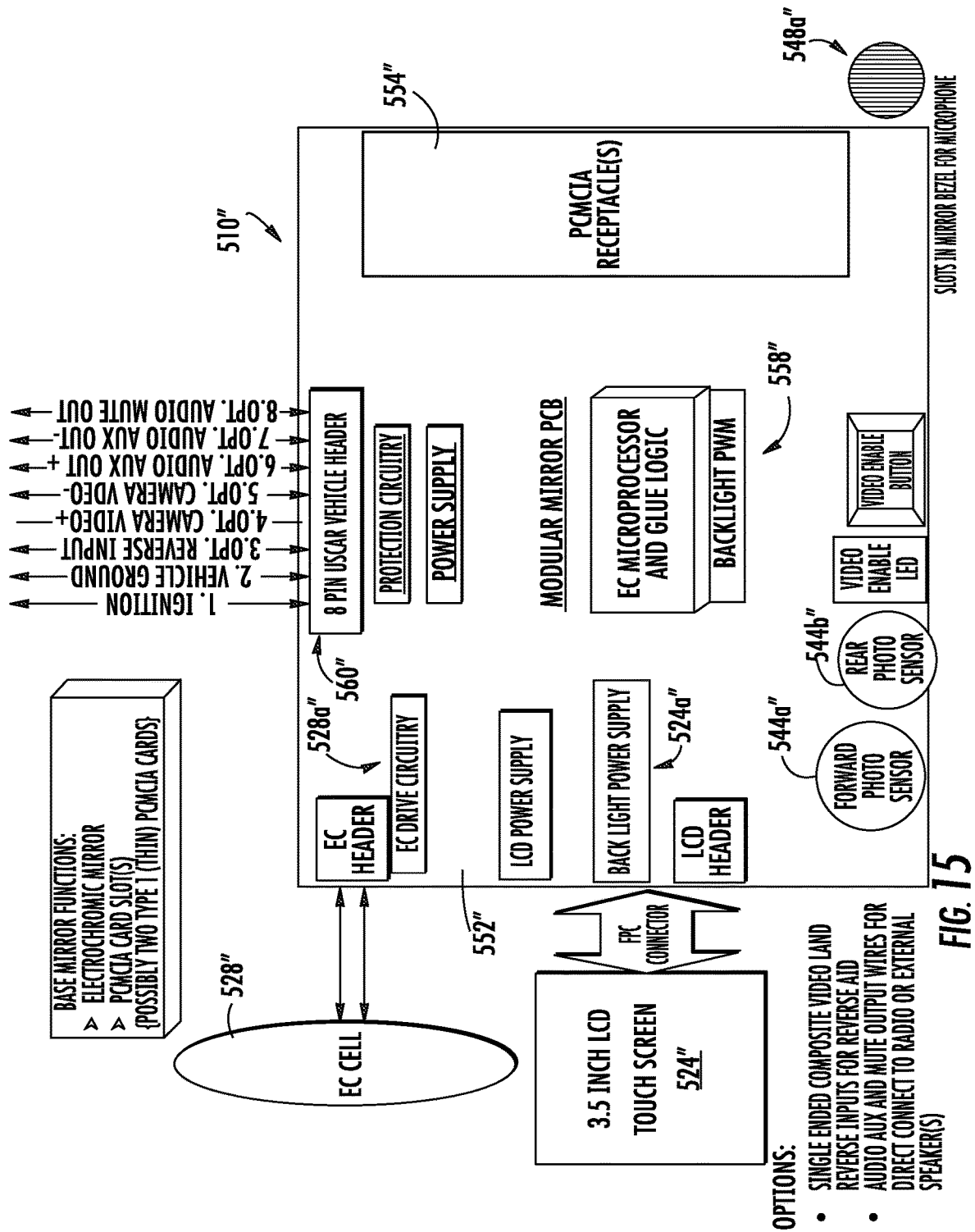
FIG. 15 is a schematic of an interior rearview mirror assembly having a PC card interface or connector therein for connecting to a removable or insertable PC card in accordance with the present invention.
Figure 15A:
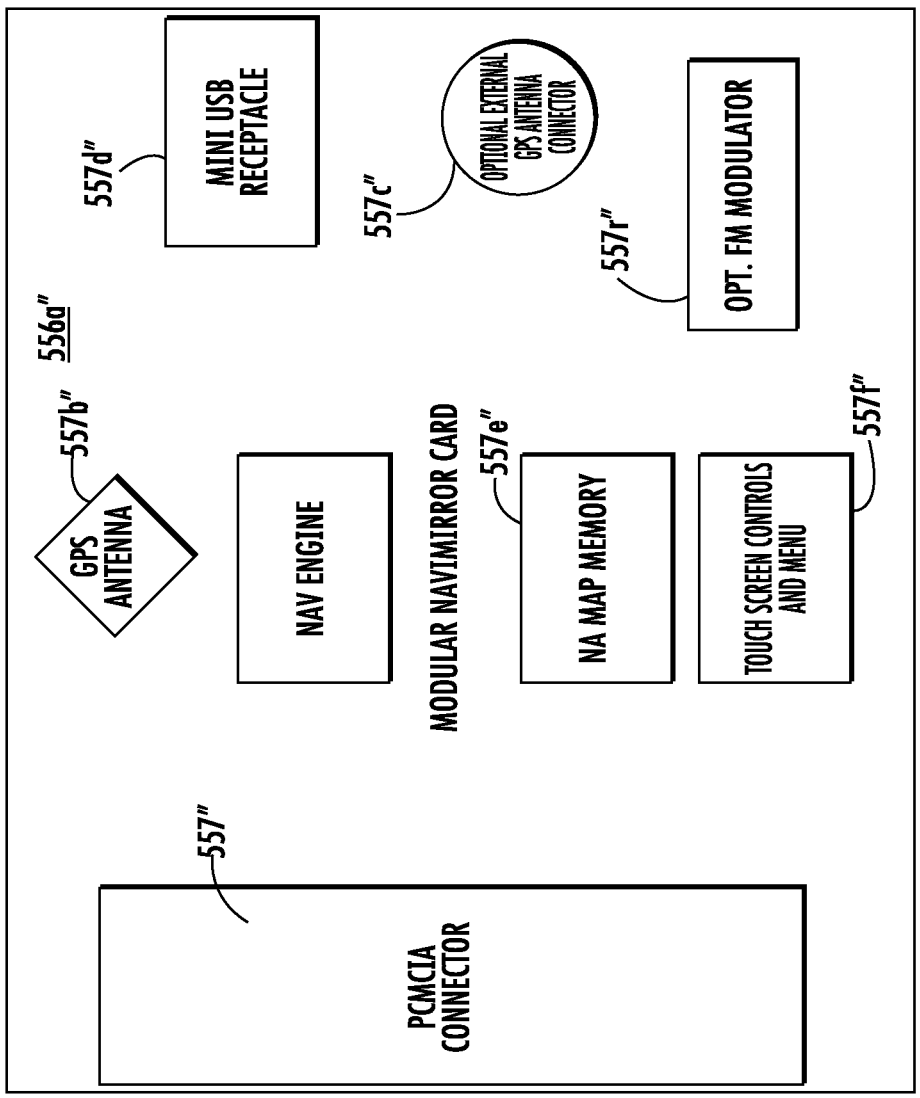
FIGS. 15A-N are schematics of different PC cards and circuitry or accessories or functions thereof that are useful with the interior rearview mirror assembly of FIG. 15.
Figure 15E:
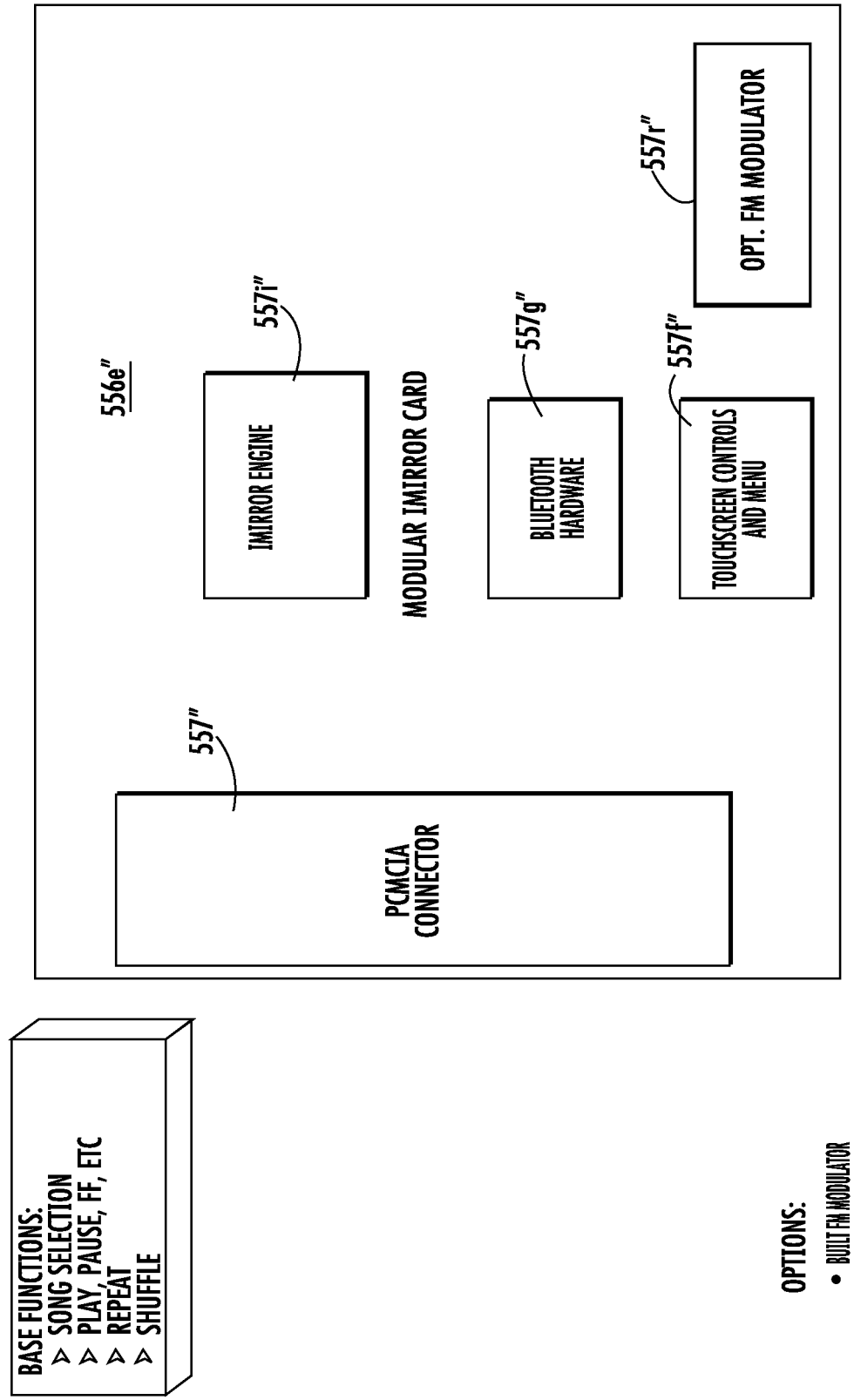
Figure 15F:
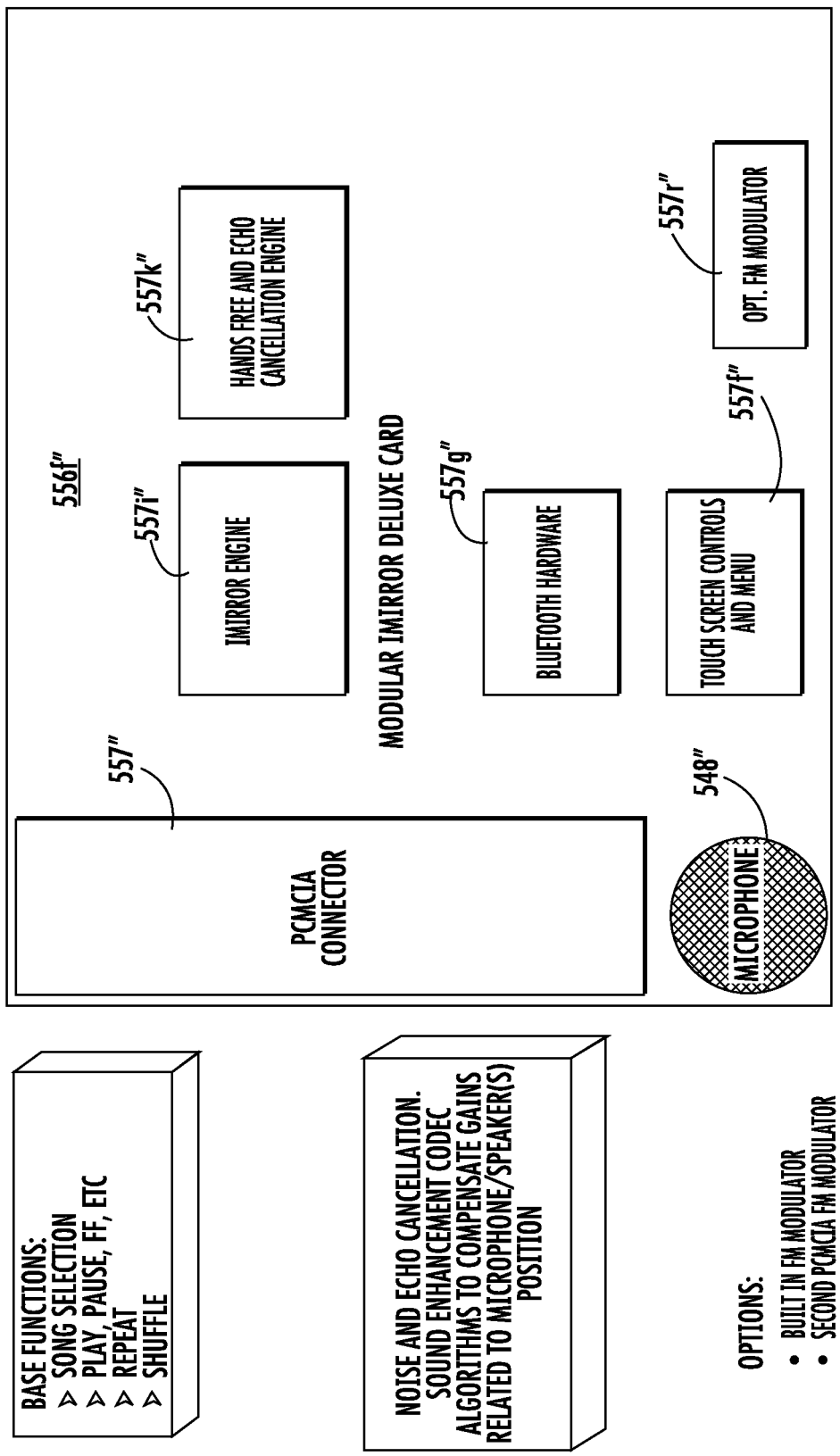
Figure 15K:
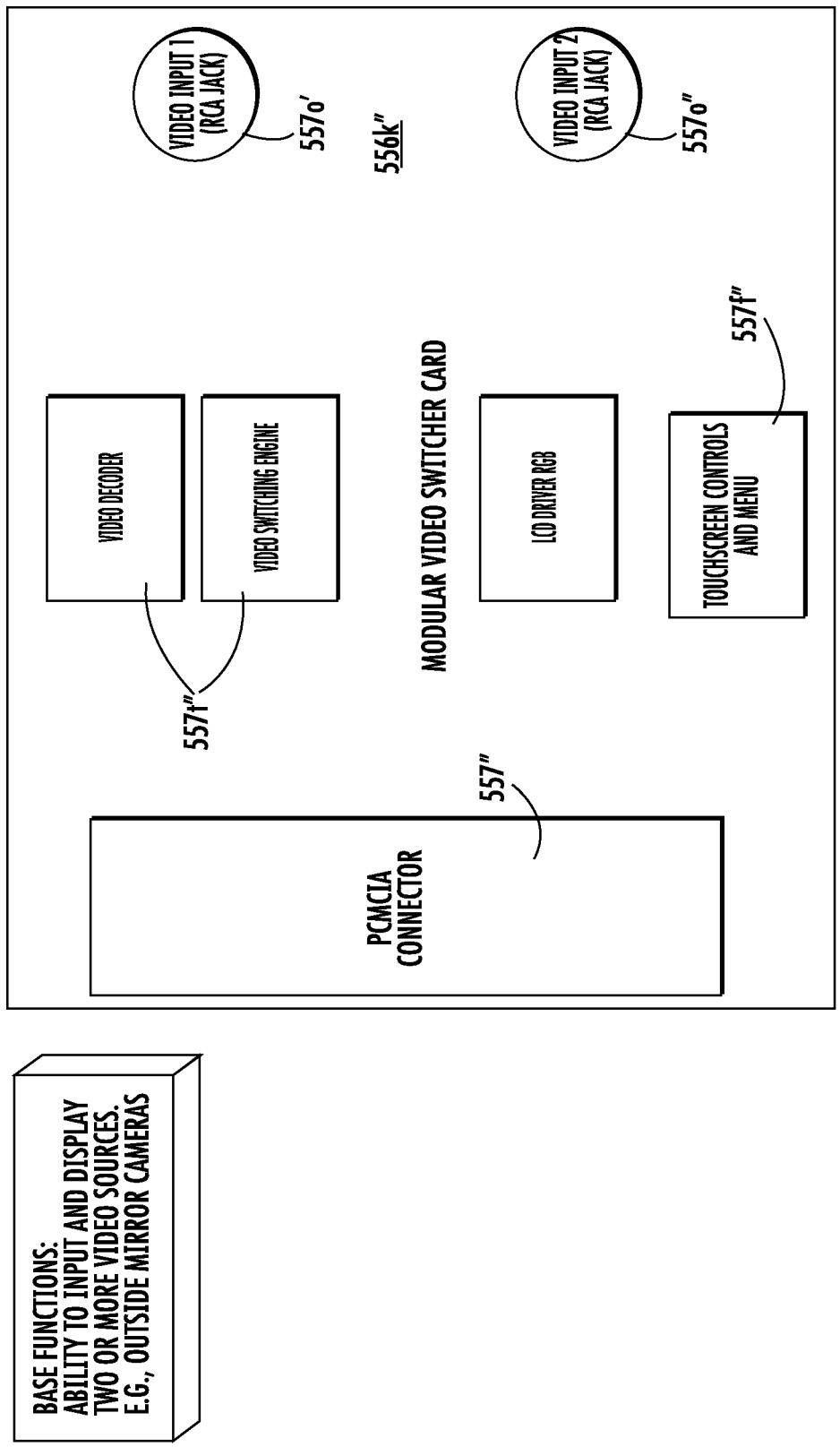
Figure 15L:
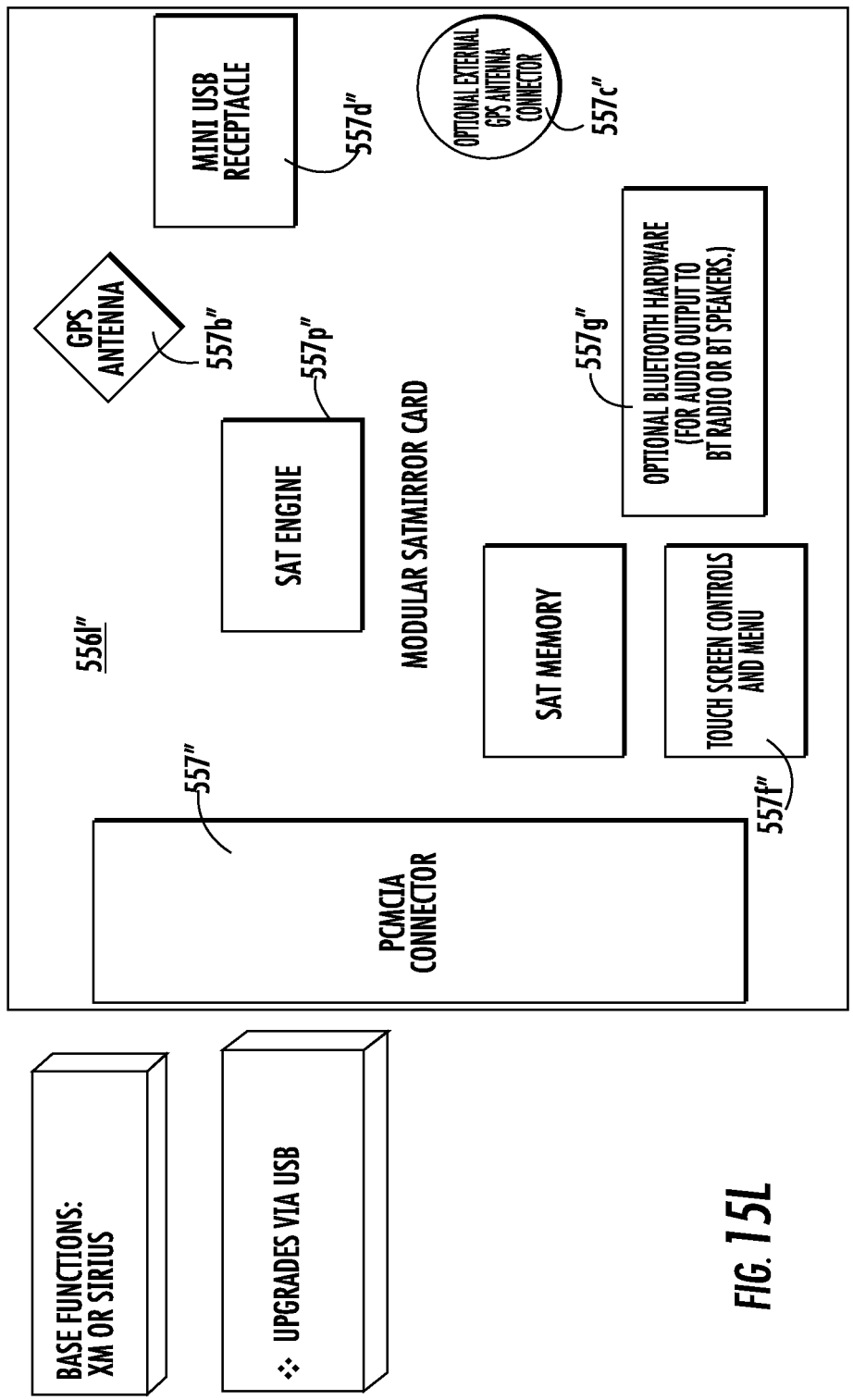
Figure 15M:
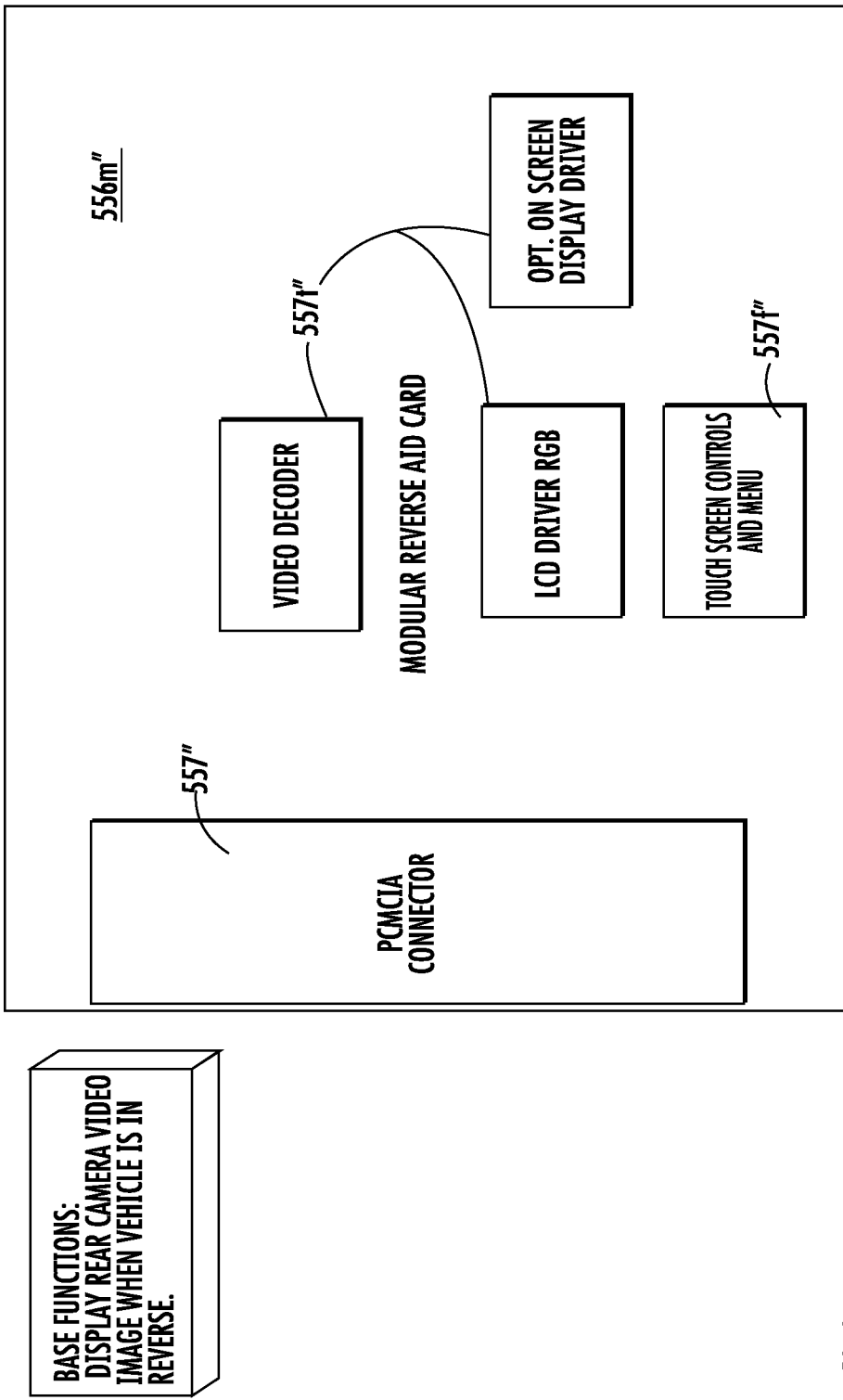
Figure 15N:
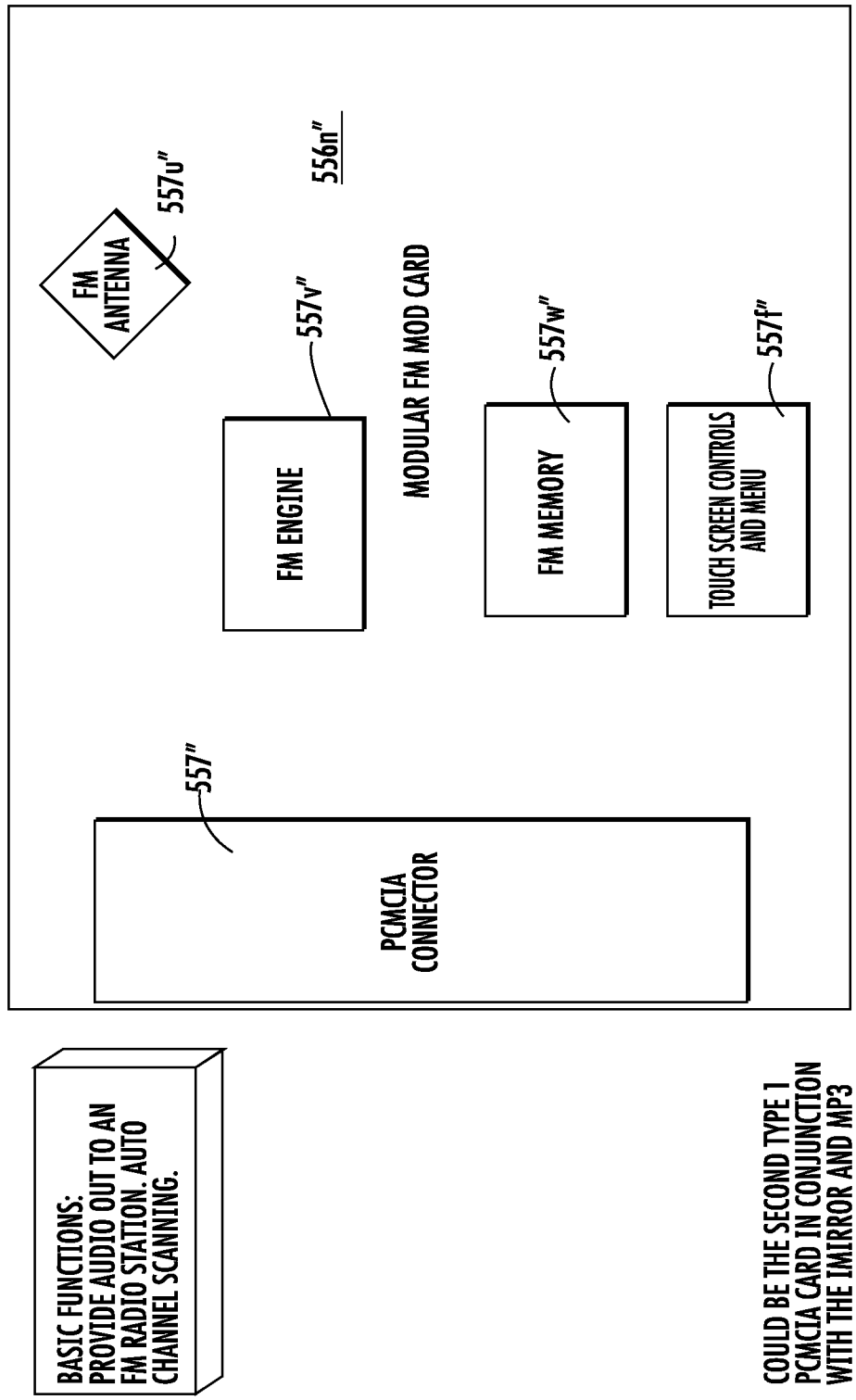

Optionally, and with reference to FIGS. 15-15N, a mirror assembly 510" may include a video display screen 524" and a back light power supply 524a" and EC microprocessor and backlight PWM control 558 for controlling the back light power supply 524a" in response to an input from the selected and connected PC card or plug-in module 556a"-556n", discussed below. Optionally, mirror assembly 510" may include a microphone cover region 548a" (such as slots or grating formed at the mirror casing or the like), such that a microphone may be provided on a PC card or plug-in module and disposed on the card at a location that generally aligns with cover region 548a" when the card is connected to the PC connector 554" of mirror assembly 510". The display at the video screen may include touch screen inputs that vary with the selected PC card or plug-in module. When the mirror assembly 510" does not have any PC card inserted therein or connected thereto, the display may provide touch screen controls or inputs for the EC reflective element and/or settings of the mirror assembly. When a PC card or plug-in module is inserted into the mirror assembly, the video display may be controlled to provide other touch screen controls depending on the particular card that is selected and inserted into or plugged into or connected to the mirror assembly, as discussed above and below.

Mirror assembly 510" may otherwise be substantially similar to mirror assembly 510, discussed above, but may not include either the embedded microphone or embedded speaker discussed above. The similar components and features of the mirror assembly 510" are shown in FIG. 15 with similar reference numbers as used in FIG. 13. Because the mirror assemblies may be similar to one another, a detailed discussion of the mirror assemblies need not be repeated herein. Likewise, the PC cards or plug-in modules 556a"-556l" for use with mirror assembly 510" may be similar to PC cards or plug-in modules 556a-556l discussed above, such that a detailed discussion of the PC cards also need not be repeated herein. Some of the PC cards or plug-in modules 556a"-556n" are discussed further below, and those that are not specifically discussed below may be similar to the respective PC card or plug-in module 556a-556l, discussed above.

Optionally, a navigation PC card or plug-in module 556a" (FIG. 15A) for mirror assembly 510" may be similar to PC card 556a, discussed above, and may include an optional FM modulator 557r" so that the mirror and/or PC card may provide an output to the vehicle radio without requiring a hard wire connection. Optionally, an upgrade navigation PC card or plug-in module 556b" (FIG. 15B) may be similar to PC card 556a, discussed above, and may include a BLUETOOTH® streaming output 557j" and/or an FM modulator 557r". As shown in FIG. 15B, PC card 556b" may include a microphone 548", which may generally align with cover area 548a" of mirror assembly 510" when PC card is connected to or plugged into mirror assembly 510". Similarly, a hands free PC card or plug-in module 556d" (FIG. 15D) may be similar to PC card 556d, discussed above, and may include the microphone 548" and optionally an FM modulator 557r".

Optionally, a digital playback device PC card or plug-in module 556e" (FIG. 15E) may be similar to PC card 556e, discussed above, and may include an FM modulator 557r"

instead of the streaming output, if desired. Optionally, an upgrade digital playback device PC card or plug-in module 556*f*" (FIG. 15F) may be similar to the PC card 556*e*", but may include a microphone 548" and a hands free and echo cancellation engine 557*k*" or the like to provide for sound enhancement algorithms or processing, such as to compensate gains related to microphone/speaker position. Optionally, an MP3 player PC card or plug-in module 556*g*" (FIG. 15G) may be similar to PC card 556*g* discussed above, and may include an MP3 player engine 557*s*" and an FM modulator 557*r*".

Optionally, a camera card or plug-in module 556*j*" (FIG. 15J) may be similar to PC card 556*j* discussed above, and may include video drivers or controls 557*t*", which may include an LCD driver and/or composite video decoder and/or an on screen display driver, such that the PC card may receive a video input (such as via a wireless input) and may control the backlight of the display device of the mirror assembly 510", since the mirror assembly may not include such circuitry embedded therein. Optionally, a video switcher PC card or plug-in module 556*k*" (FIG. 15K) may be similar to video switcher card 556*k* discussed above, and may include the video drivers or controls 557*t*", such as a video decoder and/or LCD driver or the like, similar to camera card 556*j*".

Optionally, the module may receive a wireless communication of video data for displaying on the video display device. For example, a wireless module may be provided that provides ultra-wideband (UWB) wireless communication that is capable of providing a high speed data transfer link between the components. Such an ultra-wideband communication link provides radio technology that can be used in vehicle for short-range high-bandwidth communications by using a large portion of the radio spectrum in a way that doesn't interfere with other more traditional 'narrow band' uses. Such a short-range wireless communications technology may be used in vehicles to eliminate the wires between devices and provide a high-speed data transfer link to remote sources, such as to outside information and entertainment sources that are external to the vehicle. For example, a UWB wireless link may function to wirelessly download a DVD-quality movie from a transmitter remote from the vehicle, such as, for example, a transmitter located at a service or gas station for downloading the movie while the vehicle is being refueled. Once downloaded to the vehicle, the video data may be wirelessly streamed to one or more wireless video screens in the vehicle for viewing by the occupants of the vehicle. While a short range communication protocol such as BLUETOOTH® is suitable for wireless connections and communications between cell phones and the vehicle audio system, the low data transfer rate (about 700-kilobit/second data transfer rate) is not as suitable for video data transfer. Thus, a UWB wireless link (having a data transfer rate on the order of megabits/second) is preferred for such applications.

Optionally, a reverse aid PC card or plug-in module 556*m*" (FIG. 15M) may include the video drivers or controls 557*t*" and may control the video display 524" of mirror assembly 510" when the vehicle is shifted to reverse, whereby the video display is activated to display images of a rearward vision system of the vehicle (such as in response to an input from a rearward facing camera or image sensor of the vehicle). The video drivers or controls 557*t*" may be operable to generate on-screen displays, such as warnings or bumper grid lines or the like (such as by utilizing aspects of U.S. Pat. No. 5,670,935, which is hereby incorporated herein by reference in its entirety). Optionally, an FM modulator PC card or plug-in module 556*n*" (FIG. 15N) may include an FM antenna 557*u*", an FM engine 557*v*" and an FM memory 557*w*", such that the mirror assembly (when PC card 556*n*" is plugged into the mirror assembly) may provide an audio output to an FM radio station for playing the audio output through the vehicle audio system.

Therefore, the mirror assembly of the present invention provides a reconfigurable or customizable mirror assembly, whereby the desired feature or features may be provided on separate PC cards or plug-in modules or the like. The user or vehicle owner thus may select a desired PC card or plug-in module and insert or plug the card into the slot (or other receiving element or port or receptacle or the like) at the mirror assembly to provide the desired feature or content to the mirror assembly. The user may remove the card or module from one mirror assembly of one vehicle and take the card or module to another vehicle similarly equipped with a reconfigurable or customizable mirror assembly and may then insert or plug the card into the other mirror assembly of the other vehicle, whereby the mirror assembly of the other vehicle would then provide similar content as in the first vehicle (and the playback content or memory content of the card thus is portable between the two mirror assemblies and vehicles). The consumer or user may select or purchase more than one of the available PC cards or plug-in modules to provide the desired features or content to the mirror assembly without having to purchase multiple features (such as in a package deal) that may not be desired by the particular individual consumer. Optionally, it is envisioned that the mirror assembly may have a connection or port for more than one plug-in module or card, such that two (or more) cards or modules may be plugged into or connected to the mirror assembly and circuitry thereof, whereby the cards or modules may cooperate to control or provide multiple features or may individually provide selected or particular features or functions to the mirror assembly.

Thus, in accordance with this aspect of the present invention, an interior rearview mirror (or windshield electronics module or accessory module or the like) incorporating a video screen (that may be a slide out video screen or a transflective display on demand video screen, such as the types described in U.S. Pat. No. 6,690,268 and/or U.S. patent application Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; and/or Ser. No. 11/284,543, filed Nov. 22, 2005 and published Jul. 27, 2006 as U.S. Pat. Publication No. US-2006-164230, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006 and published May 10, 2007 as International Publication No. WO 2007/053710, which are hereby incorporated herein by reference in their entireties) is provided. Optionally, and preferably, the video screen is connected to or operable by a backup or reversing system of the vehicle, preferably with a graphic overlay system or feature that applies a graphic overlay to the displayed images, such as by utilizing aspects of the rear vision systems described in U.S. Pat. No. 5,670,935, which is hereby incorporated herein by reference in its entirety.

Additionally, a plug-in navigational module (that preferably is removable so as to be usable in another mirror assembly of another vehicle or in another accessory or device, such as a hand-held video device or the like) is provided for those vehicle owners that desire to have navigational information (such as turn-by-turn instructions or the like) in addition to the reverse aid or backup display via the mirror provided video screen. The plug-in navigational module or card thus may be plugged into or connected to the mirror assembly (and the circuitry thereof) so as to provide navigational information at the mirror provided video screen. Furthermore, a hands free link to the likes of an iPOD® or an MP3 player or the like or a cell phone or the like may be provided, preferably as a separate plug-in module, or more preferably as an added feature or features of the same navigational plug-in module, so that the likes of song titles, address menus and/or the like may be made available to the driver or occupant of the vehicle at the mirror provided video display, and with the user inputs for controlling the menus and display being provided at the mirror assembly, such as via touch screen inputs at the video display.

Thus, a pick and play modular feature may be provided at the mirror assembly so that the video screen of the mirror assembly may be used for one or more or all of the multiple features/tasks (such as, for example, navigational information or entertainment information or camera-based information such as reversing information or the like), and with the owner of the vehicle or mirror assembly being able to opt for or purchase or select individual plug-in (and removable) modules or cards that each individually contain the circuitry and components (such as a GPS antenna, navigational memory or data storage, and/or the like) as required for the particular tasks. The mirror assembly and plug-in modules or cards thus allow the user or owner of the vehicle to select or customize the mirror content (so that the mirror assembly provides the desired or selected features or content) via selection of one or more plug-in modules or cards.

The mirror reflective element may comprise a prismatic mirror reflector or an electrically variable reflectance mirror reflector, such as an electro-optic reflective element assembly or cell, such as an electrochromic reflective element assembly or cell. For example, the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843; 6,420,036; 5,142,406; 5,442,478; 4,712,879 and/or 4,712,879, and/or U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005 and published Jul. 27, 2006 as U.S. Pat. Publication No. US-2006-164230, now U.S. Pat. No. 7,370,983, and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference in their entireties, and/or such as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated herein by reference in their entireties.

Optionally, and preferably, the mirror reflective element may comprise a frameless reflective element, such as by utilizing aspects of the reflective elements described in PCT Application No. PCT/US2006/018567, filed May 15, 2006 and published Nov. 23, 2006 as International Publication No. WO 2006/124682; PCT Application No. PCT/US2004/015424, filed May 18, 2004 and published on Dec. 2, 2004 as International Publication No. WO 2004/103772; and/or U.S. patent application Ser. No. 11/140,396, filed May 27, 2005, now U.S. Pat. No. 7,360,932; Ser. No. 11/226,628, filed Sep. 14, 2005 and published Mar. 23, 2006 as U.S. Publication No. US-2006-0061008; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 10/538,724, filed Jun. 13, 2005 and published Mar. 9, 2006 as U.S. Publication No. US-2006-0050018, which are hereby incorporated herein by reference in their entireties. Optionally, the reflective element may include a metallic perimeter band around the perimeter of the reflective element, such as by utilizing aspects of the reflective elements described in PCT Application No. PCT/US2006/018567, filed May 15, 2006 and published Nov. 23, 2006 as International Publication No. WO 2006/124682; PCT Application No. PCT/US03/29776, filed Sep. 19, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. patent application Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US-2006-0061008, which is hereby incorporated herein by reference in their entireties. The frameless reflective element thus is aesthetically pleasing to a person viewing the mirror assembly, since the reflective element (as recessed or partially recessed in the opening of the bezel portion of the mirror casing) does not include a separate frame or bezel portion around its perimeter edge. The metallic perimeter band may be selected to have a desired color or tint to match or contrast a color scheme or the like of the vehicle, such as described in PCT Application No. PCT/US2006/018567, filed May 15, 2006 and published Nov. 23, 2006 as International Publication No. WO 2006/124682; and/or PCT Application No. PCT/US2004/015424, filed May 18, 2004 and published on Dec. 2, 2004, as International Publication No. WO 2004/103772, which are hereby incorporated herein by reference in their entireties.

As disclosed in International Publication No. WO 2004/103772 (incorporated by reference above in its entirety), a reflective element assembly portion may hold or receive or comprise an electrochromic reflective element assembly or cell, which includes a front substrate and a rear substrate and an electrochromic medium sandwiched therebetween. The front substrate includes a transparent conductive coating or layer (such as an indium tin oxide (ITO), a tin oxide (TO) or the like) on its rear surface (the second surface of the cell), while the rear substrate includes a metallic conductive coating or layer or layers or stack of coatings or layers 91 on its front surface (the third surface of the cell), such as is generally done with electrochromic reflective element assemblies. The reflective element assembly may include a reflective perimeter region around the perimeter of the reflective element assembly or may have an opaque or blackened or darkened perimeter region in order to at least partially conceal the seal from being readily viewable by the driver of the vehicle. Optionally, a reflective element assembly portion may hold an electrochromic reflective element assembly, such as an electrochromic reflective element assembly or cell, and may include a mounting or attachment plate positioned at the rear surface of the reflective element assembly (the fourth surface of the cell). The bezel portion or molding may be molded or formed around the reflective element assembly and around or at the attachment plate to retain the attachment plate and the reflective element assembly within the bezel portion or molding. The mounting plate may include protrusions or recesses or the like at least partially around its perimeter edge to facilitate mechanical connection and securement of the bezel portion (such as by snap on or snap in) to the mounting plate when the bezel portion is molded around the mounting plate. The attachment plate may include a pivot joint or element established or formed thereon. Therefore, the reflective element assembly portion may be formed or molded with the molding or bezel portion molded or formed around the larger front substrate to contain the reflective element assembly or cell within or at the bezel portion. The pivot element or joint may be formed or established at the rear of the reflective element assembly, such as in the manners described above, and the mounting arm may extend generally rearwardly from the pivot joint. The cap portion may then receive the mounting arm through an opening or the like in the cap portion such that the mounting arm extends from the cap portion after the cap portion is attached to or snapped to the reflective element assembly portion. The electrical connectors of the reflective element assembly portion may connect to the appropriate electrical connectors or terminals or circuitry of the cap portion as the cap portion is assembled to or attached to the reflective element assembly portion, such as in the manners described above, in order to provide electrical power and/or control to the electrochromic cell.

Optionally, use of an elemental semiconductor mirror, such as a silicon metal mirror, such as disclosed in U.S. Pat. Nos. 6,286,965; 6,196,688; 5,535,056; 5,751,489 and 6,065, 840, and/or in U.S. patent application Ser. No. 10/993,302, filed Nov. 19, 2004, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Optionally, the mirror assembly may comprise a prismatic mirror assembly, such as a prismatic mirror assembly utilizing aspects described in U.S. Pat. Nos. 6,318,870; 6,598, 980; 5,327,288; 4,948,242; 4,826,289; 4,436,371 and 4,435, 042; and PCT Application No. PCT/US04/015424, filed May 18, 2004 and published on Dec. 2, 2004, as International Publication No. WO 2004/103772; and U.S. patent application Ser. No. 10/933,842, filed Sep. 3, 2004, now U.S. Pat. No. 7,249,860, which are hereby incorporated herein by reference in their entireties. Optionally, the prismatic reflective element may comprise a conventional prismatic reflective element or prism, or may comprise a prismatic reflective element of the types described in PCT Application No. PCT/US03/29776, filed Sep. 19, 2003 and published Apr. 1, 2004 as International Publication No. WO 2004/026633; U.S. patent application Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004, now U.S. Pat. No. 7,338,177, and/or PCT Application No. PCT/US2004/015424, filed May 18, 2004 and published on Dec. 2, 2004, as International Publication No. WO 2004/103772, which are all hereby incorporated herein by reference in their entireties, without affecting the scope of the present invention.

Such prismatic mirror reflective elements may be formed from various materials such as plastic or glass, and typically have a planar front surface extending at an angle to a planar rear surface. The rear surface is coated with a reflective layer of metal (such as chromium, aluminum or alloys thereof or other suitable materials) as is conventionally known in the industry. The reflective element is pivotable relative to a mounting assembly of the mirror to pivot the reflective surface in order to reduce glare during nighttime conditions. When the reflective element is pivoted from a full reflectivity day position to a reduced reflectivity night position, the reflective surface is rotated such that uncoated front surface is aligned for viewing by the vehicle driver instead of reflective surface. Preferably, the reflective surface reflects at least about 60 percent to about 95 percent of the light incident thereon, while the uncoated front surface reflects a reduced amount of light, such as about 4 percent of the light incident thereon, thereby significantly reducing glare from headlights or other bright lights to the rear of the vehicle to the driver's eyes.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties.

Optionally, the mirror casing and/or windshield electronics module may be suitable for supporting larger or heavier components or circuitry that otherwise may not have been suitable for mounting or locating at or in a mirror casing. For example, the mirror casing or module may house or support a battery or power pack for various electronic features or components, and/or may support a docking station for docking and/or holding a cellular telephone or hand-held personal data device or the like, such as by utilizing aspects of the systems described in U.S. Pat. No. 6,824,281, and/or PCT Application No. PCT/US03/40611, filed Dec. 19, 2003 and published Jul. 15, 2004 as International Publication No. WO 2004/058540, and/or U.S. patent application Ser. No. 10/510,813, filed Aug. 23, 2002, now U.S. Pat. No. 7,306,276, and/or U.S. patent application Ser. No. 11/842,328, filed Aug. 21, 2007, now U.S. Pat. No. 7,722,199, which are hereby incorporated herein by reference in their entireties.

Optionally, for example, the mounting structure and/or mirror casing and/or windshield electronics module may support compass sensors, such as compass sensors of the types described in may utilize aspects of the compass systems described in U.S. patent application Ser. No. 11/305,637, filed Dec. 16, 2005, now U.S. Pat. No. 7,329,013; Ser. No. 10/352,691, filed Jan. 28, 2003, now U.S. Pat. No. 6,922,902; Ser. No. 11/284,543, filed Nov. 22, 2005 and published Jul. 27, 2006 as U.S. Pat. Publication No. US-2006-164230, now U.S. Pat. No. 7,370,983; Ser. No. 11/226,628, filed Sep. 14, 2005 and published Mar. 23, 2006 as U.S. Publication No. US-2006-0061008; and/or Ser. No. 10/933,842, filed Sep. 3, 2004, now U.S. Pat. No. 7,249,860; and/or U.S. Pat. Nos. 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and 6,642,851, and/or PCT Application No. PCT/US2004/015424, filed May 18, 2004 and published on Dec. 2, 2004, as International Publication No. WO 2004/103772, and/or European patent application, published Oct. 11, 2000 under Publication No. EP 0 1043566, which are all hereby incorporated herein by reference in their entireties. The compass circuitry may include the compass sensor, such as a magneto-responsive sensor, such as a magneto-resistive sensor, such as the types disclosed in U.S. Pat. Nos. 5,255,442; 5,632,092; 5,802,727; 6,173,501; 6,427,349 and 6,513,252 (which are hereby incorporated herein by reference in their entireties), a magneto-capacitive sensor, a Hall-effect sensor, such as the types described in U.S. Pat. Nos. 6,278,271; 5,942,895 and 6,184,679 (which are hereby incorporated herein by reference in their entireties), a magneto-inductive sensor, such as described in U.S. Pat. No. 5,878,370 (which is hereby incorporated herein by reference in its entirety), a magneto-impedance sensor, such as the types described in PCT Publication No. WO 2004/076971, published Sep. 10, 2004 (which is hereby incorporated herein by reference in its entirety), or a flux-gate sensor or the like, and/or may comprise a compass chip, such as described in U.S. patent application Ser. No. 11/226,628, filed Sep. 14, 2005 and published Mar. 23, 2006 as U.S. Publication No. US-2006-0061008; and/or Ser. No. 11/284,543, filed Nov. 22, 2005 and published Jul. 27, 2006 as U.S. Pat. Publication No. US-2006-164230, now U.S. Pat. No. 7,370,983, which are hereby incorporated herein by reference in their entireties. By positioning the compass sensors at a fixed location, further processing and calibration of the sensors to accommodate adjustment or movement of the sensors is not necessary.

Optionally, the mounting structure and/or mirror casing and/or windshield electronics module may support one or more imaging sensors or cameras, and may fixedly support them with the cameras set with a desired or appropriate forward and/or rearward field of view. For example, the camera may be operable in conjunction with a forward facing imaging system, such as a rain sensing system, such as described in U.S. Pat. Nos. 6,968,736; 6,806,452; 6,516,664; 6,353,392; 6,313,454; 6,250,148; 6,341,523 and 6,824,281, and in U.S. patent application Ser. No. 10/958,087, filed Oct. 4, 2004, now U.S. Pat. No. 7,188,963; and/or Ser. No. 11/201,661, filed Aug. 11, 2005, now U.S. Pat. No. 7,480,149, which are all hereby incorporated herein by reference in their entireties. The mounting structure and/or mirror casing may be pressed or loaded against the interior surface of the windshield to position or locate the image sensor in close proximity to the windshield and/or to optically couple the image sensor at the windshield. The mounting structure and/or mirror casing may include an aperture or apertures at its forward facing or mounting surface and the windshield may include apertures through the opaque frit layer (typically disposed at a mirror mounting location of a windshield) or the windshield may not include such a frit layer, depending on the particular application.

Optionally, the image sensor may be operable in conjunction with a forward or rearward vision system, such as an automatic headlamp control system and/or a lane departure warning system or object detection system and/or other forward vision or imaging systems, such as imaging or vision systems of the types described in U.S. Pat. Nos. 7,038,577; 7,005,974; 7,004,606; 6,690,268; 6,946,978; 6,757,109; 6,717,610; 6,396,397; 6,201,642; 6,353,392; 6,313,454; 5,550,677; 5,670,935; 5,796,094; 5,715,093; 5,877,897; 6,097,023 and 6,498,620, and/or U.S. patent application Ser. No. 09/441,341, filed Nov. 16, 1999, now U.S. Pat. No. 7,339,149; Ser. No. 10/422,512, filed Apr. 24, 2003, now U.S. Pat. No. 7,123,168; Ser. No. 11/239,980, filed Sep. 30, 2005, now U.S. Pat. No. 7,881,496; Ser. No. 11/672,070, filed Feb. 7, 2007, now U.S. Pat. No. 8,698,894; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/731,183, filed Oct. 28, 2005; and/or Ser. No. 60/765,797, filed Feb. 7, 2006, which are hereby incorporated herein by reference in their entireties. The mirror casing thus may support one or more rearward facing imaging sensors or cameras, such as for rearward vision or imaging systems, such as for a rear vision system or back up aid of the types described in U.S. Pat. Nos. 6,717,610 and/or 6,201,642 (which are hereby incorporated herein by reference in their entireties), and/or a cabin monitoring system or baby view system of the types described in U.S. Pat. No. 6,690,268 (which is hereby incorporated herein by reference in its entirety), and/or the like.

Optionally, the fixed mounting structure and/or mirror casing and/or windshield electronics module may house or support a display device, such as a heads up display device (such as the types described in U.S. patent application Ser. No. 11/105,757, filed Apr. 14, 2005, now U.S. Pat. No. 7,526,103; and Ser. No. 11/029,695, filed Jan. 5, 2005, now U.S. Pat. No. 7,253,723, which are hereby incorporated herein by reference in their entireties) that is operable to project a display at the area in front of the driver to enhance viewing of the display information without adversely affecting the driver's forward field of view. For example, the mirror casing may support a heads up display (HUD), such as a MicroHUD™ head-up display system available from MicroVision Inc. of Bothell, WA, and/or such as a HUD that utilizes aspects described in U.S. patent application Ser. No. 11/105,757, filed Apr. 14, 2005, now U.S. Pat. No. 7,526,103; and Ser. No. 11/029,695, filed Jan. 5, 2005, now U.S. Pat. No. 7,253,723, which are hereby incorporated herein by reference in their entireties. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving. For example, such a display device may be located at or in the mirror casing/mounting structure/windshield electronics module and may be non-movably mounted at the mirror casing or mounting structure or windshield electronics module, and may be operable to project the display information at the windshield of the vehicle so as to be readily viewed by the driver of the vehicle in the driver's forward field of view.

Figure 16:
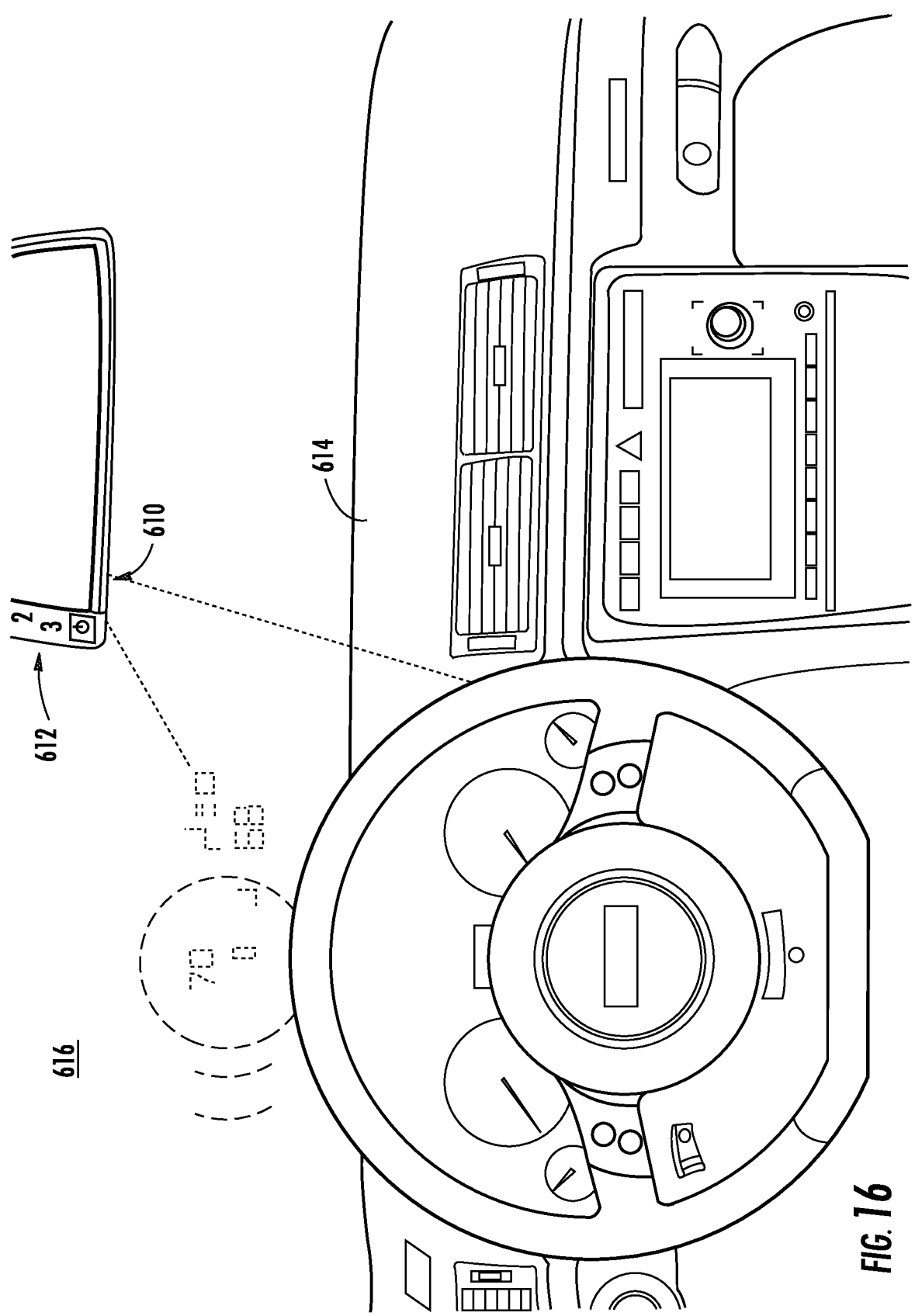
FIG. 16 is a perspective view of a HUD device incorporated in or at or near an interior rearview mirror assembly of a vehicle in accordance with the present invention.

Optionally, for example, and with reference to FIG. 16, a HUD display device 610 may be incorporated into or at an interior rearview mirror assembly 612, such as at or in a mirror casing or housing or at or in a windshield electronics module or accessory module or the like. As shown in FIG. 16, the HUD device 610 is operable to project illumination or image information via a light source at the mirror assembly or windshield interior mirror or module onto the instrument panel 614 that would create a HUD display effect on the windshield 616 for viewing by the driver of the vehicle. The instrument panel may receive and redirect or project the illumination from the HUD device 610 generally upward toward the windshield and at a region generally at or in the driver's forward field of view, or optionally the instrument panel may have a reflective or partially reflective surface for reflecting or redirecting the illumination from the HUD device 610 generally upward toward the windshield and at a region generally at or in the driver's forward field of view.

The mounting structure and/or mirror casing and/or windshield electronics module may be fixedly attached to or supported at the vehicle windshield and may extend upward toward the headliner of the vehicle. Thus, the mirror assembly of the present invention may have enhanced wire management and may substantially conceal the wiring of the electronic components/accessories between the circuitry within the mirror casing and the headliner at the upper portion of the vehicle windshield. Optionally, the mirror assembly may include wire management elements, such as the types described in U.S. patent application Ser. No. 11/226,628, filed Sep. 14, 2005 and published Mar. 23, 2006 as U.S. Publication No. US-2006-0061008; and/or Ser. No. 11/584,697, filed Oct. 20, 2006, now U.S. Pat. No. 7,510,287; and/or U.S. provisional application Ser. No. Ser. No. 60/729,430, filed Oct. 21, 2005, which are hereby incorporated herein by reference in their entireties, to conceal the wires extending between an upper portion of the mirror casing and the vehicle headliner (or overhead console). Optionally, the mirror casing and/or mounting structure and/or windshield electronics module may abut the headliner and/or may be an extension of an overhead console of the vehicle (such as by utilizing aspects described in U.S. patent application Ser. No. 10/538,724, filed Jun. 13, 2005 and published Mar. 9, 2006 as U.S. Publication No. US-2006-0050018, and/or U.S. patent application Ser. No. 10/510,813, filed Aug. 23, 2002, now U.S. Patent Application Publication No. US-2005-0151396, published Jul. 14, 2005, which are hereby incorporated herein by reference in their entireties). The mirror assembly of the present invention thus may allow for utilization of the area above the mirror reflective element for additional mirror content, such as additional electronic accessories or circuitry, and thus may provide for or accommodate additional mirror content/circuitry and/or vehicle content/circuitry.

Optionally, the mirror assembly and/or reflective element assembly may include one or more displays, such as for the accessories or circuitry described herein. The displays may comprise any suitable display, such as displays of the types described in U.S. Pat. Nos. 5,530,240 and/or 6,329,925, which are hereby incorporated herein by reference in their entireties, or may be display-on-demand or transflective type displays or other displays, such as the types described in U.S. Pat. Nos. 6,690,268; 5,668,663 and/or 5,724,187, and/or U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 b and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 11/284,543, filed Nov. 22, 2005 and published Jul. 27, 2006 as U.S. Pat. Publication No. US-2006-164230, now U.S. Pat. No. 7,370,983, and/or PCT Patent Application No. PCT/US2006/018567, filed May 15, 2006 and published Nov. 23, 2006 as International Publication No. WO 2006/124682; and/or PCT Application No. PCT/US2006/042718, filed Oct. 31, 2006 and published May 10, 2007 as International Publication No. WO 2007/053710; and/or U.S. provisional applications, Ser. No. 60/836,219, filed Aug. 8, 2006; Ser. No. 60/759,992, filed Jan. 18, 2006; and Ser. No. 60/732,245, filed Nov. 1, 2005, and/or PCT Application No. PCT/US03/40611, filed Dec. 19, 2003 and published Jul. 15, 2004 as International Publication No. WO 2004/058540, which are all hereby incorporated herein by reference in their entireties, or may include or incorporate video displays or the like, such as the types described in U.S. Pat. No. 6,690,268 and/or PCT Application No. PCT/US03/40611, filed Dec. 19, 2003 and published Jul. 15, 2004 as International Publication No. WO 2004/058540, U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005 and published Jul. 27, 2006 as U.S. Pat. Publication No. US-2006-164230, now U.S. Pat. No. 7,370,983, which are hereby incorporated herein by reference in their entireties. Optionally, the mirror assembly may include a video display that is selectively position able, such as extendable/retractable or pivotable or foldable so as to be selectively positioned at a side or below the mirror casing when in use and storable within or at least partially within the mirror casing when not in use. The display may automatically extend/pivot to the in-use position in response to an actuating event, such as when the vehicle is shifted into its reverse gear for a rear vision system or back up aid.

Such a video mirror display (or other display) may be associated with a rearward facing camera at a rear of the vehicle and having a rearward field of view, such as at the license plate holder of the vehicle or at a rear trim portion (such as described in U.S. patent application Ser. No. 11/672,070, filed Feb. 7, 2007, now U.S. Pat. No. 8,698,894 and provisional application Ser. No. 60/765,797, filed Feb. 7, 2006, which are hereby incorporated herein by reference in their entireties). The image data captured by the rearward facing camera may be communicated to the control or video display at the rearview mirror assembly (or elsewhere in the vehicle, such as at an overhead console or accessory module or the like) via any suitable communication means or protocol. For example, the image data may be communicated via a fiber optic cable or a twisted pair of wires, or may be communicated wirelessly, such as via a BLUETOOTH® communication link or protocol or the like, or may be superimposed on a power line, such as a 12 volt power line of the vehicle, such as by utilizing aspects of the systems described in U.S. patent application Ser. No. 11/239,980, filed Sep. 30, 2005, now U.S. Pat. No. 7,881,496, which is hereby incorporated herein by reference in its entirety.

Optionally, and desirably, such rear vision systems are operable to display the images of the rearward scene in response to the driver of the vehicle placing the gear selector in the reverse gear position so as to provide an episodic display that is only activated when the driver may be interested in the displayed rearward images. The rearward facing camera (such as at a rear portion of the vehicle) and the display device (such as at the interior rearview mirror assembly) thus may each be connected to a respective input wire that provides a signal indicative of the vehicle gear selector being shifted to the reverse gear position. Such a configuration may have a wire or lead to the rearview mirror or display device to provide a signal indicative of the vehicle gear selector being shifted to the reverse gear position.

Optionally, the rear vision system or reverse or back up aid may include a camera that has a rearward field of view (such as a camera mounted at a rear portion of the vehicle) and that is in wireless communication with the display system or display device (such as a video display screen or module at the interior rearview mirror assembly of the vehicle). The rearward camera or image capture device may be powered by the power line or feed to the reverse lights of the vehicle, such that the camera is automatically and episodically powered or activated or triggered when the vehicle gear selector is shifted to the reverse position. The image data thus may be communicated to the display system or module or device wirelessly so as to reduce the wiring requirements of the vehicle.

Optionally, the display device may be activated to display the captured images in response to the image data signal being received from the rearward facing camera. For example, a receiver at or of or associated with the display device may receive the image data signal from the rearward facing camera (which is automatically generated upon shifting of the gear selector to the reverse gear position), and the display screen may be automatically and episodically activated to display the captured and received images in response to the receiver receiving the image data signal. The receipt of such a signal by the receiver or display device may activate the video display screen for displaying the captured images (such as by displaying images behind a transflective reflective element such as described in U.S. Pat. No. 6,690,268; and/or PCT Application No. PCT/US2006/042718, filed Oct. 31, and published May 10, 2007 as International Publication No. WO 2007/053710; and/or U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005 and published Jul. 27, 2006 as U.S. Pat. Publication No. US-2006-164230, now U.S. Pat. No. 7,370,983, which are hereby incorporated herein by reference in their entireties), or may trigger an extension of the video display screen from the mirror casing (such as for applications with a video slide-out mirror such as described in U.S. Pat. No. 6,690,268; and/or U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005 and published Jul. 27, 2006 as U.S. Pat. Publication No. US-2006-164230, now U.S. Pat. No. 7,370,983; and/or PCT Application No. PCT/US2006/042718, filed Oct. 31, 2006 and published May 10, 2007 as International Publication No. WO 2007/053710, which are hereby incorporated herein by reference in their entireties). Such an arrangement may eliminate the need for a reverse wire or feed to the display device at the rearview mirror or accessory module.

The camera thus may be automatically and episodically powered and operated to detect and transmit or communicate image data in response to the vehicle gear selector being shifted to or placed in the reverse gear position, whereby the display device may be automatically and episodically activated to show the reverse aid video images when the camera is powered. Optionally, the display device or screen may be automatically activated in response to image data signals from other cameras or image capture devices of the vehicle, whereby the display screen may be automatically and episodically activated to display images of other areas at or near or in the vehicle when other triggering or activating events actuate the other cameras or image capture devices. For example, the wireless communication and triggering or activating of the display screen may be implemented in conjunction with other wireless devices, such as for other interior or exterior cameras of the vehicle, such as for a camera or cameras at the exterior mirror or mirrors for automatic blind spot alert or warning or object detection, whereby the camera or cameras may send a triggering signal in response to a detection of an object at a blind spot of the vehicle (and optionally in response to activation of a turn signal indicator by the driver or in response to a signal from a lane departure warning system or lane change aid or the like) so as to activate the display device (or other display device or alert device) to alert the driver of the vehicle as to the presence of the detected object. Other triggering applications (such as, for example, a manual input to activate an interior rearview monitor or the like) may be implemented while remaining within the spirit and scope of the present invention.

Optionally, the display, such as a video display screen, may be incorporated with or associated with a rearward facing video camera or image sensor, such as for a rear vision system or a backup aid or the like. Optionally, the display may include a graphic overlay feature or capability for overlaying graphics, such as grid lines or the like, that assist the driver of the vehicle in viewing and discerning distances between the vehicle and objects rearward of the vehicle that are displayed on the display for viewing by the driver of the vehicle, such as in response to the vehicle being shifted into a reverse gear or the like. The graphic overlay feature may be electronically generated at or in the image, such as by utilizing aspects of the vision systems described in U.S. Pat. No. 5,670,935; and/or U.S. patent application Ser. No. 11/284,543, filed Nov. 22, 2005 and published Jul. 27, 2006 as U.S. Pat. Publication No. US-2006-164230, now U.S. Pat. No. 7,370,983, and/or U.S. provisional application Ser. No. 60/971,397, filed Sep. 11, 2007, which are hereby incorporated herein by reference in their entireties.

Optionally, a non-electronically generated graphic overlay may be provided at the display that is viewable or discernible only when the display is activated and is substantially non-viewable or non-visible when the display is deactivated. For example, a graphic overlay (such as grid lines or the like that provide reference points in the display to assist the driver in discerning or estimating relative distances between objects or between the vehicle and an object that are shown in the displayed image) may be established at an element that is disposed at or in front of the display device (such as a backlit LCD video screen such as the types referenced above) and behind a front surface of the interior rearview mirror assembly (which is the surface facing the driver of the vehicle when the mirror assembly is installed in the vehicle). Thus, when the display device is deactivated (or not extended if the display device is a slideout or extendable/retractable video display), the graphic overlay is not readily viewable or discernible by the driver of the vehicle.

Optionally, for example, the graphic overlay may be etched or painted or otherwise established at an element or portion that is rearward of the front surface of the mirror reflective element. For example, the graphic overlay may be established via printing or etching at a rear surface of the display on demand transflective reflective element or at the front or rear surface of a polarizer that is disposed at the front of the display screen or at a front surface of the display screen (or the graphic overlay may be established as a masking element at the front surface of the display screen) or the like. The non-electronically established etched or painted or otherwise established graphic overlay thus is always present at the display but is only viewable or discernible when the display is activated for viewing by the driver of the vehicle (such as in response to the driver shifting the vehicle transmission into a reverse gear). For applications with a slideout or extendable/retractable video display screen (that is retractable into the mirror casing when not in use and extended therefrom when in use or when the display screen is activated), the graphic overlay may be established at the front of the display screen (such as at a polarizer or at a masking element or the like), whereby the graphic overlay is moved with the display screen between the stored or non-use position (where the screen and overlay are within the mirror casing and not viewable by the driver of the vehicle) and the extended or use position (where the screen and overlay are at least partially extended from the mirror casing and are viewable by the driver of the vehicle).

The non-electronically established graphic overlay thus is provided in front of a video display screen and is thus backlit by the video display screen, whereby the graphic overlay icons or indicia or the like (which may be screened or printed onto a mask at the video display screen) appear as shadows with the illumination from the video display screen being viewable (such as through the transflective reflective element) through the mask and around the overlay portions or icons or indicia or reticule pattern or the like. Because the graphic overlays are established at the display screen and behind the front surface of the reflective element, the non-electronically established graphic overlays of the present invention avoid the parallax effect that may otherwise be encountered when the driver views a graphic overlay that is at the front surface of the reflective element and that is spaced from the video display screen disposed behind the reflective element.

The non-electronically established graphic overlay may be established (such as by painting or printing or screen printing or etching techniques or the like) to add grid lines to the display viewed by the driver of the vehicle, and may be particularly beneficial to displays utilizing a wide-angle lens at the rearward facing video camera, since such lenses may distort the image that is captured by the camera and displayed to the driver of the vehicle. Such "fish eye" lenses thus may give the driver of the vehicle a distorted rearward view of the backup area, particularly if the camera is mounted off-center at the rear of vehicle relative to a centerline of the vehicle. The grid lines or other overlays may help the driver to judge distances between the vehicle bumper or trailer hitch and an object rearward of the vehicle, and may provide guide lines (such as parallel or converging guide lines) to help reference the sides of the vehicle. Optionally, the graphic overlay may be established or painted or printed in different colors to enhance viewability and discernibility of the graphic overlay.

Figure 17:
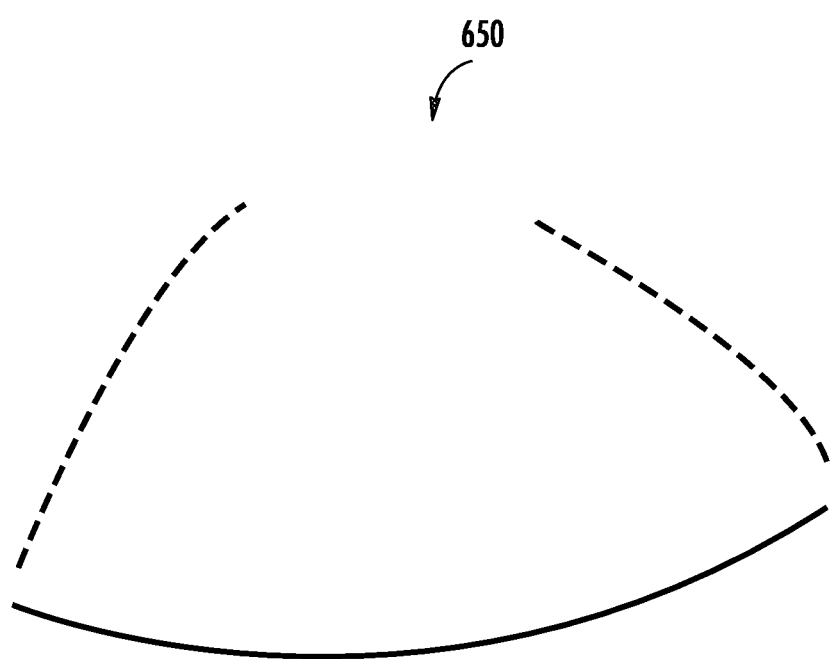
FIG. 17 is an illustration of a graphic overlay suitable for use with the present invention.
Figure 18:
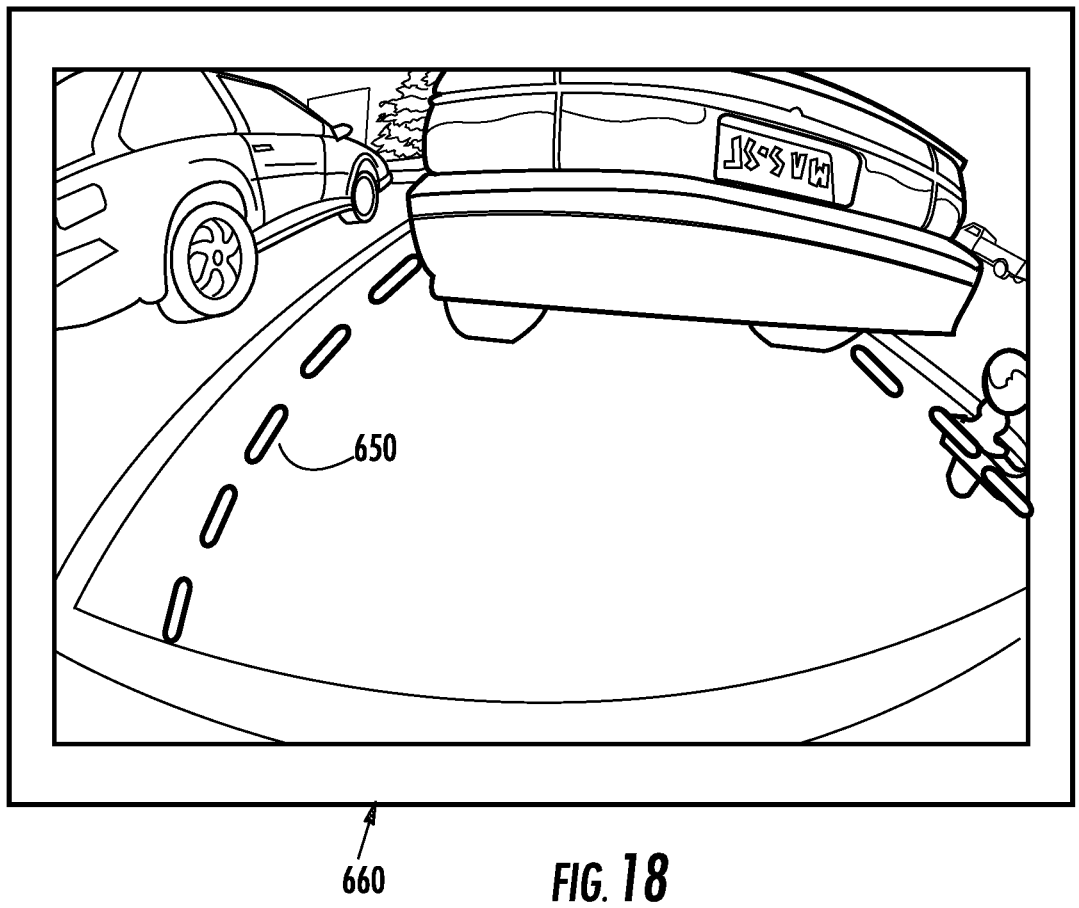
FIG. 18 is a front elevation of a video display screen with the graphic overlay of FIG. 17 disposed thereat in accordance with the present invention.
Figure 19:
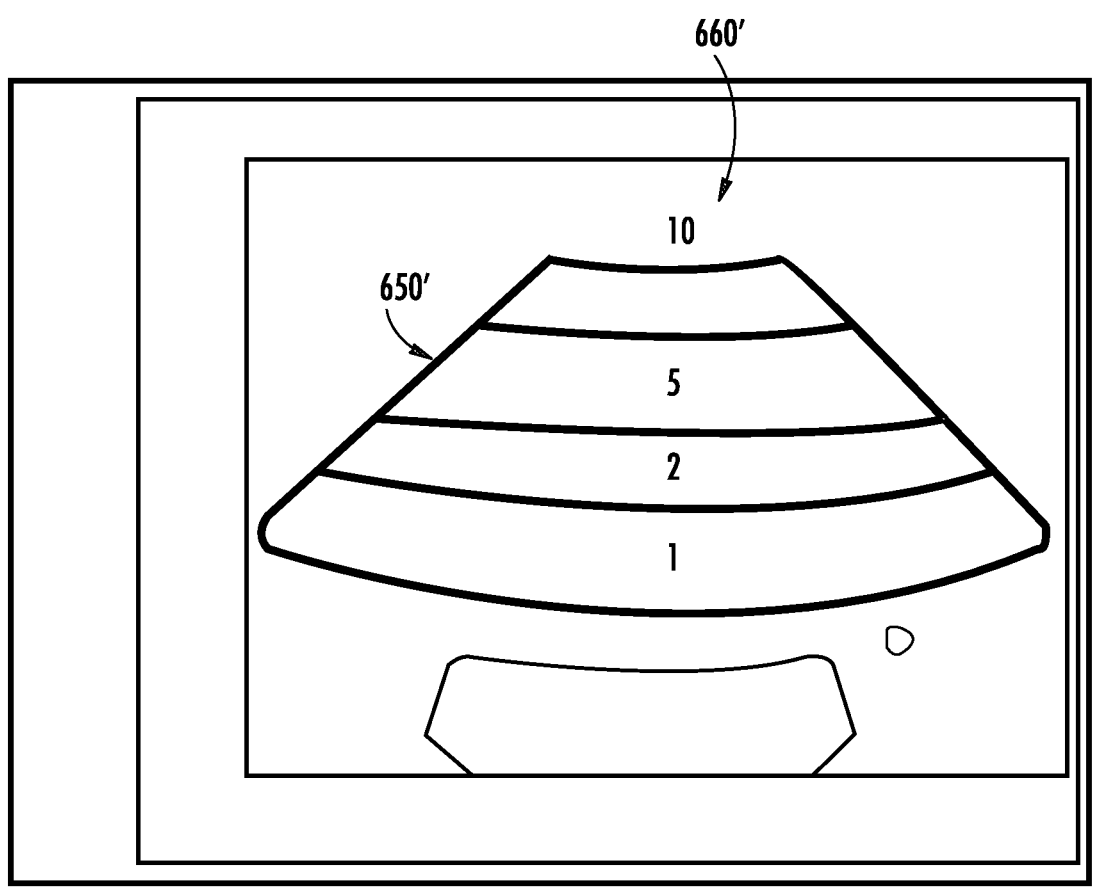
FIG. 19 is a front elevation of a video display screen with another graphic overlay disposed thereat in accordance with the present invention.

Examples of such graphic overlays are shown in FIGS. 17-19. For example, and with reference to FIGS. 17 and 18, a non-electronically generated graphic overlay 650 may be provided or established at or near or in front of a video display screen so as to be viewable by the driver of the vehicle when the display screen is activated. As shown in FIG. 18, the graphic overlay 650 is viewable at the display screen 660 when the display screen is activated, so as to provide a reference to the side regions and center of the vehicle during a backup operation. Optionally, and as shown in FIG. 19, the graphic overlay 650' at or in front of a display screen 660' may include horizontal grid lines or references that include numbers that indicate a distance along the road surface at the rear of the vehicle and relative to the rear bumper (or other reference point or object) of the vehicle.

The present invention thus provides for a static graphic overlay that may be established (such as via painting or printing or etching or the like) on any surface of the mirror glass substrates or the display module or on a graphic overlay substrate or element. For example, the graphic overlay may be printed (or otherwise established) on the first surface (or front surface of the first or front substrate) of the electro-optic (such as electrochromic) reflective element, or on the second surface (or rear surface of the front substrate) or on the third surface (or front surface of the rear substrate) or on the fourth surface (or rear surface of the rear substrate) of the reflective element or cell. Optionally, for example, the graphic overlay may be printed or established on any of the laminate surfaces or the TFT glass surfaces of the display module (such as a back lit liquid crystal video screen or module or the like) so as to be disposed at the display module and back lit by the illumination source or sources of the display module. Optionally, a graphic overlay element or substrate, such as a Mylar element (or other suitable material) with pad printing (or other printing or painting or etching) of the graphic overlay or overlays on the substrate or element, may be disposed at or in front of the display module and behind the front surface of the mirror reflective element, such as between the front and rear substrates of the reflective element assembly or cell or between the fourth surface of the reflective element and the front of the display module, or elsewhere in front of the display module so as to be backlit by the illumination source or sources of the display module.

The graphic overlay or overlays of the present invention thus may be printed or established in front of the display device or module (such as in front of the illumination source of the display device or module) so as to be viewable by the driver of the vehicle at the display screen. The graphic overlays may be color printed or may be spectrally selective so as to be viewable in color at the display screen.

The static graphic overlays thus may be provided for a display screen or display device that is dedicated to a reverse aid system of backup system or rear vision system or the like, whereby the graphic overlays may be configured so as to provide the desired information or indicia to assist the driver in viewing and discerning images of the area rearward of the vehicle, such as during a reverse maneuver. For example, the graphic overlays may provide perspective indicia to give the driver perspective when viewing the display screen and may provide indicia to indicate distances rearward of the vehicle. For example, the graphic overlay may provide grid lines or markings at predetermined spacings to provide enhanced viewing and understanding of the displayed images. The graphic overlays thus provide a fixed or static or non-dynamic indicia that will assist the driver in viewing and discerning or understanding the displayed images.

The graphic overlays thus may provide a conversion reference to the actual area at the rear of the vehicle. The non-electronically generated graphic overlays thus may provide an economical graphic overlay at the display screen of a rear vision system or back up aid, without the increased costs typically associated with the electronically generated graphic overlays. The static graphic overlay at the video mirror display thus provides a relatively simple and cost effective way to implement a graphic overlay at a display of a rear vision system. The present invention thus provides any mirror with a display screen (such as an LCD video screen or the like) with mapping or grid lines to assist the driver in performing back up operations.

Optionally, the display system of the present invention may provide other forms of a graphic overlay, such as icons or text or indicia or the like, at the display screen. In applications with digital cameras or digital camera outputs, the digital signals from the digital camera or digital environment may be readily digitally married with computer graphics or the like and displayed on a display screen. Such digital signals may be communicated from the camera to the display device (which is remote from the camera) via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like.

However, in many applications, a camera or image sensor may be selected or used that provides a non-digital or analog video signal, such as an NTSC signal or a PAL signal or the like. For example, such non-digital or analog communications may be desired to communication the video signal from a rear portion of the vehicle to a display system at or near a front portion of the vehicle cabin (typically via wires connected between the camera and the display device). When the analog video signal or images are displayed, it may be desired to provide such graphic or text or iconistic overlays at the display to enhance the information provided by the display screen, such as by utilizing aspects of the display system described in U.S. patent application Ser. No. 11/284,543, filed Nov. 22, 2005 and published Jul. 27, 2006 as U.S. Pat. Publication No. US-2006-164230, now U.S. Pat. No. 7,370,983, which is hereby incorporated herein by reference in its entirety.

The screen display and graphic overlay or overlay screen display of the present invention provides an economical video on-screen character or iconistic or graphical overlay for vehicle rear vision assist (such as, for example, a forward, sideward or rearward parking assist or backup aid or the like) and other vehicle-based video or imaging applications. The low cost wiring between the analog camera and the display device may be utilized, while still providing the graphic overlays on the video images being displayed. The overlay screen display thus comprises economical circuitry that generates an on-screen display that overlays user-defined text or icons or graphical overlays in real-time onto either an incoming NTSC or PAL video signal feed (such as is output from an analog camera) or onto a self-generating background screen, directly onto a video mirror display or other vehicular rear vision application or any NTSC or PAL (video in) television signal, DVD signal, VCR signal or the like.

Optionally, in one embodiment, a fixed grid or reticule pattern may be overlayed onto the real-time rear camera image to indicate one or more physical reference points (such as, for example, a vehicle bumper, the sides of vehicle, a virtual trailer hitch location, and/or the like) or distance information or other relevant or desired information. The overlay screen display could also overlay monochrome text or colored text onto an incoming video source or could display colored text on a self-generated colored background screen (such as, for example, a blue screen). Text color, blinking, zoom level, cursor positioning, and the background color may be controlled from user inputs, such as push-button controls or the like, or by the vehicle's multiplexed communication system or the like.

Other commands for controlling the video display screen and overlay may include screen clearing, showing/hiding the text, scrolling the text, blinking or flashing or intermittently displaying the text and enabling/disabling translucent text (a feature that allows video to pass through the text, such as in a similar manner as some television networks do with their logos). The overlay information may comprise various vehicle information to display such information for viewing by the driver of the vehicle. For example, the overlay information may include GPS coordinates indicating the vehicle's location or a location of another place, such as a waypoint of a programmed travel route or a destination location or the like, a compass or directional heading of the vehicle, the outside temperature, or warnings or alerts, or other information that a driver may wish to see while driving the vehicle. Optionally, the overlay information may comprise telematics information, such as, for example, hands free commands, turn by turn instructions, caller ID, traffic information, and/or the like.

Figure 20:
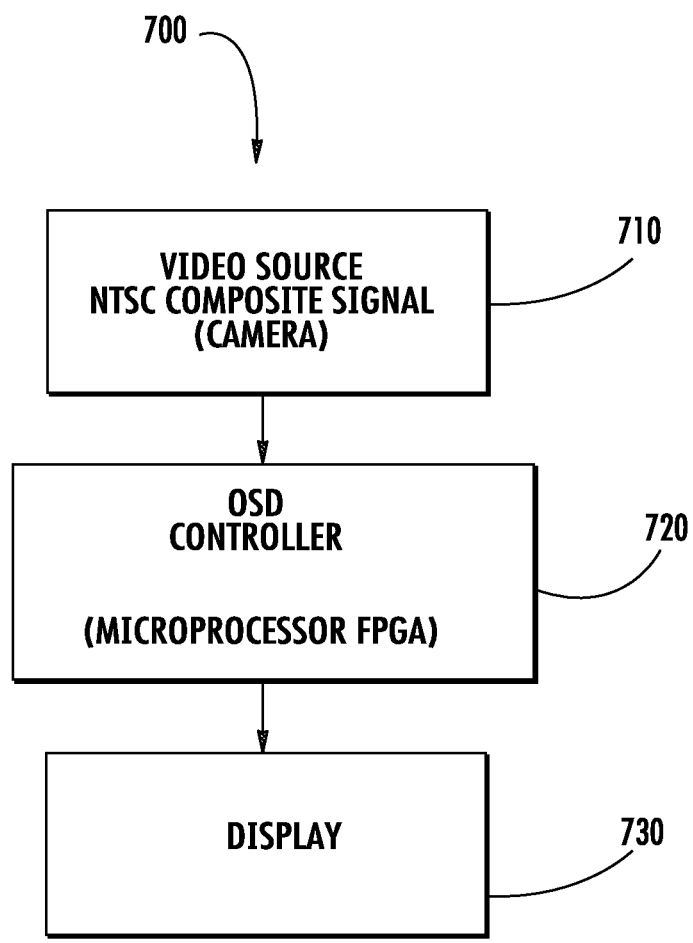
FIG. 20 is a block diagram of a graphic overlay system in accordance with the present invention.

The overlay screen display controller circuitry may be incorporated in the rearview mirror or at an interface module located between the video source or camera and the display. For example, and as shown in FIG. 20, a graphic overlay system 700 may include a video signal 710, such as a video source NTSC composite signal or the like, which may be provided from a camera or image sensor to the overlay screen display (OSD) controller 720, such as a microprocessor or FPGA or the like. The controller 720 may generate the overlay information and the video signal and overlay information may be provided to the display 730. The controller 720 thus may function to receive the composite video signal, add the appropriate information (such as icons or indicia or text or the like) and resends the composite signal out to be displayed at the video display screen.

Using the present invention, graphical overlays and the like may be economically generated and overlayed/displayed on a video screen viewable by the driver (such as an interior mirror slide-out video screen) by an overlay screen display (OSD) video controller that is receiving a non-digital analog video signal from a non-digital, analog video camera (such as an NTSC analog camera or PAL camera or the like) mounted at the vehicle, such as at the rear of the vehicle to view rearward when reverse gear is engaged, and that generates the video feed to the video display screen seen by the driver, with a graphic overlay superimposed onto the NTSC or similar TV-protocol video feed from the rear mounted analog video camera (or other camera mounted elsewhere at the vehicle with a corresponding field of view).

Optionally, a non-digital or analog video signal (such as an NTSC or PAL signal) may be fed or communicated to an analog to digital (A/D) converter to digitize or convert the signal to a digital format. The digitized signal may then be fed or communicated to a microprocessor or controller for digital processing, such as for adding a digital graphic overlay to the images of the video signal. The digitized signal, with digital graphic overlays, may then pass to a digital to analog (D/A) converter to convert the digitized signal with graphic overlays to a non-digital or analog signal, which is then communicated to the display device or element or screen, such as via known analog signals, such as an NTSC or PAL signal or the like). The display system thus may provide graphic overlays to an analog camera signal so that the video images and graphic overlays, such as text, indicia, icons or the like, may be viewed at the display screen by the driver of the vehicle. The A/D converter, microprocessor and/or D/A converter may be located at any location between the analog camera and the display device, such as at the interior rearview mirror assembly or proximate to or near or associated with the interior rearview mirror assembly, or elsewhere at the vehicle, without affecting the scope of the present invention.

Optionally, the mirror assembly may include one or more user inputs for controlling or activating/deactivating one or more electrical accessories or devices of or associated with the mirror assembly. For example, the mirror assembly may comprise any type of switches or buttons, such as touch or proximity sensing switches, such as touch or proximity switches of the types described in PCT Application No. PCT/US03/40611, filed Dec. 19, 2003 and published Jul. 15, 2004 as International Publication No. WO 2004/058540; and/or PCT Application No. PCT/US2004/015424, filed May 18, 2004 and published on Dec. 2, 2004, as International Publication No. WO 2004/103772, and/or U.S. Pat. Nos. 6,001,486; 6,310,611; 6,320,282 and 6,627,918; and/or U.S. patent application Ser. No. 11/021,065, filed Dec. 23, 2004, now U.S. Pat. No. 7,255,451; and/or U.S. patent application Ser. No. 09/817,874, filed Mar. 26, 2001, now U.S. Pat. No. 7,224,324; Ser. No. 10/956,749, filed Oct. 1, 2004, now U.S. Pat. No. 7,446,924; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360,932, which are hereby incorporated herein by reference in their entireties, or the inputs may comprise other types of buttons or switches, such as those described in U.S. Pat. No. 6,501,387, and/or U.S. patent application Ser. No. 11/029,695, filed Jan. 5, 2005, now U.S. Pat. No. 7,253,723; and/or Ser. No. 11/451,639, filed Jun. 13, 2006, now U.S. Pat. No. 7,527,403, which are hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties. Other types of switches or buttons or inputs or sensors may be incorporated to provide the desired function, without affecting the scope of the present invention. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, the user inputs or buttons may comprise user inputs for a garage door opening system, such as a vehicle based garage door opening system of the types described in U.S. Pat. Nos. 7,023,322; 6,396,408; 6,362,771 and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614 and/or 7,004,593, and/or U.S. patent application Ser. No. 10/645,762, filed Aug. 20, 2003, now U.S. Pat. No. 7,167,796; Ser. No. 10/529,715, filed Mar. 30, 2005, now U.S. Pat. No. 7,657,052; Ser. No. 10/538,724, filed Jun. 13, 2005 and published Mar. 9, 2006 as U.S. Publication No. US-2006-0050018; and/or Ser. No. 10/964,512, filed Oct. 13, 2004, now U.S. Pat. No. 7,308,341, which are all hereby incorporated herein by reference in their entireties.

Optionally, the display and inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,690,268; 6,824,281; 6,672,744; 6,386,742 and 6,124,886, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published on Dec. 2, 2004, as International Publication No. WO 2004/103772, and/or U.S. patent application Ser. No. 10/510,813, filed Aug. 23, 2002, now U.S. Patent Application Publication No. US-2005-0151396, published Jul. 14, 2005, which are hereby incorporated herein by reference in their entireties.

Optionally, the mirror assembly or accessory module may fixedly or non-movably support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775 and/or 5,669,698, and/or U.S. patent application Ser. No. 10/054,633, filed Jan. 22, 2002, now U.S. Pat. No. 7,195,381; and/or Ser. No. 10/933,842, filed Sep. 3, 2004, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources.

Optionally, the mirror assembly may also or otherwise include other accessories, such as microphones, such as analog microphones or digital microphones or the like, such as microphones of the types disclosed in U.S. Pat. Nos. 6,243,003; 6,278,377 and/or 6,420,975, and/or in U.S. patent application Ser. No. 10/529,715, filed Mar. 30, 2005, now U.S. Pat. No. 7,657,052. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection and/or indication system, such as disclosed in U.S. Pat. Nos. 7,038,577; 6,882,287; 5,929,786 and/or 5,786,772, and/or U.S. patent application Ser. No. 11/315,675, filed Dec. 22, 2005, now U.S. Pat. No. 7,720,580; and/or PCT Application No. PCT/US2006/026148, filed Jul. 5, 2006 and published Jan. 11, 2007 as International Publication No. WO 2007/005942, transmitters and/or receivers, such as for a garage door opener or a vehicle door unlocking system or the like (such as a remote keyless entry system), a digital network, such as described in U.S. Pat. No. 5,798,575, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; and/or Ser. No. 60/628,709, filed Nov. 17, 2004; and/or U.S. patent application Ser. No. 11/105,757, filed Apr. 14, 2005, now U.S. Pat. No. 7,526,103; Ser. No. 11/334,139, filed Jan. 18, 2006, now U.S. Pat. No. 7,400,435; and/or Ser. No. 11/239,980, filed Sep. 30, 2005, now U.S. Pat. No. 7,881,496, a video device for internal cabin surveillance (such as for sleep detection or driver drowsiness detection or the like) and/or video telephone function, such as disclosed in U.S. Pat. Nos. 5,760,962 and/or 5,877,897, an occupant detection system and/or interior cabin monitoring system (such as the types described in U.S. Pat. Nos. 6,019,411 and/or 6,690,268, and/or PCT Application No. PCT/US2005/042504, filed Nov. 22, 2005 and published Jun. 1, 2006 as International Publication No. WO 2006/058098; and/or PCT Application No. PCT/US94/01954, filed Feb. 25, 1994, a heating element, particularly for an exterior mirror application, such as the types described in U.S. patent application Ser. No. 11/334,139, filed Jan. 18, 2006, now U.S. Pat. No. 7,400,435, a remote keyless entry receiver, a seat occupancy detector, a remote starter control (such as a starter system utilizing aspects of U.S. provisional applications, Ser. No. 60/859,680, filed Nov. 17, 2006, and Ser. No. 60/944,917, filed Jun. 19, 2007), a yaw sensor, a clock, a carbon monoxide detector, status displays, such as displays that display a status of a door of the vehicle, a transmission selection (4wd/2wd or traction control (TCS) or the like), an antilock braking system, a road condition sensing system (that may warn the driver of icy road conditions and/or the like, such as black ice conditions, such as described in U.S. provisional application Ser. No. 60/872,270, filed Dec. 1, 2006), a trip computer, a tire pressure monitoring system (TPMS) receiver (such as described in U.S. Pat. Nos. 6,124,647; 6,294,989; 6,445,287; 6,472,979 and/or 6,731,205; and/or U.S. patent application Ser. No. 11/232,324, filed Sep. 21, 2005, now U.S. Pat. No. 7,423,522, and/or an ONSTAR® system and/or any other accessory or circuitry or the like (with all of the above-referenced U.S. patents and PCT applications and U.S. patent applications and U.S. provisional applications being commonly assigned, and with the disclosures of the referenced U.S. patents and PCT applications and U.S. patent applications and U.S. provisional applications being hereby incorporated herein by reference in their entireties).

Changes and modifications to the specifically described embodiments may be carried out without departing from the principles of the present invention, which is intended to be limited only by the scope of the appended claims as interpreted according to the principles of patent law.

The invention claimed is:

1. A vehicular driver monitoring system, the vehicular driver monitoring system comprising:

an interior prismatic rearview mirror assembly disposed at an in-cabin side of a windshield of a vehicle equipped with the vehicular driver monitoring system;

wherein the interior prismatic rearview mirror assembly comprises a prismatic mirror reflective element;

wherein the prismatic mirror reflective element comprises a prismatic glass substrate, the prismatic glass substrate having a planar front glass surface and a transflector-coated planar rear glass surface;

wherein the transflector-coated planar rear glass surface of the prismatic glass substrate is spaced from the planar front glass surface of the prismatic glass substrate by a thickness dimension of the prismatic glass substrate;

wherein the transflector-coated planar rear glass surface of the prismatic glass substrate of the prismatic mirror reflective element (i) transmits visible light and (ii) reflects visible light;

wherein the transflector-coated planar rear glass surface of the prismatic glass substrate of the prismatic mirror reflective element transmits near infrared light;

wherein the interior prismatic rearview mirror assembly comprises a mirror casing;

wherein a circumferential perimeter glass edge circumscribes a periphery of the prismatic glass substrate of the prismatic mirror reflective element, the circumferential perimeter glass edge spanning the thickness dimension of the prismatic glass substrate spacing the planar front glass surface from the transflector-coated planar rear glass surface;

wherein no portion of the mirror casing overlaps the planar front glass surface of the prismatic glass substrate of the prismatic mirror reflective element;

wherein a portion of the mirror casing circumscribes the circumferential perimeter glass edge circumscribing the periphery of the prismatic glass substrate of the prismatic mirror reflective element;

a camera disposed at the interior prismatic rearview mirror assembly;

wherein the camera comprises a CMOS image sensor;

wherein the CMOS image sensor comprises a photosensor array that senses both visible light and near infrared illumination;

wherein the camera is disposed behind the prismatic mirror reflective element and views through the transflector-coated planar rear glass surface of the prismatic glass substrate of the prismatic mirror reflective element into an interior cabin of the equipped vehicle;

wherein supplemental sources of near infrared illumination are disposed at the interior prismatic rearview mirror assembly, and wherein the supplemental sources of near infrared illumination disposed at the interior prismatic rearview mirror assembly are operable to emit near infrared light to illuminate at least a driver-side front seating area within the interior cabin of the equipped vehicle;

wherein presence of the camera disposed behind the prismatic mirror reflective element and viewing through the transflector-coated planar rear glass surface of the prismatic glass substrate of the prismatic mirror reflective element is not readily apparent to an occupant of the equipped vehicle;

wherein the camera is operable to capture image data;

a processor that processes image data captured by the camera;

wherein the camera at least (a) views the driver-side front seating area of the equipped vehicle and (b) views a passenger-side front seating area of the equipped vehicle; and wherein via processing at the processor of image data captured by the camera, a driver of the equipped vehicle seated at the driver-side front seating area within the interior cabin of the equipped vehicle is monitored.

2. The vehicular driver monitoring system of claim 1, wherein via processing at the processor of image data captured by the camera, occupancy at the passenger-side front seating area is determined.

3. The vehicular driver monitoring system of claim 1, wherein the supplemental sources of near infrared illumination disposed at the interior prismatic rearview mirror assembly comprise a plurality of near infrared-emitting light emitting diodes.

4. The vehicular driver monitoring system of claim 3, wherein the interior prismatic rearview mirror assembly comprises the processor that processes image data captured by the camera.

5. The vehicular driver monitoring system of claim 1, wherein the supplemental sources of near infrared illumination disposed at the interior prismatic rearview mirror assembly comprise a plurality of near infrared-emitting lasers.

6. The vehicular driver monitoring system of claim 1, wherein the supplemental sources of near infrared illumination disposed at the interior prismatic rearview mirror assembly are disposed behind the prismatic mirror reflective element, and wherein near infrared light emitted by the supplemental sources of near infrared illumination disposed at the interior prismatic rearview mirror assembly passes through the transflector-coated planar rear glass surface of the prismatic glass substrate of the prismatic mirror reflective element into the interior cabin of the equipped vehicle.

7. The vehicular driver monitoring system of claim 6, wherein the supplemental sources of near infrared illumination disposed at the interior prismatic rearview mirror assembly are not readily apparent to an occupant of the equipped vehicle.

8. The vehicular driver monitoring system of claim 7, wherein the processor that processes image data captured by the camera comprises a system-on-a-chip image processor.

9. The vehicular driver monitoring system of claim 6, wherein via processing at the processor of image data captured by the camera, movement by the driver is recognized.

10. The vehicular driver monitoring system of claim 9, wherein the recognized movement by the driver comprises a hand gesture by the driver of the equipped vehicle.

11. The vehicular driver monitoring system of claim 10, wherein responsive at least in part to recognition of the hand gesture, a device of the equipped vehicle is controlled.

12. The vehicular driver monitoring system of claim 10, wherein the recognized hand gesture by the driver of the equipped vehicle is for a gesture-controlled human-machine-interface (HMI) of the equipped vehicle.

13. The vehicular driver monitoring system of claim 10, wherein the hand gesture by the driver comprises sign language.

14. The vehicular driver monitoring system of claim 1, wherein via processing at the processor of image data captured by the camera, air bag deployment is controlled.

15. The vehicular driver monitoring system of claim 1, wherein the interior prismatic rearview mirror assembly includes a head up display device that projects information toward the windshield of the equipped vehicle so as to be viewable by the driver of the equipped vehicle.

16. The vehicular driver monitoring system of claim 1, comprising a video display device disposed within an interior cabin of the vehicle, and wherein the video display device comprises a video display screen operable to display video images viewable by the driver of the equipped vehicle, and wherein the video display screen displays video images derived from image data captured by an exterior-viewing camera disposed at the equipped vehicle.

17. The vehicular driver monitoring system of claim 16, wherein, when a portable hand-held device is present in the interior cabin of the equipped vehicle, the portable hand-held device communicates a signal to a vehicle-based receiver, and wherein the video display device displays a listing of choices in responsive to communication of the signal, and wherein the listing of choices displayed by the video display device comprises at least one of (a) a listing of voice mail messages, (b) a listing of phone numbers, (c) a listing of received or transmitted emails and (d) a listing of titles or tracks stored in memory of a portable playback device or downloadable from an external provider.

18. The vehicular driver monitoring system of claim 1, comprising a video display device disposed within an interior cabin of the vehicle, and wherein the video display device comprises a video display screen operable to display video images viewable by the driver of the equipped vehicle, and wherein the video display screen displays video images derived from image data captured by an exterior-viewing camera disposed at the equipped vehicle, and wherein the video display device is disposed in the interior prismatic rearview mirror assembly, and wherein displayed video images are viewable through the prismatic mirror reflective element of the interior prismatic rearview mirror assembly.

19. The vehicular driver monitoring system of claim 1, wherein the prismatic mirror reflective element nests in the mirror casing.

20. The vehicular driver monitoring system of claim 1, wherein the portion of the mirror casing that circumscribes the circumferential perimeter glass edge circumscribing the periphery of the prismatic glass substrate of the prismatic mirror reflective element comprises a plastic molding, and wherein the plastic molding that circumscribes the circumferential perimeter glass edge circumscribing the periphery of the prismatic glass substrate does not encroach onto the planar front glass surface of the prismatic glass substrate of the prismatic mirror reflective element.

21. The vehicular driver monitoring system of claim 20, wherein the plastic molding comprises a bezel portion of the mirror casing.

22. The vehicular driver monitoring system of claim 1, wherein the portion of the mirror casing that circumscribes the circumferential perimeter glass edge circumscribing the periphery of the prismatic glass substrate of the prismatic mirror reflective element comprises a plastic molding.

23. The vehicular driver monitoring system of claim 22, wherein the plastic molding comprises an outermost part, and wherein, with the plastic molding of the portion of the mirror casing circumscribing the circumferential perimeter glass edge of the prismatic glass substrate, the outermost part of the plastic molding provides a curved transition between the planar front glass surface of the prismatic glass substrate of the prismatic mirror reflective element and another part of the mirror casing, and wherein the outermost part of the plastic molding providing the curved transition between the planar front glass surface of the prismatic glass substrate of the prismatic mirror reflective element and the other part of the mirror casing comprises an outer curved surface, and wherein the outer curved surface of the outermost part of the plastic molding provides a curved transition between the planar front glass surface of the prismatic glass substrate and a less-curved part of the plastic molding, and wherein the less-curved part of the plastic molding is contiguous with the outer curved surface of the outermost part of the plastic molding.

24. The vehicular driver monitoring system of claim 1, wherein the portion of the mirror casing that circumscribes the circumferential perimeter glass edge circumscribing the periphery of the prismatic glass substrate of the prismatic mirror reflective element comprises a plastic molding, and wherein the plastic molding contacts the circumferential perimeter glass edge of the prismatic glass substrate of the prismatic mirror reflective element.

25. The vehicular driver monitoring system of claim 1, wherein the portion of the mirror casing that circumscribes the circumferential perimeter glass edge circumscribing the periphery of the prismatic glass substrate of the prismatic mirror reflective element comprises a plastic molding, and wherein, with the plastic molding circumscribing the circumferential perimeter glass edge of the prismatic glass substrate, an outermost part of the plastic molding provides a curved transition between the planar front glass surface of the prismatic glass substrate of the prismatic mirror reflective element and another part of the mirror casing, and wherein the outermost part of the plastic molding lacks an exposed sharp edge.

26. The vehicular driver monitoring system of claim 1, wherein the supplemental sources of near infrared illumination disposed at the interior prismatic rearview mirror assembly are operable to emit near infrared light to illuminate the driver-side front seating area within the interior cabin of the equipped vehicle and to illuminate the passenger-side front seating area within the interior cabin of the equipped vehicle.

27. A vehicular driver monitoring system, the vehicular driver monitoring system comprising:
  an interior prismatic rearview mirror assembly disposed at an in-cabin side of a windshield of a vehicle equipped with the vehicular driver monitoring system;
  wherein the interior prismatic rearview mirror assembly comprises a prismatic mirror reflective element;
  wherein the prismatic mirror reflective element comprises a prismatic glass substrate, the prismatic glass substrate having a planar front glass surface and a transflector-coated planar rear glass surface;
  wherein the transflector-coated planar rear glass surface of the prismatic glass substrate is spaced from the planar front glass surface of the prismatic glass substrate by a thickness dimension of the prismatic glass substrate;
  wherein the transflector-coated planar rear glass surface of the prismatic glass substrate of the prismatic mirror reflective element (i) transmits visible light and (ii) reflects visible light;
  wherein the transflector-coated planar rear glass surface of the prismatic glass substrate of the prismatic mirror reflective element transmits near infrared light;
  wherein the interior prismatic rearview mirror assembly comprises a mirror casing;
  wherein a circumferential perimeter glass edge circumscribes a periphery of the prismatic glass substrate of the prismatic mirror reflective element, the circumferential perimeter glass edge spanning the thickness dimension of the prismatic glass substrate spacing the planar front glass surface from the transflector-coated planar rear glass surface, and wherein no portion of the mirror casing overlaps the planar front glass surface of the prismatic glass substrate of the prismatic mirror reflective element;
  wherein a portion of the mirror casing circumscribes the circumferential perimeter glass edge circumscribing the periphery of the prismatic glass substrate of the prismatic mirror reflective element;
  a camera disposed at the interior prismatic rearview mirror assembly;
  wherein the camera comprises a CMOS image sensor;
  wherein the CMOS image sensor comprises a photosensor array that senses both visible light and near infrared illumination;
  wherein the camera is disposed behind the prismatic mirror reflective element and views through the transflector-coated planar rear glass surface of the prismatic glass substrate of the prismatic mirror reflective element into an interior cabin of the equipped vehicle;
  wherein presence of the camera disposed behind the prismatic mirror reflective element and viewing through the transflector-coated planar rear glass surface of the prismatic glass substrate of the prismatic mirror reflective element is not readily apparent to an occupant of the equipped vehicle;
  wherein supplemental sources of near infrared illumination are disposed at the interior prismatic rearview mirror assembly, and wherein the supplemental sources of near infrared illumination disposed at the interior prismatic rearview mirror assembly are operable to emit near infrared light to illuminate at least a driver-side front seating area within the interior cabin of the equipped vehicle;
  wherein the supplemental sources of near infrared illumination disposed at the interior prismatic rearview mirror assembly comprise a plurality of near infrared-emitting light emitting diodes;
  wherein the supplemental sources of near infrared illumination disposed at the interior prismatic rearview mirror assembly are disposed behind the prismatic mirror reflective element;
  wherein near infrared light emitted by the supplemental sources of near infrared illumination disposed at the interior prismatic rearview mirror assembly passes through the transflector-coated planar rear glass surface of the prismatic glass substrate of the prismatic mirror reflective element into the interior cabin of the equipped vehicle;
  wherein the supplemental sources of near infrared illumination disposed at the interior prismatic rearview mirror assembly are not readily apparent to an occupant of the equipped vehicle;
  wherein the camera is operable to capture image data;
  a processor that processes image data captured by the camera;

wherein the camera at least (a) views the driver-side front seating area of the equipped vehicle and (b) views a passenger-side front seating area of the equipped vehicle; and wherein via processing at the processor of image data captured by the camera, a driver of the equipped vehicle seated at the driver-side front seating area within the interior cabin of the equipped vehicle is monitored.

28. The vehicular driver monitoring system of claim 27, wherein the portion of the mirror casing that circumscribes the circumferential perimeter glass edge circumscribing the periphery of the prismatic glass substrate of the prismatic mirror reflective element comprises a plastic molding, and wherein the plastic molding contacts the circumferential perimeter glass edge of the prismatic glass substrate of the prismatic mirror reflective element.

29. The vehicular driver monitoring system of claim 27, wherein the supplemental sources of near infrared illumination disposed at the interior prismatic rearview mirror assembly are operable to emit near infrared light to illuminate the driver-side front seating area within the interior cabin of the equipped vehicle and to illuminate the passenger-side front seating area within the interior cabin of the equipped vehicle.

30. The vehicular driver monitoring system of claim 29, wherein the portion of the mirror casing that circumscribes the circumferential perimeter glass edge circumscribing the periphery of the prismatic glass substrate of the prismatic mirror reflective element comprises a plastic molding.

31. The vehicular driver monitoring system of claim 30, wherein, with the plastic molding circumscribing the circumferential perimeter glass edge of the prismatic glass substrate, an outermost part of the plastic molding provides a curved transition between the planar front glass surface of the prismatic glass substrate of the prismatic mirror reflective element and another part of the mirror casing, and wherein the outermost part of the plastic molding lacks an exposed sharp edge.

32. The vehicular driver monitoring system of claim 29, comprising a video display device disposed within an interior cabin of the vehicle, and wherein the video display device comprises a video display screen operable to display video images viewable by the driver of the equipped vehicle, and wherein the video display screen displays video images derived from image data captured by an exterior-viewing camera disposed at the equipped vehicle, and wherein the video display device is disposed in the interior prismatic rearview mirror assembly, and wherein displayed video images are viewable through the prismatic mirror reflective element of the interior prismatic rearview mirror assembly.

33. The vehicular driver monitoring system of claim 27, wherein the prismatic mirror reflective element nests in the mirror casing.

34. The vehicular driver monitoring system of claim 27, wherein the portion of the mirror casing that circumscribes the circumferential perimeter glass edge circumscribing the periphery of the prismatic glass substrate of the prismatic mirror reflective element comprises a plastic molding, and wherein the plastic molding that circumscribes the circumferential perimeter glass edge circumscribing the periphery of the prismatic glass substrate (i) does not encroach onto the planar front glass surface of the prismatic glass substrate of the prismatic mirror reflective element and (ii) comprises a bezel portion of the mirror casing.

35. The vehicular driver monitoring system of claim 34, wherein the plastic molding contacts the circumferential perimeter glass edge of the prismatic glass substrate of the prismatic mirror reflective element.

36. The vehicular driver monitoring system of claim 27, wherein the portion of the mirror casing that circumscribes the circumferential perimeter glass edge circumscribing the periphery of the prismatic glass substrate of the prismatic mirror reflective element comprises a plastic molding, and wherein the plastic molding that circumscribes the circumferential perimeter glass edge circumscribing the periphery of the prismatic glass substrate comprises an outermost part, and wherein, with the plastic molding of the portion of the mirror casing circumscribing the circumferential perimeter glass edge of the prismatic glass substrate, the outermost part of the plastic molding provides a curved transition between the planar front glass surface of the prismatic glass substrate of the prismatic mirror reflective element and another part of the mirror casing, and wherein the outermost part of the plastic molding providing the curved transition between the planar front glass surface of the prismatic glass substrate of the prismatic mirror reflective element and the other part of the mirror casing comprises an outer curved surface, and wherein the outer curved surface of the outermost part of the plastic molding provides a curved transition between the planar front glass surface of the prismatic glass substrate and a less-curved part of the plastic molding, and wherein the less-curved part of the plastic molding is contiguous with the outer curved surface of the outermost part of the plastic molding.

37. The vehicular driver monitoring system of claim 27, comprising a video display device disposed within an interior cabin of the vehicle, and wherein the video display device comprises a video display screen operable to display video images viewable by the driver of the equipped vehicle, and wherein the video display screen displays video images derived from image data captured by an exterior-viewing camera disposed at the equipped vehicle, and wherein the video display device is disposed in the interior prismatic rearview mirror assembly, and wherein displayed video images are viewable through the prismatic mirror reflective element of the interior prismatic rearview mirror assembly.

38. A vehicular driver monitoring system, the vehicular driver monitoring system comprising:

an interior prismatic rearview mirror assembly disposed at an in-cabin side of a windshield of a vehicle equipped with the vehicular driver monitoring system;

wherein the interior prismatic rearview mirror assembly comprises a prismatic mirror reflective element;

wherein the prismatic mirror reflective element comprises a prismatic glass substrate, the prismatic glass substrate having a planar front glass surface and a transflector-coated planar rear glass surface;

wherein the transflector-coated planar rear glass surface of the prismatic glass substrate is spaced from the planar front glass surface of the prismatic glass substrate by a thickness dimension of the prismatic glass substrate;

wherein the transflector-coated planar rear glass surface of the prismatic glass substrate of the prismatic mirror reflective element (i) transmits visible light and (ii) reflects visible light;

wherein the transflector-coated planar rear glass surface of the prismatic glass substrate of the prismatic mirror reflective element transmits near infrared light;

wherein the interior prismatic rearview mirror assembly comprises a mirror casing;

wherein a circumferential perimeter glass edge circumscribes a periphery of the prismatic glass substrate of the prismatic mirror reflective element, the circumferential perimeter glass edge spanning the thickness dimension of the prismatic glass substrate spacing the planar front glass surface from the transflector-coated planar rear glass surface, and wherein no portion of the mirror casing overlaps the planar front glass surface of the prismatic glass substrate of the prismatic mirror reflective element;

a camera disposed at the interior prismatic rearview mirror assembly;

wherein the camera comprises a CMOS image sensor;

wherein the CMOS image sensor comprises a photosensor array that senses both visible light and near infrared illumination;

wherein the camera is disposed behind the prismatic mirror reflective element and views through the transflector-coated planar rear glass surface of the prismatic glass substrate of the prismatic mirror reflective element into an interior cabin of the equipped vehicle;

wherein presence of the camera disposed behind the prismatic mirror reflective element and viewing through the transflector-coated planar rear glass surface of the prismatic glass substrate of the prismatic mirror reflective element is not readily apparent to an occupant of the equipped vehicle;

wherein supplemental sources of near infrared illumination are disposed at the interior prismatic rearview mirror assembly, and wherein the supplemental sources of near infrared illumination disposed at the interior prismatic rearview mirror assembly are operable to emit near infrared light to illuminate at least a driver-side front seating area within the interior cabin of the equipped vehicle;

wherein the supplemental sources of near infrared illumination disposed at the interior prismatic rearview mirror assembly comprise a plurality of near infrared-emitting light emitting diodes;

wherein the supplemental sources of near infrared illumination disposed at the interior prismatic rearview mirror assembly are disposed behind the prismatic mirror reflective element;

wherein near infrared light emitted by the supplemental sources of near infrared illumination disposed at the interior prismatic rearview mirror assembly passes through the transflector-coated planar rear glass surface of the prismatic glass substrate of the prismatic mirror reflective element into the interior cabin of the equipped vehicle;

wherein the supplemental sources of near infrared illumination disposed at the interior prismatic rearview mirror assembly are not readily apparent to an occupant of the equipped vehicle;

wherein the camera is operable to capture image data;

a processor that processes image data captured by the camera;

wherein the camera at least (a) views the driver-side front seating area of the equipped vehicle and (b) views a passenger-side front seating area of the equipped vehicle; and wherein via processing at the processor of image data captured by the camera, a driver of the equipped vehicle seated at the driver-side front seating area within the interior cabin of the equipped vehicle is monitored.

39. The vehicular driver monitoring system of claim 38, wherein the interior prismatic rearview mirror assembly comprises the processor that processes image data captured by the camera.

40. The vehicular driver monitoring system of claim 39, wherein the prismatic mirror reflective element nests in the mirror casing.

41. The vehicular driver monitoring system of claim 39, wherein the processor that processes image data captured by the camera comprises a system-on-a-chip image processor.

42. The vehicular driver monitoring system of claim 39, wherein the supplemental sources of near infrared illumination disposed at the interior prismatic rearview mirror assembly are operable to emit near infrared light to illuminate the driver-side front seating area within the interior cabin of the equipped vehicle and to illuminate the passenger-side front seating area within the interior cabin of the equipped vehicle.

43. The vehicular driver monitoring system of claim 39, wherein a portion of the mirror casing circumscribes the circumferential perimeter glass edge circumscribing the periphery of the prismatic glass substrate of the prismatic mirror reflective element.

44. The vehicular driver monitoring system of claim 43, wherein the portion of the mirror casing that circumscribes the circumferential perimeter glass edge circumscribing the periphery of the prismatic glass substrate of the prismatic mirror reflective element comprises a plastic molding.

45. The vehicular driver monitoring system of claim 44, wherein the plastic molding that circumscribes the circumferential perimeter glass edge circumscribing the periphery of the prismatic glass substrate (i) does not encroach onto the planar front glass surface of the prismatic glass substrate of the prismatic mirror reflective element and (ii) comprises a bezel portion of the mirror casing.

46. The vehicular driver monitoring system of claim 45, wherein the plastic molding contacts the circumferential perimeter glass edge of the prismatic glass substrate of the prismatic mirror reflective element.

47. The vehicular driver monitoring system of claim 44, wherein the plastic molding contacts the circumferential perimeter glass edge of the prismatic glass substrate of the prismatic mirror reflective element.

48. The vehicular driver monitoring system of claim 44, wherein the plastic molding that circumscribes the circumferential perimeter glass edge circumscribing the periphery of the prismatic glass substrate comprises an outermost part, and wherein, with the plastic molding of the portion of the mirror casing circumscribing the circumferential perimeter glass edge of the prismatic glass substrate, the outermost part of the plastic molding provides a curved transition between the planar front glass surface of the prismatic glass substrate of the prismatic mirror reflective element and another part of the mirror casing.

49. The vehicular driver monitoring system of claim 48, wherein the outermost part of the plastic molding providing the curved transition between the planar front glass surface of the prismatic glass substrate of the prismatic mirror reflective element and the other part of the mirror casing comprises an outer curved surface, and wherein the outer curved surface of the outermost part of the plastic molding provides a curved transition between the planar front glass surface of the prismatic glass substrate and a less-curved part of the plastic molding, and wherein the less-curved part of the plastic molding is contiguous with the outer curved surface of the outermost part of the plastic molding.

50. The vehicular driver monitoring system of claim 49, wherein the outermost part of the plastic molding lacks an exposed sharp edge.

51. The vehicular driver monitoring system of claim 38, comprising a video display device disposed within an interior cabin of the vehicle, and wherein the video display device comprises a video display screen operable to display video images viewable by the driver of the equipped vehicle, and wherein the video display screen displays video images derived from image data captured by an exterior-viewing camera disposed at the equipped vehicle, and wherein the video display device is disposed in the interior prismatic rearview mirror assembly, and wherein displayed video images are viewable through the prismatic mirror reflective element of the interior prismatic rearview mirror assembly.

* * * * *

UNITED STATES PATENT AND TRADEMARK OFFICE
CERTIFICATE OF CORRECTION

| | |
|---|---|
| PATENT NO. | : 12,136,295 B2 |
| APPLICATION NO. | : 18/491858 |
| DATED | : November 5, 2024 |
| INVENTOR(S) | : Mark E. Kramer et al. |

It is certified that error appears in the above-identified patent and that said Letters Patent is hereby corrected as shown below:

In the Specification

Column 5
Line 48, "(FDA's)" should be --(PDA's)--

Column 27
Line 15, "nevi 680" should be --nüvi 680--

Column 31
Line 20, "circuitry 5571," should be --circuitry 557I,--

Column 42
Line 45, "position able," should be --positionable,--

Signed and Sealed this
Third Day of December, 2024

Katherine Kelly Vidal
*Director of the United States Patent and Trademark Office*